US012089787B2

(12) United States Patent
Lee

(10) Patent No.: US 12,089,787 B2
(45) Date of Patent: Sep. 17, 2024

(54) BLENDER

(71) Applicants: INTROPACK CO., LTD., Pyeongtaek-Si (KR); NUC ELECTRONICS CO., LTD., Daegu (KR)

(72) Inventor: Kyul-Joo Lee, Dangjin-Si (KR)

(73) Assignees: INTROPACK CO., LTD., Pyeongtaek-Si (KR); NUC ELECTRONICS CO., LTD., Daegu (KR)

( * ) Notice: Subject to any disclaimer, the term of this patent is extended or adjusted under 35 U.S.C. 154(b) by 692 days.

(21) Appl. No.: 17/275,708

(22) PCT Filed: Sep. 11, 2019

(86) PCT No.: PCT/KR2019/011801

§ 371 (c)(1),
(2) Date: Mar. 12, 2021

(87) PCT Pub. No.: WO2020/055146

PCT Pub. Date: Mar. 19, 2020

(65) Prior Publication Data

US 2021/0345831 A1 Nov. 11, 2021

(30) Foreign Application Priority Data

Sep. 12, 2018 (KR) ........................ 10-2018-0109222
Oct. 26, 2018 (KR) ........................ 10-2018-0129311
(Continued)

(51) Int. Cl.
*A47J 43/046* (2006.01)
*A47J 19/02* (2006.01)
(Continued)

(52) U.S. Cl.
CPC ........... *A47J 43/087* (2013.01); *A47J 19/027* (2013.01); *A47J 43/046* (2013.01); *A47J 43/0722* (2013.01)

(58) Field of Classification Search
CPC ... A47J 43/046; A47J 43/0716; A47J 43/0722
(Continued)

(56) References Cited

U.S. PATENT DOCUMENTS 5,074,201 A * 12/1991 Takeyama ............. A47J 27/004 99/348
8,028,617 B2 * 10/2011 Wang .................... A47J 43/044 99/357
(Continued)

FOREIGN PATENT DOCUMENTS

CN 1973743 A 6/2007
CN 200951435 9/2007
(Continued)

OTHER PUBLICATIONS

International Search Report for PCT/KR2019/011801 dated Jan. 14, 2020, 4 pages.
(Continued)

*Primary Examiner* — Reginald Alexander
(74) *Attorney, Agent, or Firm* — Dority & Manning, P.A.

(57) ABSTRACT

A blender includes a blender body including an external cylinder, a grinding blade, and a blade driving portion rotating the grinding blade; and an internal cylinder unit including an internal cylinder, disposed in the external cylinder, in which the grinding blade is disposed, and having an internal side surface, on which at least one projection is formed, and an internal cylinder driving portion rotating the internal cylinder, wherein the internal cylinder driving portion rotates the internal cylinder with an internal cylinder driving motor in a direction opposing a rotational direction
(Continued)

of the grinding blade, and includes a blocking member preventing the internal cylinder from rotating in the same direction as the rotational direction of the grinding blade.

14 Claims, 31 Drawing Sheets

(30) Foreign Application Priority Data

| | | |
|---|---|---|
| Oct. 26, 2018 | (KR) | 10-2018-0129312 |
| Mar. 28, 2019 | (KR) | 10-2019-0035483 |
| Mar. 28, 2019 | (KR) | 10-2019-0035484 |
| Jul. 24, 2019 | (KR) | 10-2019-0089624 |
| Aug. 20, 2019 | (KR) | 10-2019-0101832 |
| Sep. 6, 2019 | (KR) | 10-2019-0110540 |

(51) Int. Cl.
*A47J 43/07* (2006.01)
*A47J 43/08* (2006.01)

(58) Field of Classification Search
USPC .................................................... 99/510, 511
See application file for complete search history.

(56) References Cited

U.S. PATENT DOCUMENTS

| | | | | |
|---|---|---|---|---|
| 2005/0068847 | A1 * | 3/2005 | Sands | A47J 43/0716 366/205 |
| 2006/0207441 | A1 | 9/2006 | Mulhauser et al. | |
| 2009/0000494 | A1 * | 1/2009 | Kim | A47J 43/0705 99/513 |
| 2010/0005977 | A1 * | 1/2010 | Menashes | A47J 43/082 99/510 |
| 2014/0254302 | A1 | 9/2014 | Yang | |
| 2017/0027364 | A1 | 2/2017 | Kim et al. | |

FOREIGN PATENT DOCUMENTS

| | | | |
|---|---|---|---|
| CN | 202173300 | | 3/2012 |
| CN | 103948333 | A | 7/2014 |
| CN | 206576790 | U | 10/2017 |
| CN | 108338646 | A | 7/2018 |
| EP | 0592700 | A1 | 4/1994 |
| JP | S60111691 | | 7/1985 |
| JP | H7051114 | | 6/1995 |
| JP | H11290222 | | 10/1999 |
| JP | 2000097308 | A | 4/2000 |
| JP | 2005192463 | A | 7/2005 |
| JP | 3131733 | U | 5/2007 |
| JP | 2012100793 | | 5/2012 |
| JP | 2013052109 | | 3/2013 |
| KR | 2019850002876 | | 10/1985 |
| KR | 1996003075 | B1 | 3/1996 |
| KR | 20000003557 | U | 2/2000 |
| KR | 200214512 | | 3/2001 |
| KR | 101065898 | | 9/2011 |
| KR | 20120006637 | U | 9/2012 |
| KR | 20140147917 | A | 12/2014 |
| KR | 20160065455 | A | 6/2016 |
| KR | 101644709 | | 8/2016 |
| KR | 101688886 | B1 | 1/2017 |
| KR | 1020170096383 | | 8/2017 |
| KR | 101772862 | | 9/2017 |
| KR | 1020180037567 | | 4/2018 |
| KR | 101911075 | | 10/2018 |
| KR | 102008730 | | 8/2019 |
| KR | 102009386 | | 8/2019 |
| WO | WO2014027733 | | 2/2014 |

OTHER PUBLICATIONS

European Search Report for corresponding European Application No. 19860208.8, issued on Sep. 24, 2021, 6 pages.
Chinese Office Action for corresponding Application No. 201980059638.3, dated Jul. 7, 2023, 8 pages.
Chinese Office Action for corresponding Application No. 201980059803.5 dated Jul. 12, 2023, 8 pages.
Japanese Office Action for corresponding Japanese Application No. 2021-513979, dated May 11, 2022, 9 pages.
Korean Office Action for corresponding Application No. 10-2019-0089624, dated Dec. 23, 2023, 4 pages.
Prior Art Search Report of Request for Accelerated Examination for corresponding Application No. KR10-2019-0035483, dated Apr. 4, 2019, 3 pages.
Prior Art Search Report of Request for Accelerated Examination for corresponding Application No. KR10-2018-0129311, dated Mar. 4, 2024, 4 pages.
Prior Art Search Report of Request for Accelerated Examination for corresponding Application No. KR10-2018-0129312, dated Mar. 4, 2024, 3 pages.

* cited by examiner

【FIG. 1】
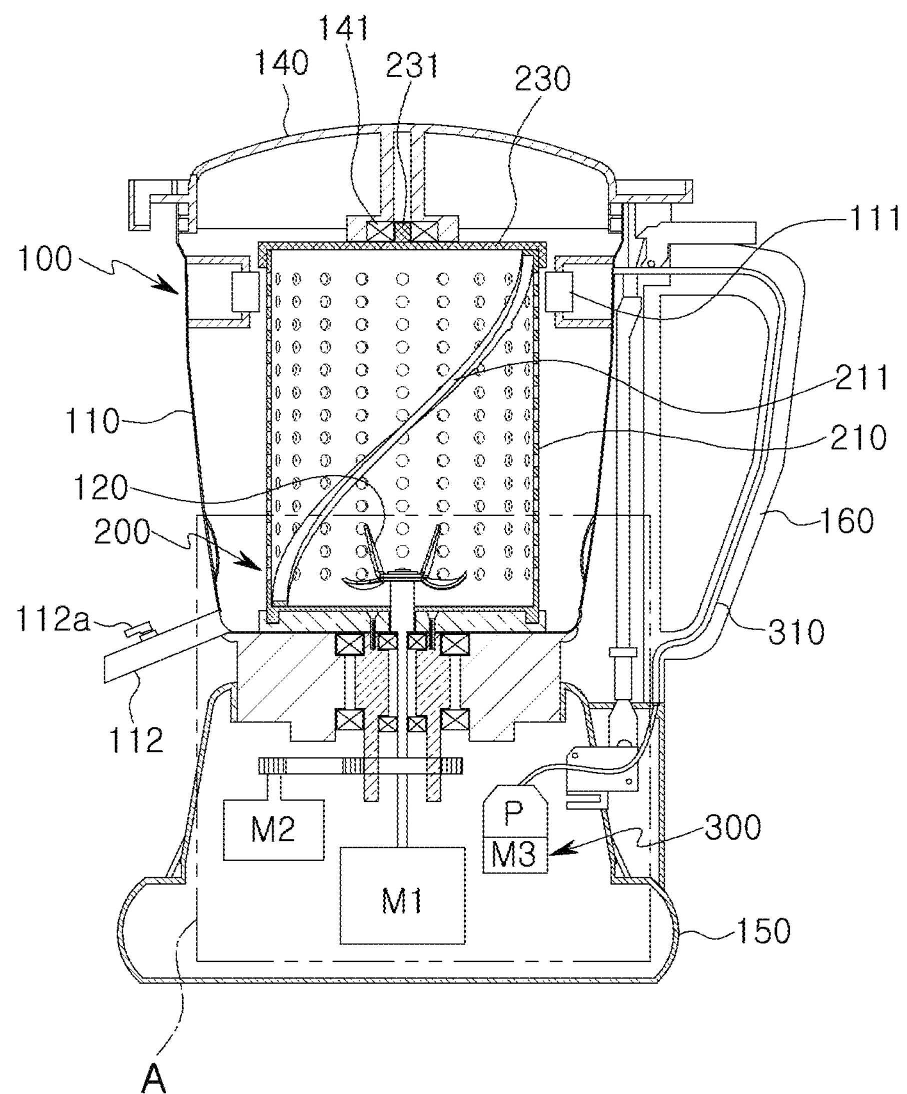

【FIG. 2】
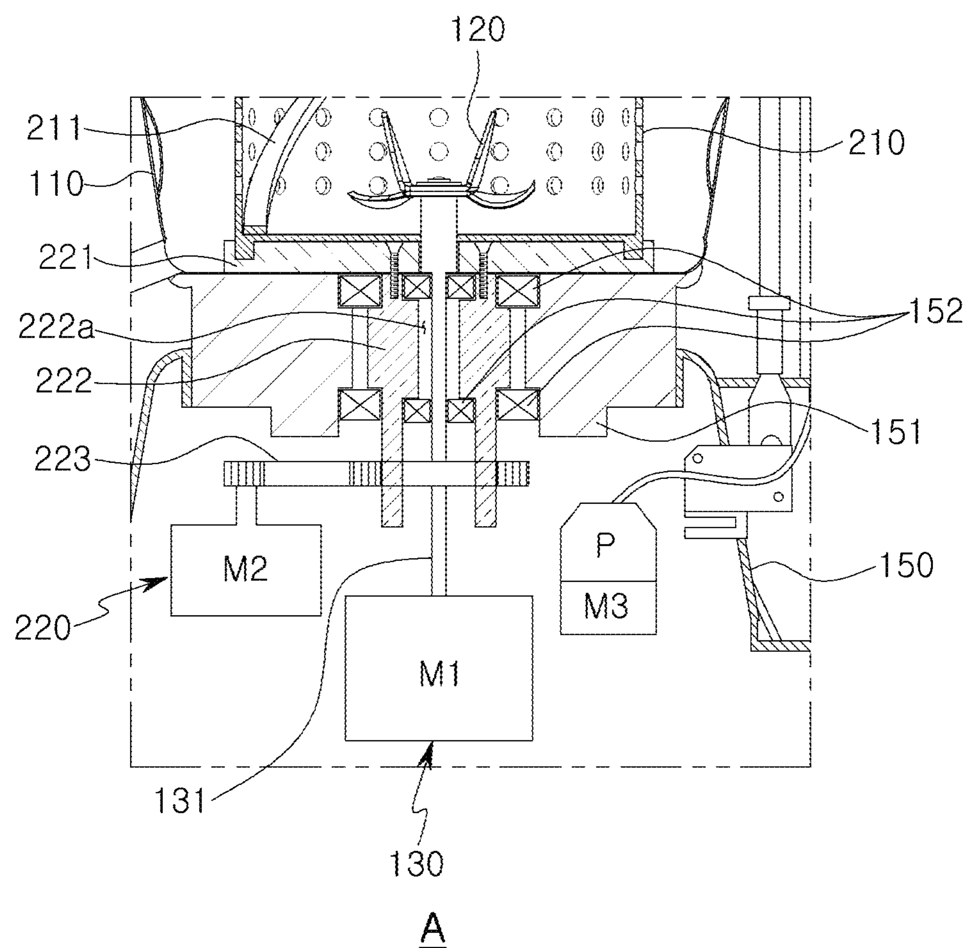

【FIG. 3】
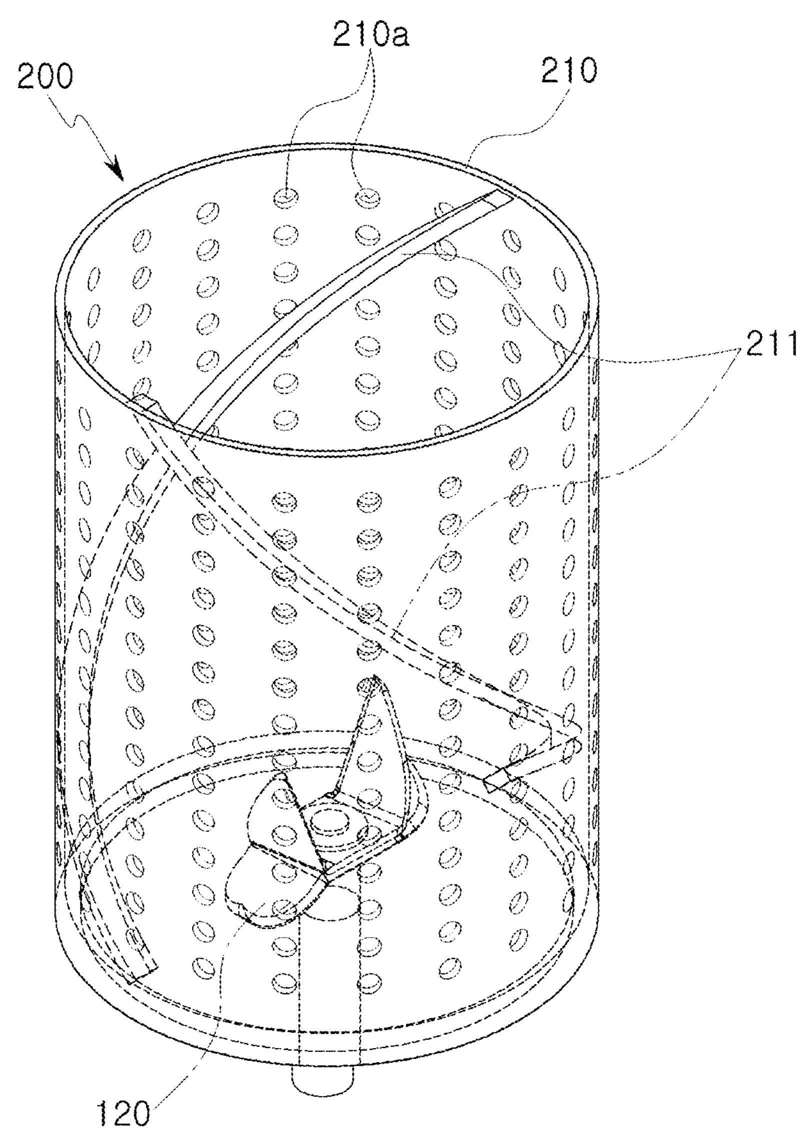

【FIG. 4】
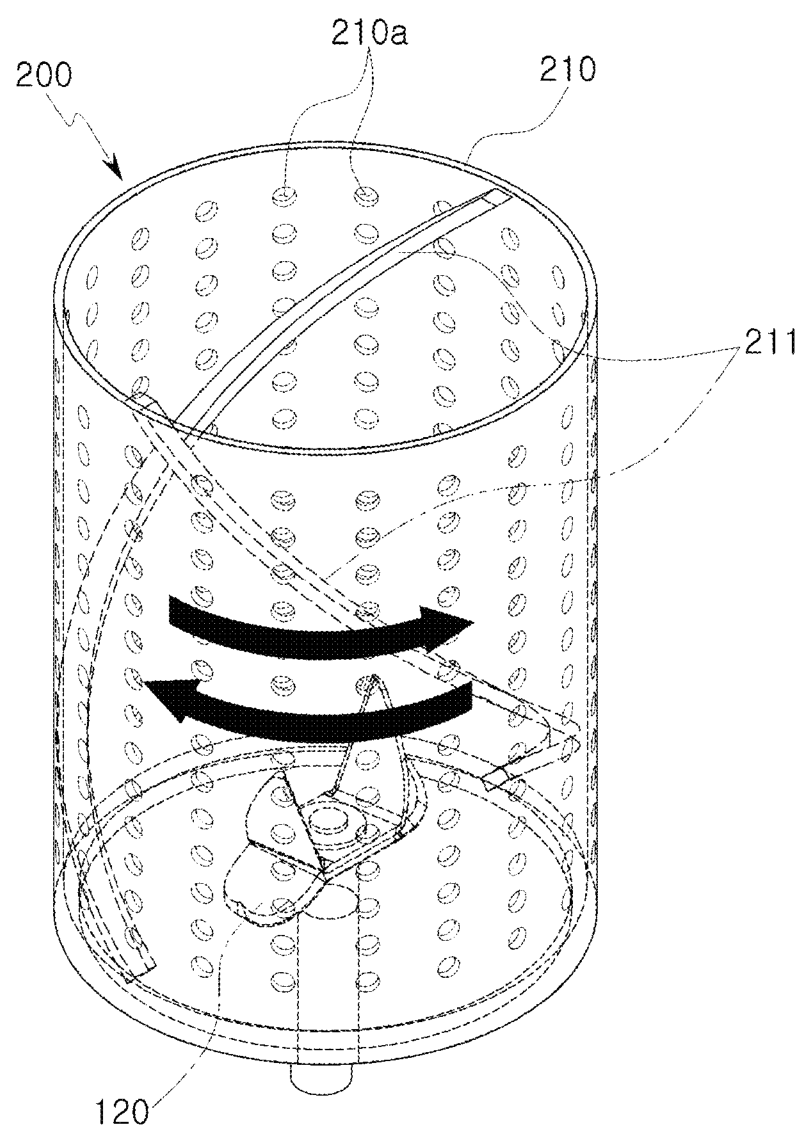

【FIG. 5】
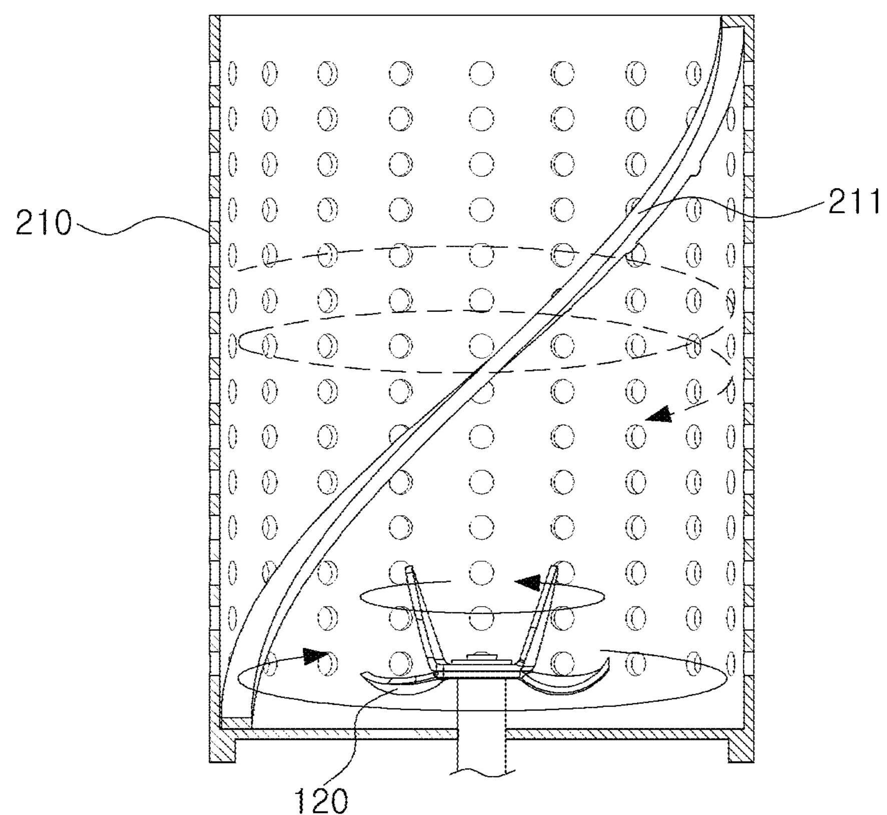

【FIG. 6】
| BLENDING OBJECT : GARLIC | 3 sec | 15 sec | 1 min | |
|---|---|---|---|---|
| | | | OUTSIDE | INSIDE |
| PRESENT DISCLOSURE | 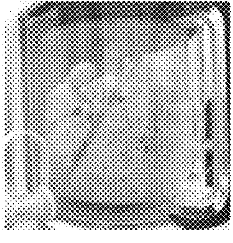 | 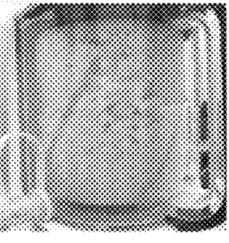 | 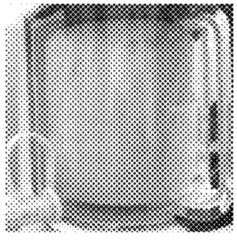 | 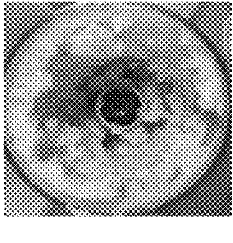 |
| FIRST RELATED ART | | 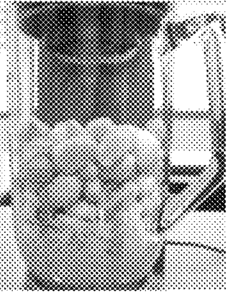 | 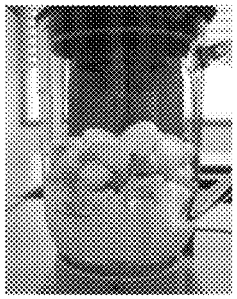 | 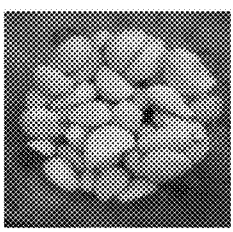 |
| SECOND RELATED ART | 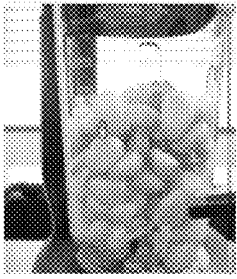 | 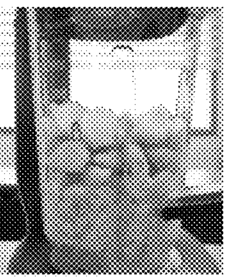 | 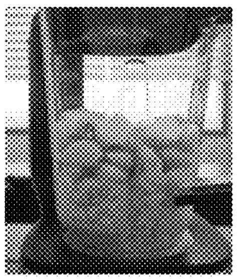 | 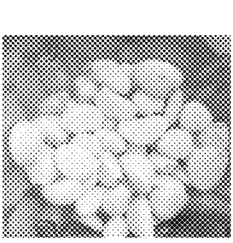 |

【FIG. 7】
| BLENDING OBJECT : APPLE | 3 sec | 15 sec | 1 min | |
|---|---|---|---|---|
| | | | OUTSIDE | INSIDE |
| PRESENT DISCLOSURE | 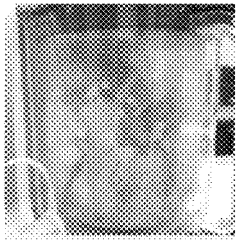 | 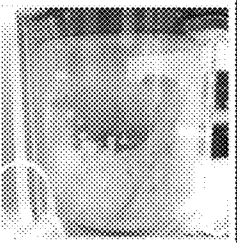 | 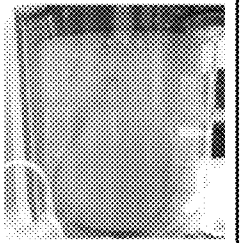 | 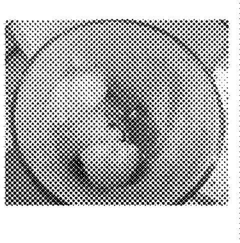 |
| FIRST RELATED ART | 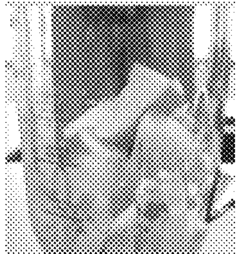 | 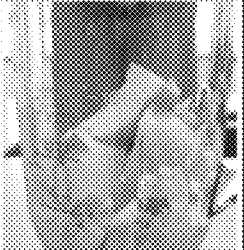 | 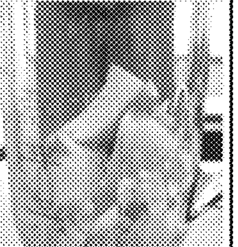 | 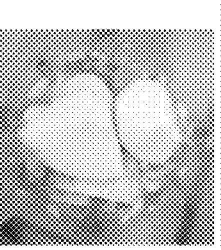 |
| SECOND RELATED ART | 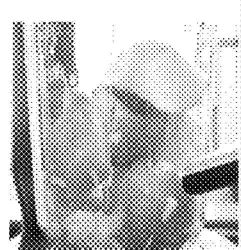 | 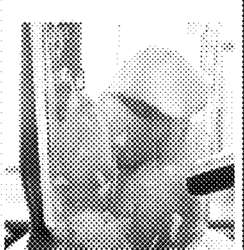 | 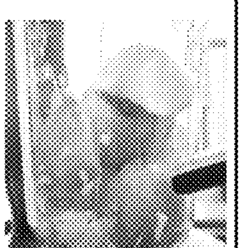 | 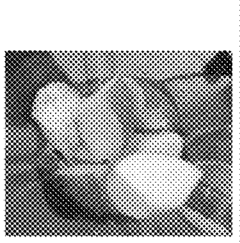 |

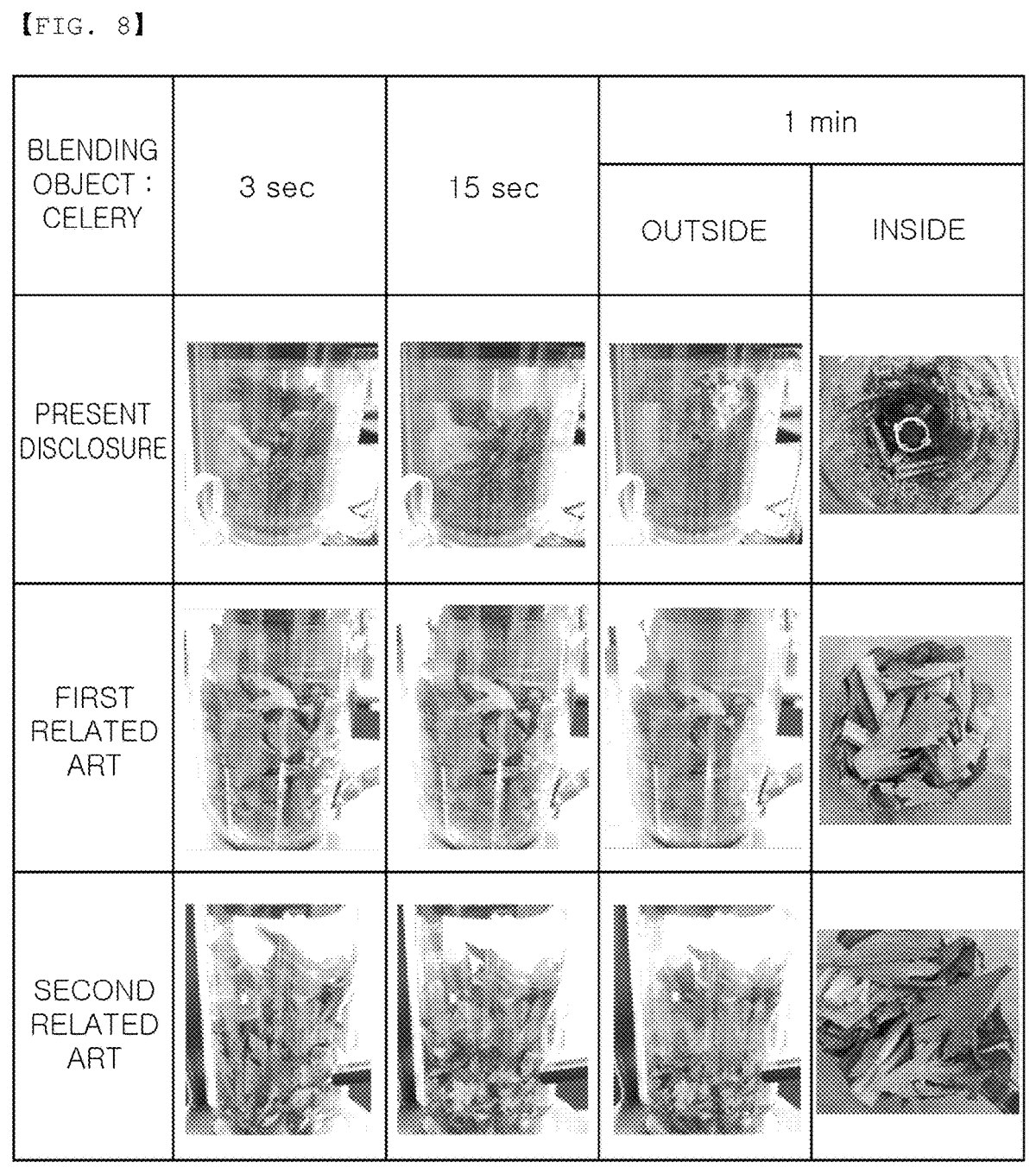

【FIG. 8】

| BLENDING OBJECT : CELERY | 3 sec | 15 sec | 1 min | |
|---|---|---|---|---|
| | | | OUTSIDE | INSIDE |
| PRESENT DISCLOSURE | | | | |
| FIRST RELATED ART | | | | |
| SECOND RELATED ART | | | | |

【FIG. 9】
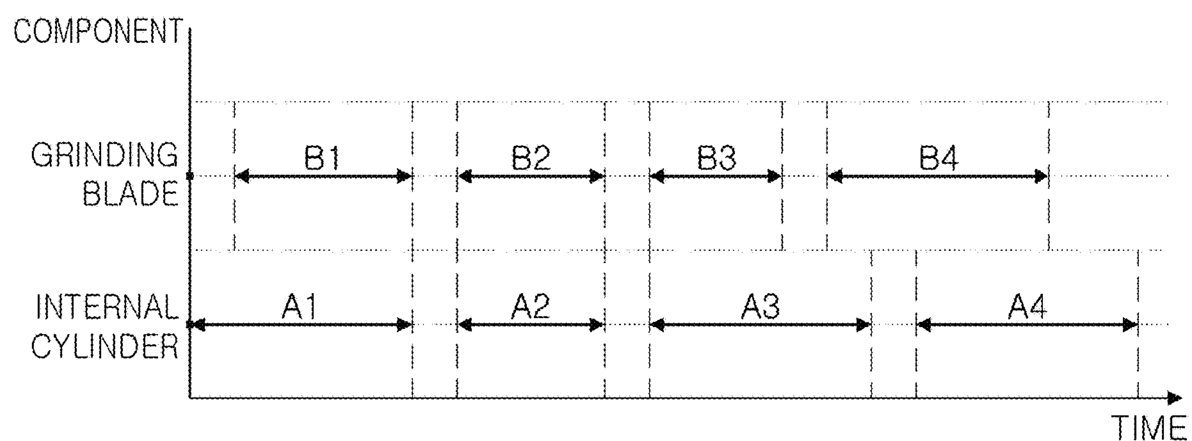

【FIG. 10】
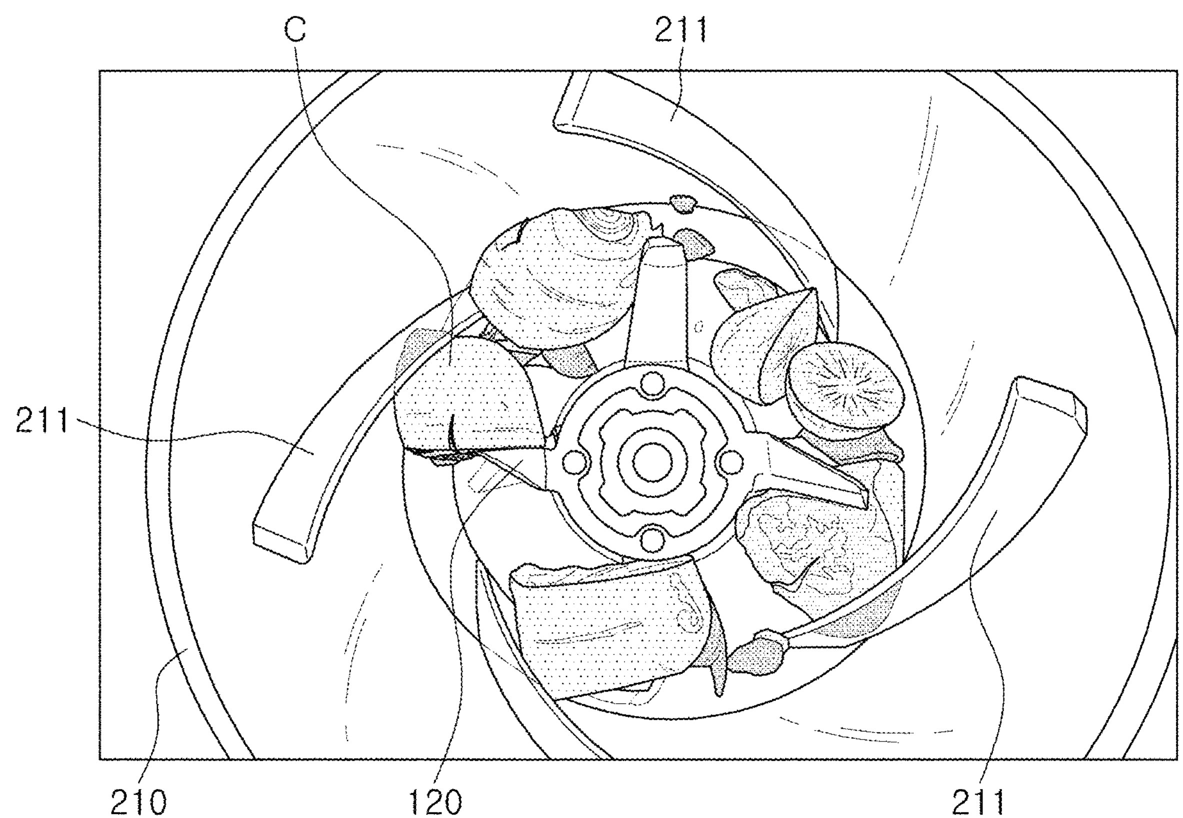

【FIG. 11】
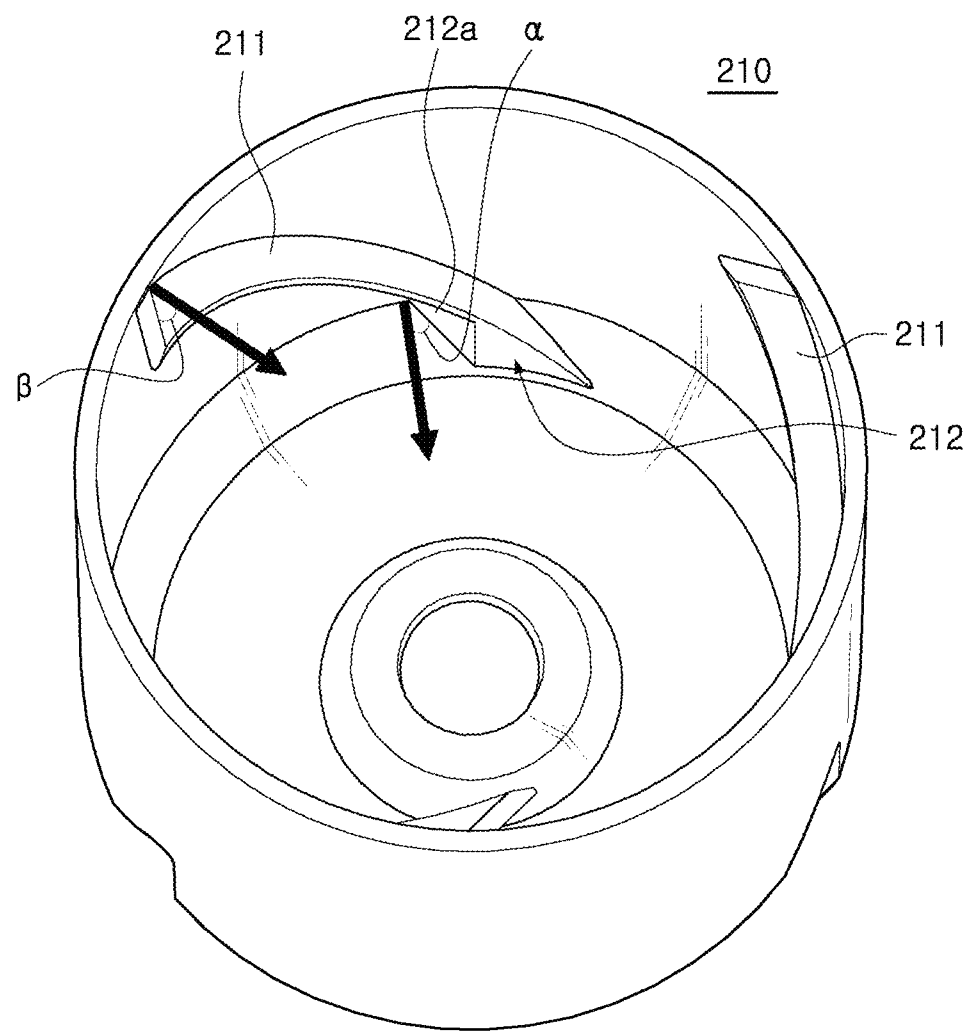

【FIG. 12】
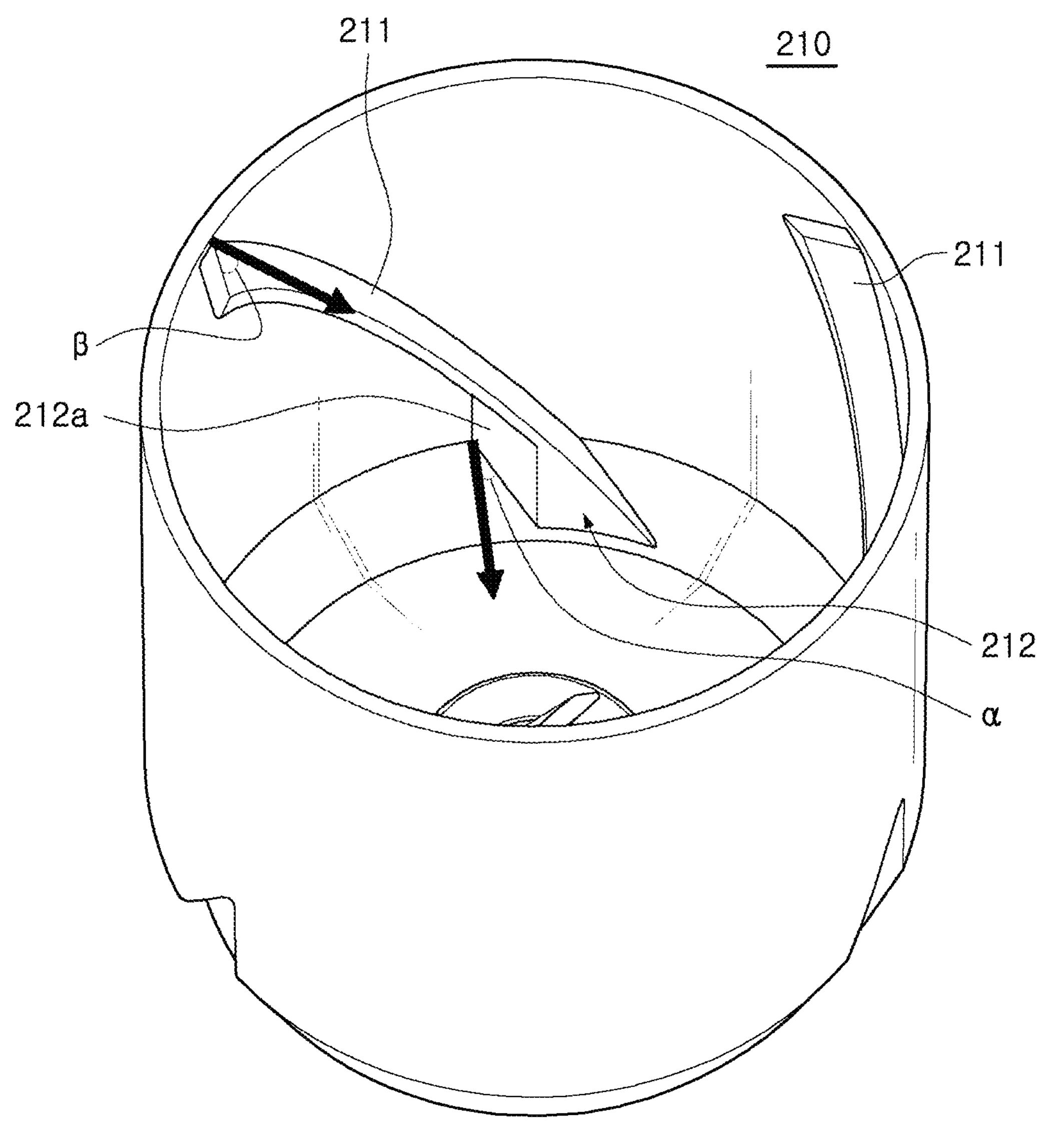

【FIG. 13】
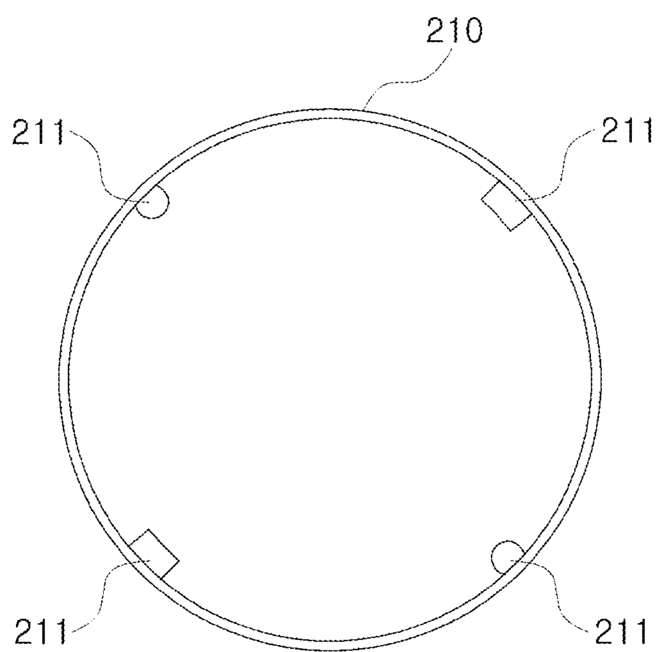

【FIG. 14】
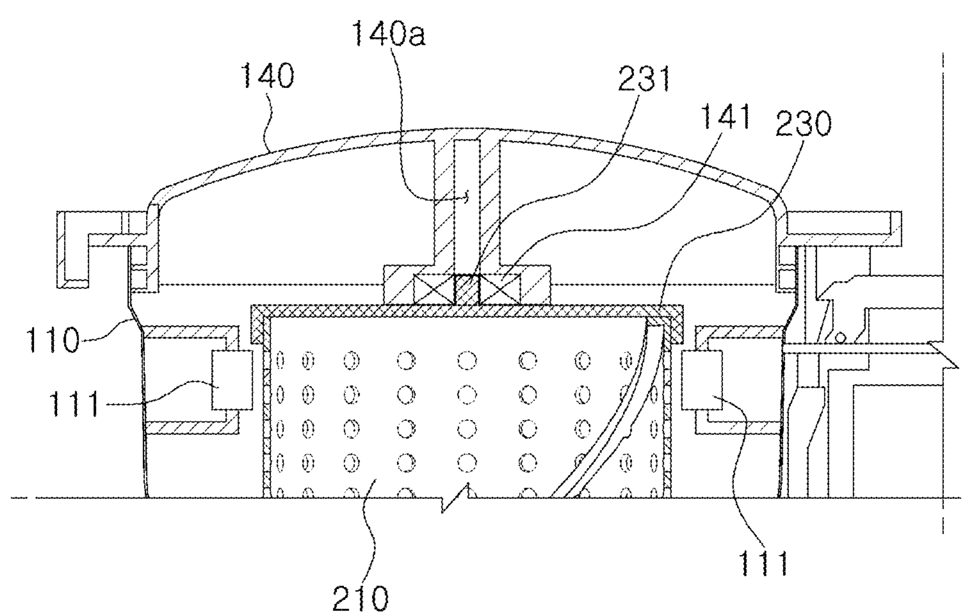

【FIG. 15A】
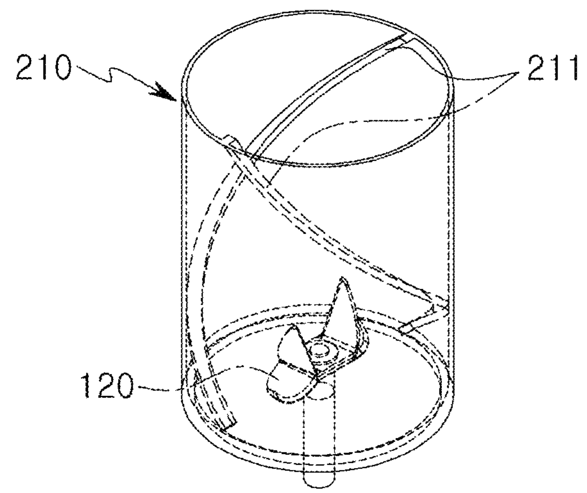
【FIG. 15B】
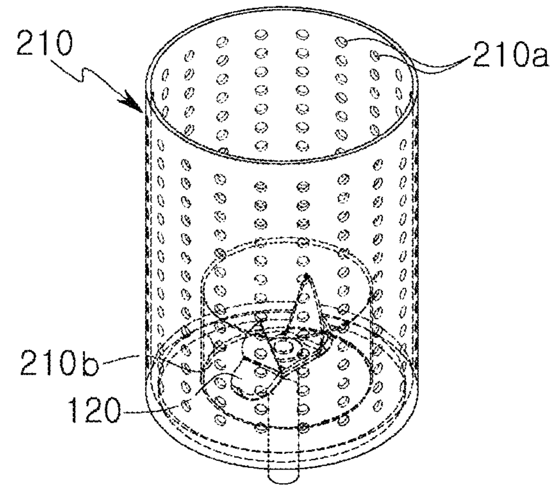
5

【FIG. 16】
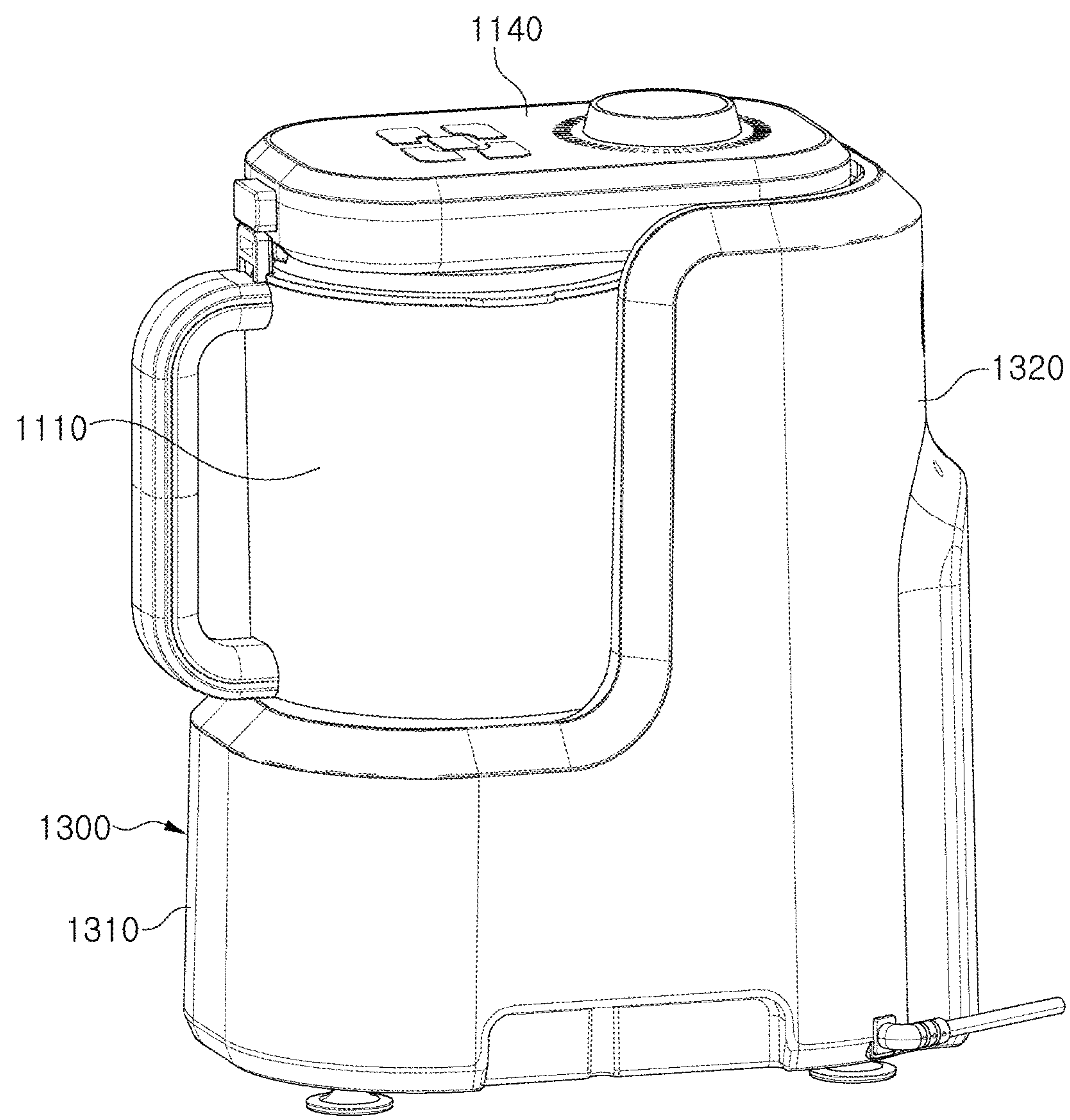

【FIG. 17】
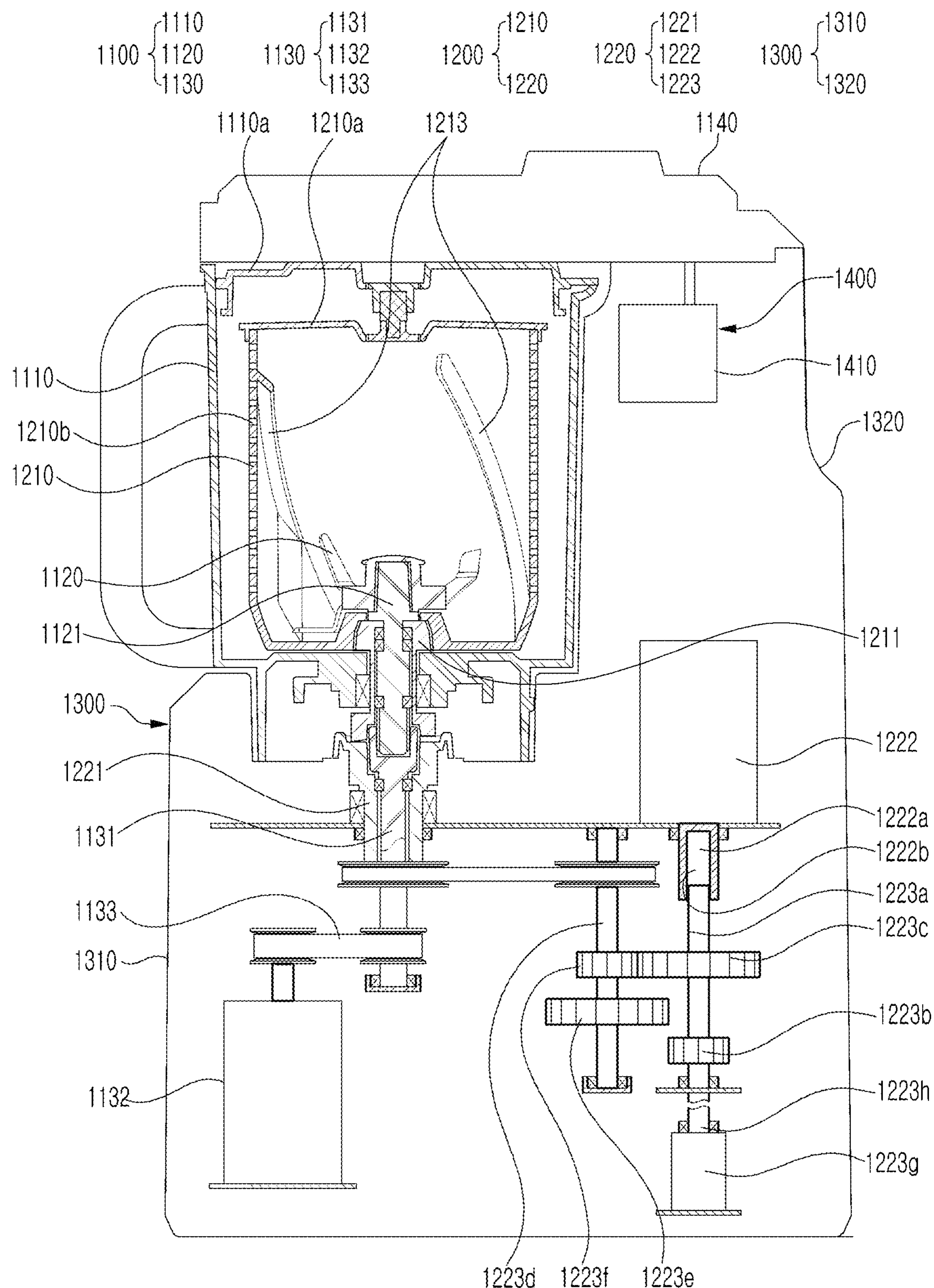

【FIG. 18】
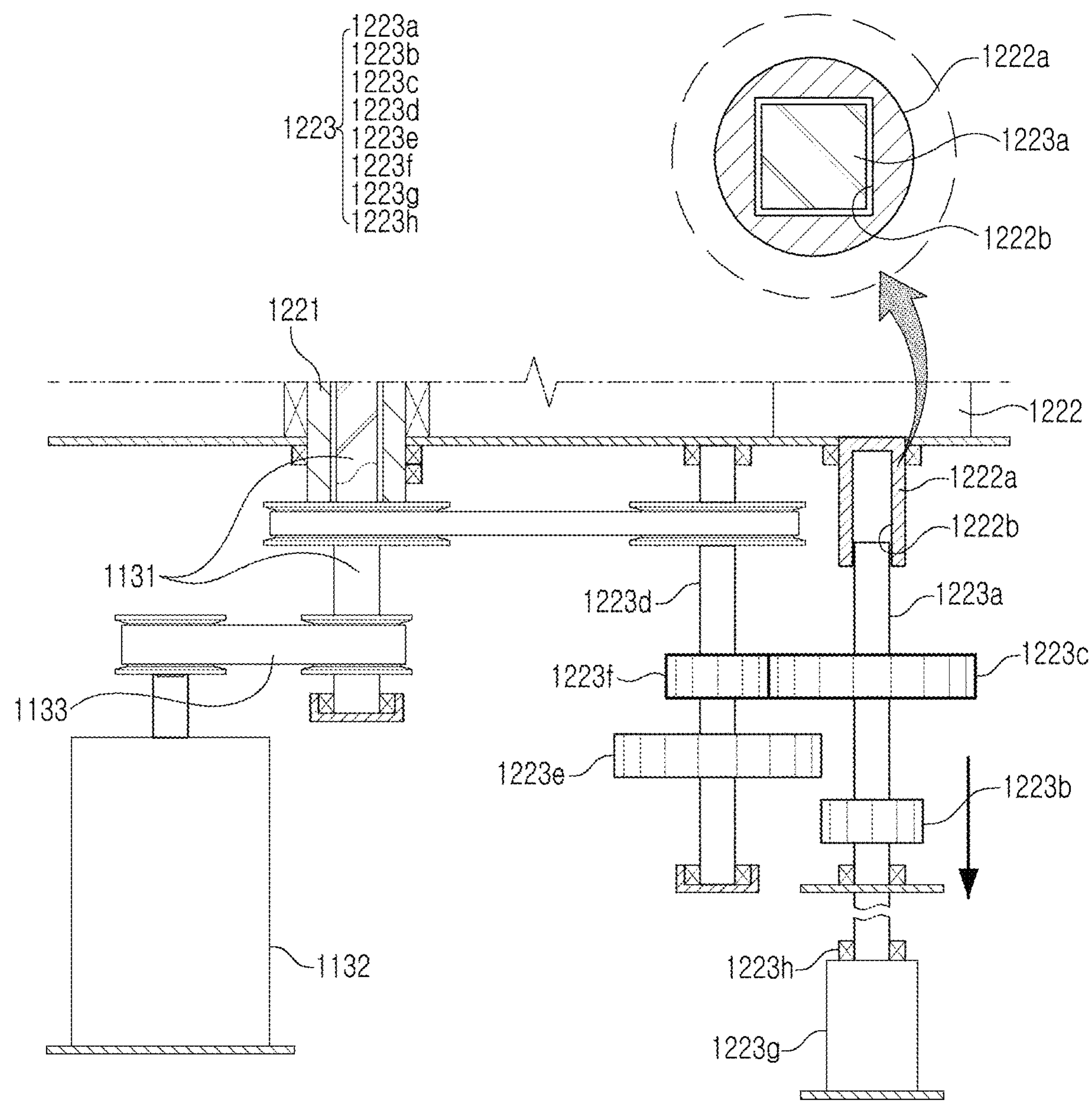

【FIG. 19】
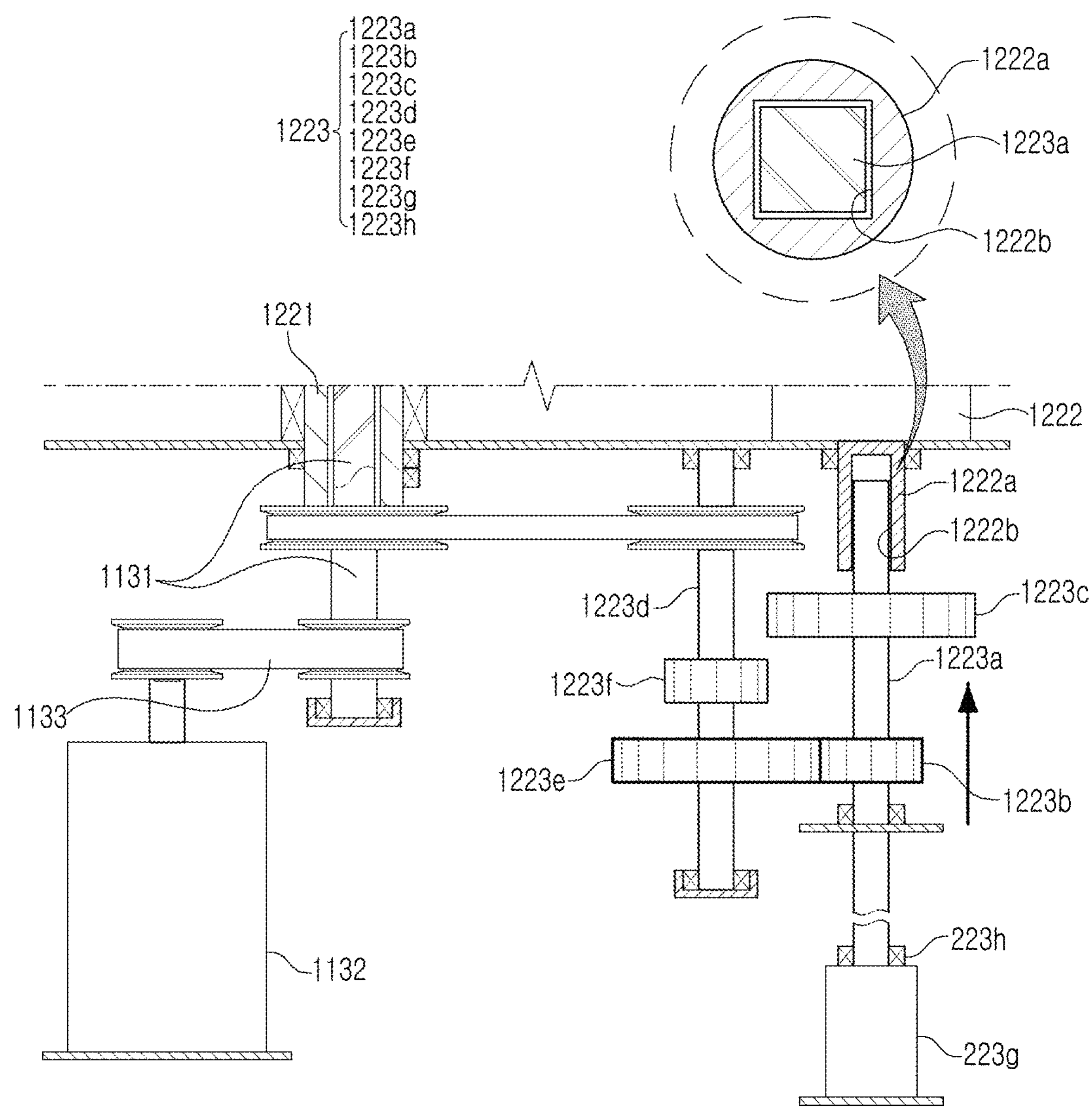

【FIG. 20】
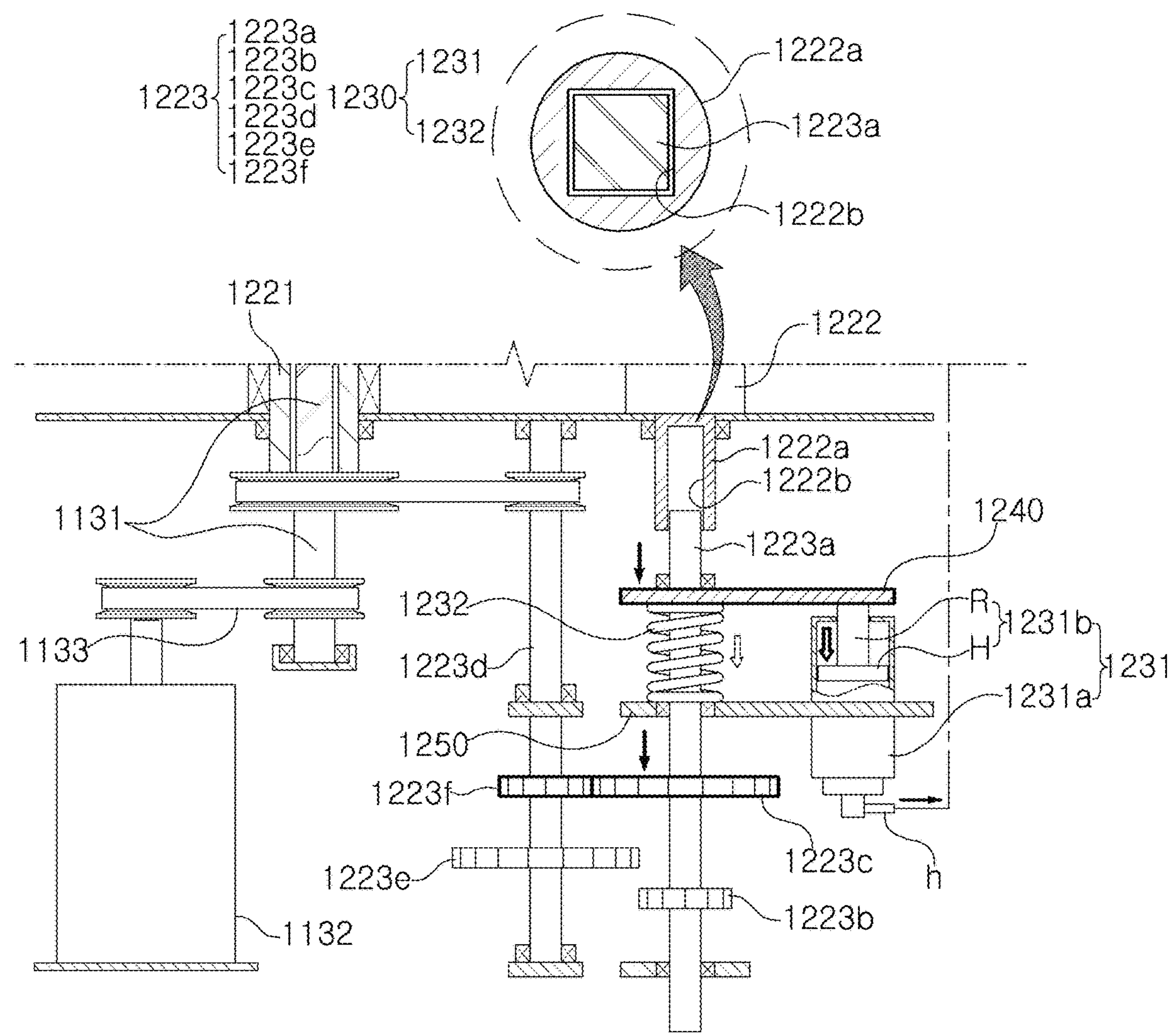

【FIG. 21】
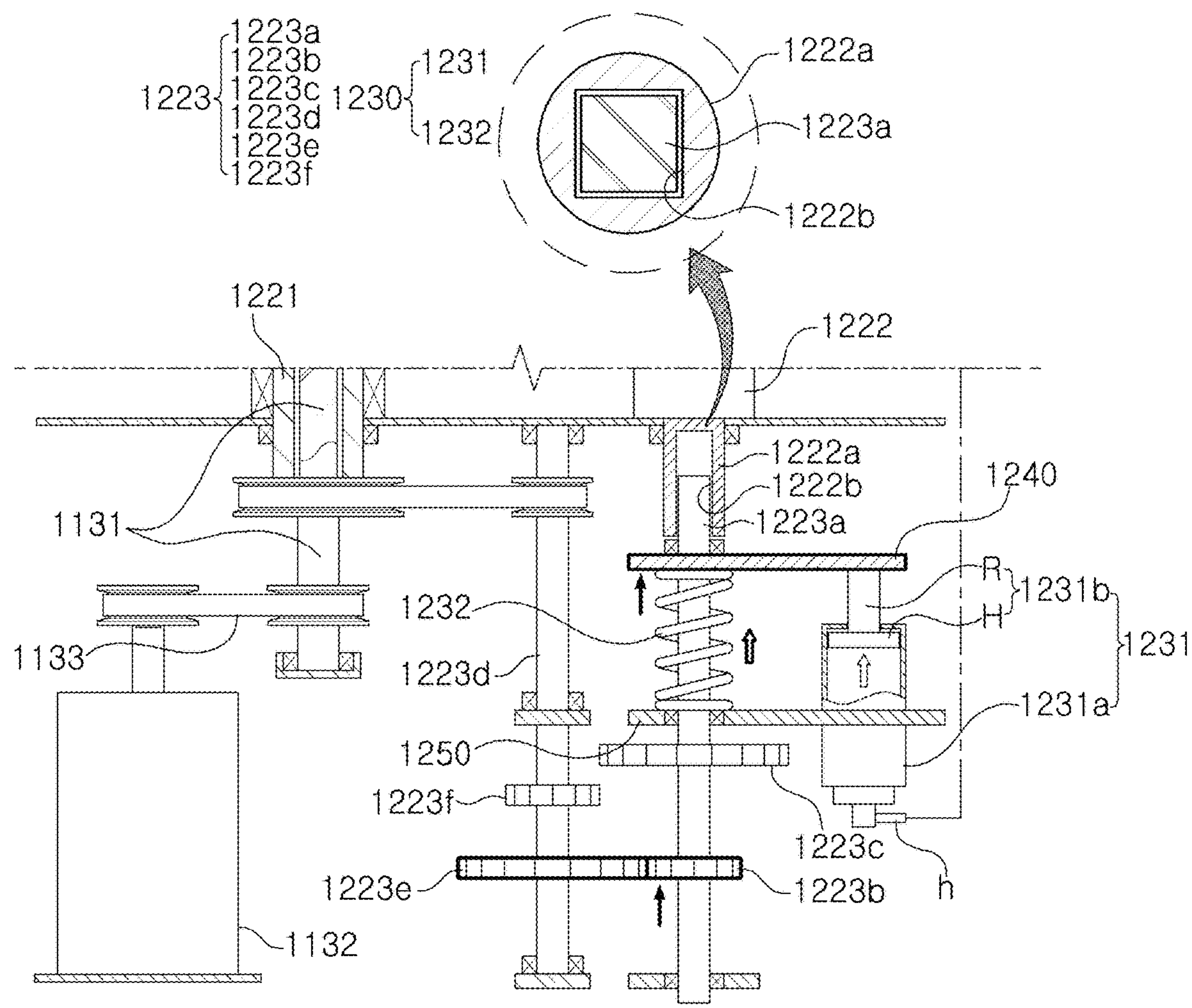

BLENDER

CROSS REFERENCE TO RELATED APPLICATIONS

This application is the U.S. National Stage entry of International Application Number PCT/KR2019/011801 filed under the Patent Cooperation Treaty having a filing date of Sep. 11, 2019, which claims priority to Korean Patent Application No. 10-2018-0109222 having a filing date of Sep. 12, 2018, Korean Patent Application No. 10-2018-0129311 having a filing date of Oct. 26, 2018, Korean Patent Application No. 10-2018-0129312 having a filing date of Oct. 26, 2018, Korean Patent Application No. 10-2019-0035483 having a filing date of Mar. 28, 2019, Korean Patent Application No. 10-2019-0035484 having a filing date of Mar. 28, 2019, Korean Patent Application No. 10-2019-0089624 having a filing date of Jul. 24, 2019, Korean Patent No. 10-2019-0101832 having a filing date of Aug. 20, 2019, Korean Patent Application No. 10-2019-0110540 having a filing date of Sep. 6, 2019, all of which are incorporated herein by reference.

TECHNICAL FIELD

The present disclosure relates to a blender, and more particularly, to a blender for grinding blending objects including fruits, vegetables, and the like.

BACKGROUND ART

In general, a blender is an electric appliance including a container (a cup), in which blending objects are accommodated, and a body accommodating a motor.

The container is formed of hard heat-resistant glass, synthetic resin, or stainless steel. In a lower internal portion of the container, grinding blades of stainless steel are mounted on a driving unit to engage therewith.

In addition, as the motor accommodated in the body rotates at high speed, the blender has been widely used domestically to cut and grind blending objects including fruits, vegetables, and the like, as well as to produce juice from the blending objects.

As the grinding blades of the blender rotate unidirectionally, or rotate unidirectionally for a certain time, even when the grinding blades rotate bidirectionally, blending objects are radially pushed outwardly by centrifugal force to significantly reduce a grinding effect and a juice producing effect.

In addition, even during grinding of the blending objects, juice should be extracted using an additional juice extractor to produce and drink the juice, which leads to inconvenience.

DISCLOSURE

Technical Problem

An aspect of the present disclosure is to provide a blender having improved grinding performance of blending objects.

TECHNICAL SOLUTION

According to an aspect of the present disclosure, a blender includes: a blender body including an external cylinder, a grinding blade, and a blade driving portion rotating the grinding blade; and an internal cylinder unit including an internal cylinder, disposed in the external cylinder, in which the grinding blade is disposed, and having an internal side surface, on which at least one projection is formed, provided with a dehydration hole, and an internal cylinder driving portion rotating the internal cylinder. A blade rotation shaft of the blade driving portion is axially and rotationally mounted in a hollow formed in an internal cylinder rotation shaft of the internal cylinder driving portion, and the blade rotation shaft and the internal cylinder rotation shaft axially rotate independently. The internal cylinder driving portion includes an internal cylinder driving portion connecting the internal cylinder rotation shaft, an internal cylinder driving motor, and the internal cylinder rotation shaft to an internal cylinder driving motor, and a gear-coupled structure of the internal cylinder connection portion varies such that the internal cylinder has different rotational speeds during grinding of blending objects and during dehydration of the blending objects.

ADVANTAGEOUS EFFECTS

As set forth above, in a blender according to a blender, a controller may change a rotational direction of an internal cylinder, or may control an internal cylinder driving portion to blend blending objects while repeatedly performing an operating pattern in which the internal cylinder rotates in a reverse direction opposing a rotational direction of a grinding blade and is then stopped, or an operating pattern in which the internal cylinder rotates in the reverse direction and then changes rotational speed. Thus, an irregular flow of the blending objects may be achieved, so that the blending objects may not be piled up like a wall on an internal side surface of the internal cylinder and may return to the grinding blade rotating in a central portion of the internal cylinder. As a result, grinding performance may be significantly improved.

For example, the blender according to the present disclosure may be configured to achieve the irregular flow of the blending objects. Thus, the blender may break down the blending objects maintained like a wall on the internal side surface of the internal cylinder to ultimately improve grinding performance for the blending objects.

Furthermore, in the blender according to the present disclosure, the projection having a screw projection line shape inducing a downward spiral flow of the blending object may be provided on the internal side surface of the internal cylinder 210 such that the blending objects flow downwardly while rotating in a direction opposing the rotational direction of the grinding blade. Thus, the blending objects, flowing upwardly while being radially pushed by centrifugal force, may flow to the grinding blade disposed on a lower side of the internal cylinder. As a result, a grinding effect of the blender may be further increased.

In the blender according to the present disclosure, a guide portion may be formed below a projection, disposed in a side direction of a grinding blade, to guide blending objects to a center of an internal cylinder (a rotational cylinder). Thus, the blending objects may be prevented from being caught between the grinding blade and the projection, so that rotation of the grinding blade may be prevented from being stopped at the beginning of operation of the blender.

In addition, the blender according to the present disclosure may have a structure in which the projection is tilted in a rotational direction of an internal cylinder (a rotational cylinder) while protruding from the internal side surface of the internal cylinder to the center of the internal cylinder. Due to the structure, holding force to hold the blending objects may be further increased when the internal cylinder rotates in a direction opposing the grinding blade. Thus, an action of reverse rotation of the blending objects may be further strongly performed.

A blender according to another embodiment may have a structure in which a gear-coupled structure of an internal cylinder connection portion varies such that an internal cylinder may have different rotational speeds during grinding and dehydration of the blending objects, or may be provided with a plurality of internal cylinder driving motors. Accordingly, a torque is increased while decreasing reverse rotational speed of the internal cylinder. Thus, among blending objects rotating in a forward direction due to forward rotation of the grinding blade, blending objects close to the internal side surface of the internal cylinder may smoothly rotate in a reverse direction. In addition, during dehydration of the ground blending objects, the rotational speed of the internal cylinder may be increased to be as high as possible, as compared with during grinding of the blending objects, to significantly increase the dehydration effect.

A blender according to another embodiment may include a pressing member configured to press an internal cylinder driving shaft until a gear-coupled structure of an internal cylinder driving connection portion is variably completed. When gear teeth of gears do not engage with each other in spite of axial movement of the internal cylinder driving shaft, the internal cylinder driving shaft may be continuously pressed in an axial direction until the gear-coupled structure is variably completed. Thus, the gear teeth may ultimately engage with each other while rotating the gear, allowing the gear-coupled structure of the internal cylinder connection portion to be completely variable.

In a blender according to another embodiment, a single internal cylinder driving motor may be provided as a driving member configured to rotate an internal cylinder in a direction opposing a rotational direction of a grinding blade. Therefore, only one internal cylinder driving motor may be used in a grinding mode and a dehydration mode to improve production efficiency. In this case, a blocking member may be provided on an internal cylinder driving shaft or a motor shaft of an internal cylinder driving motor to prevent an internal cylinder from rotating in the same direction as the rotational direction of the grinding blade. As a result, the internal cylinder may be prevented from rotating in the same direction as the rotational direction of the grinding blade, for example, in a forward direction even when the internal cylinder is pushed by blending objects to tend to rotate in the forward direction.

DESCRIPTION OF DRAWINGS

FIG. 1 is a view illustrating the inside of a blender according to an embodiment of the present disclosure.

FIG. 2 is an enlarged view of portion ‘A’ of FIG. 1.

FIG. 3 is a perspective view illustrating an internal cylinder of the blender of FIG. 1.

FIG. 4 is a view illustrating that the internal cylinder of FIG. 3 rotates in forward and reverse directions.

FIG. 5 is a view illustrating rotational directions of an internal cylinder and grinding blade and a flow direction of a blending object.

FIGS. 6 to 8 illustrate time-dependent results of grinding blending objects by a blender according to the present disclosure and blenders according to the first related art and the second related art.

FIG. 9 is a view illustrating a time-dependent operating pattern for an internal cylinder and grinding blade according to the present disclosure.

FIG. 10 is a view illustrating that a blending object is caught between a grinding blade and a projection to cause the grinding blade to be stopped.

FIGS. 11 and 12 are views illustrating an internal cylinder according to another embodiment of the present disclosure.

FIG. 13 is a view illustrating an upper surface of the internal cylinder according to another embodiment of the present disclosure.

FIG. 14 is a view illustrating an upper portion of the blender of FIG. 1.

FIGS. 15A and 15B are views illustrating internal cylinders according to other embodiments of the present disclosure, respectively.

FIG. 16 is a view illustrating a blender according to another embodiment of the present disclosure.

FIG. 17 is a view illustrating the inside of the blender of FIG. 16.

FIGS. 18 and 19 are views illustrating operating states of an internal cylinder driving unit in the blender in FIG. 17.

FIGS. 20 and 21 are views illustrating operating states of an internal cylinder driving unit according to another embodiment of the present disclosure.

BEST MODE FOR INVENTION

Figure 22:
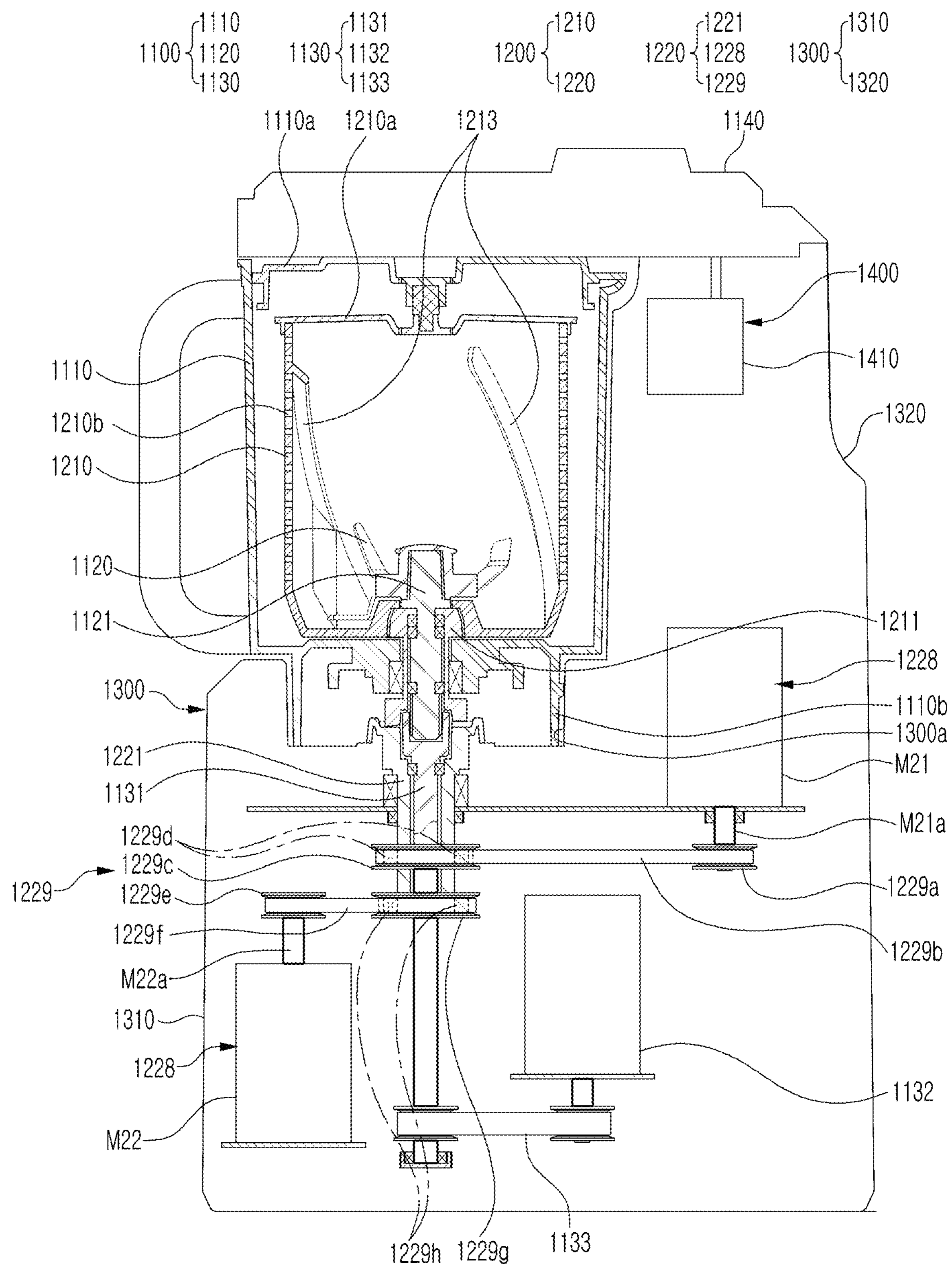
FIG. 22 is a view illustrating the inside according to another embodiment of the present disclosure, in the blender of FIG. 16.

FIG. 1 is a view illustrating the inside of a blender according to an embodiment of the present disclosure, and FIG. 2 is an enlarged view of portion ‘A’ of FIG. 1.

FIG. 3 is a perspective view illustrating an internal cylinder of the blender of FIG. 1, and FIG. 4 is a view illustrating that the internal cylinder of FIG. 3 rotates in forward and reverse directions.

Referring to the drawings, a blender according to the present disclosure may include a blender body 100, an internal cylinder unit 200, and a controller (not illustrated).

The blender body 100 may include an external cylinder 110, grinding blade 120, and a blade driving portion 130.

Specifically, the external cylinder 110 may be a cylinder in which an internal cylinder 210 of the internal cylinder unit 200 is disposed, may have a structure in which an upper portion thereof is open upward, and may be configured to be opened or closed by an external cover 140.

The grinding blade 120 may be disposed inside the internal cylinder 210, and may serve to grind blending objects in the external cylinder 110 while rotating. In this case, the blending objects refer to foods to be ground by an operation of the blender.

The blade driving portion 130 may be configured to provide driving force to rotate the grinding blade 120, and may include a blade rotation shaft 131 and a blade driving motor M1. In this case, the blade rotation shaft 131 may be connected to the grinding blade 120 in a vertical direction, and the blade driving motor M1 may be connected to the blade rotation shaft 131. For example, the blade rotation shaft 131 maybe connected to a central portion of the grinding blade 120, disposed in a transverse direction, to extend in a longitudinal direction. In addition, the blade rotation shaft 131 may connect the grinding blade 120 and the blade driving motor M1 to each other to transmit rotation driving force to the grinding blade 120 such that the grinding blade 120 is rotationally driven when the blade driving motor M1 operates.

The internal cylinder unit 200 may include an internal cylinder 210 and an internal cylinder driving portion 220.

The internal cylinder 210 may be disposed inside the external cylinder 110, and a projection 211 may be formed on an internal side surface of the internal cylinder 210 such that blending objects, rotating and flowing while being ground by the grinding blade 120, are caught.

For reference, the term "internal cylinder" used in the present specification refers to a rotary cylinder and a structure, including such an internal cylinder and a projection and a guide portion to be described later, refers to a cylinder structure for a blender.

The internal cylinder driving portion 220 may be connected to the internal cylinder 210 to serve to rotate the internal cylinder 210, and may be provided independently of the blade driving portion 130 for rotationally driving the grinding blade 120.

Although not illustrated in the drawings, the internal cylinder driving unit and the blade driving unit may be implemented by a single driving unit. In this case, the driving unit may serve as an internal cylinder driving unit for driving an internal cylinder or a blade driving unit for driving grinding blade using a driving force transmission medium such a clutch.

The controller (not illustrated) may be electrically connected to the blade driving portion 130 and the internal cylinder driving portion 220 to serve to control the blade driving portion 130 and the internal cylinder driving portion 220.

In an existing blender, grinding blade rotates in only one direction, so that blending objects continuously rotate within a blender cylinder in only one direction. Since the blending objects are maintained like a wall in the state of being pushed out to a side of an internal side surface of the blender and do not return to the grinding blade, grinding performance may be significantly reduced.

Even in an existing blender, projections may be formed on an internal wall of a blender cylinder to create a certain degree of vortex in the blending objects. However, this is also implemented as a flow having a regular pattern, so that the blending objects are not well ground.

Accordingly, to create an irregular flow of blending objects, the blender according to the present disclosure may control the internal cylinder driving portion 220 to blend the blending objects while changing a rotational direction of the internal cylinder 210, as illustrated in FIG. 4.

As a specific embodiment, the controller may control the blade driving portion (130 in FIG. 2) and the internal cylinder driving portion (220 in FIG. 2) such that the grinding blade 120 and the internal cylinder 210 rotate in opposing directions.

In this case, the controller may allow the internal cylinder driving portion 220 to be repeatedly powered on and off. Thus, when the internal cylinder driving portion 220 is powered off, the internal cylinder 210 may rotate in a forward direction with no power and then rotate in a reverse direction in conjunction with rotational force of the blending objects generated by the grinding blade 120.

For example, the controller may repeatedly power on and off the internal cylinder driving portion 220 while controlling the blade driving portion 130 and the internal cylinder driving portion 220 such that the grinding blade 120 and the internal cylinder 210 rotate in opposing directions. Thus, when the internal cylinder driving portion 220 is powered on, the internal cylinder 210 may rotate in a reverse direction (in a direction opposing a rotational direction of the grinding blade). Meanwhile, when the internal cylinder driving portion 220 is powered off, rotational speed of the internal cylinder 210 may be gradually decreased while the internal cylinder 210 inertially rotates with no power, and then the internal cylinder 210 may be guided by the rotational force of the blending objects, generated by the grinding blade 120, to rotate in a forward direction (in the same direction as the rotational direction of the grinding blade 120).

In other words, only when the controller powers on the internal cylinder driving portion 220, the internal cylinder 210 may receive the driving force from the internal cylinder driving portion 220 to rotate in the reverse direction. Meanwhile, when the controller powers off the internal cylinder driving portion 220, the internal cylinder 210 may not receive power from the internal cylinder driving portion 220, and thus, may internally rotate and then rotate in the forward direction in conjunction with the rotational force of the blending objects.

In particular, to break a state of balance of the blending objects in the internal cylinder 210, the controller may control the internal cylinder driving portion 220 to blend the blending objects while repeatedly performing an operating pattern in which the internal cylinder 210 rotates in a reverse direction opposing the rotational direction of the grinding blade 120 and then stopped, or an operating pattern in which the internal cylinder 210 rotates in the reverse direction and then changes rotational speed.

In another embodiment, although not illustrated in the drawings, the internal cylinder driving portion 220 may include a DC motor and a switch circuit, or an AC motor and an inverter, allowing the internal cylinder 210 to rotate forward or reverse with the driving force of the internal cylinder driving portion 220 under the control of the controller.

For example, as the switch circuit or the inverter of the internal cylinder driving portion 220 is used, the internal cylinder 210 may receive the driving force from the internal cylinder driving portion 220 to be driven and rotated not only when the internal cylinder 210 rotates in a reverse direction under the control of the controller but also when the internal cylinder 210 rotates in a forward direction under the control of the controller.

As described above, in the blender according to the present disclosure, the controller may control the internally cylinder driving portion 220 to blend blending objects while changing a rotational direction of the internal cylinder 210. In particular, the internal cylinder driving portion 220 may be repeatedly powered on and off to implement a change in rotation of the internal cylinder 210, in which the internal cylinder 210 rotates in a reverse direction for a certain period of time and is then stopped, and rotates again in the reverse direction for a certain period of time and is then stopped. Thus, as the state of balance of the blending objects may be broken, the blending objects are not piled up on an internal side surface of the internal cylinder 210 but may return to the rotating grinding blades 120 in the central portion of the internal portion of the internal cylinder to significantly improve grinding performance.

That is, the blender according to the present disclosure maybe configured to break the state of balance of the blending objects. Thus, the blending objects maintained like a wall on the internal side surface of the internal cylinder 210 may be pulled down to ultimately improve grinding performance for the blending objects.

Specifically, the blending objects are moved to the internal side surface of the internal cylinder 210 by the centrifugal force generated by the rotation of the grinding blade 120 during blending of the blending objects. In this case, when a force balance between particles of the blending objects is maintained, the blending objects may not be moved and may be then stopped. Accordingly, the blending objects may not be moved to the grinding blade 120, and thus, may not be ground any longer.

The force balance between the particles of the blending objects may be changed such that there may be a state of unbalance by changing the rotational direction of the internal cylinder 210 in the blender or by repeatedly performing an operating pattern in which the internal cylinder 210 rotates in a reverse direction and is then stopped, or an operating pattern in which the internal cylinder 210 rotates in a reverse direction and then changes rotational speed, so that the particles may flow again. While the particles flow, the blending objects may be moved to the grinding blade 120 to be continuously ground.

In addition, the blender according to the present disclosure may further improve a grinding effect of the blending object due to a structure of shape of the projections 211 when the blade driving portion 130 and the internal cylinder driving portion 220 rotate the grinding blade 120 and the internal cylinder 210 in opposing directions under the condition in which the grinding blade 120 is disposed inside the internal cylinder 210 or, in particular, when repeatedly performing an operating pattern in which the internal cylinder 210 rotates in a reverse direction and is then stopped or an operating pattern in which the internal cylinder 210 rotates in a reverse direction and then changes rotational speed.

Specifically, the projection 211 may have a screw projection line shape, inducing a downward spiral flow of the blending objects, such that the blending objects flow downwardly while rotating in a direction opposing the rotational direction of the grinding blade 120.

Hereinafter, the flow of the blending objects, flowing rotationally in one direction due to the grinding blade 120, will be described. The grinding blade 120 is disposed on an lower internal portion of the internal cylinder 210, so that the blending objects may pushed out to the internal side surface of the internal cylinder 210 and then may rise up along the internal side surface of the internal cylinder 210 when the grinding blade 120 rotate. Accordingly, the blending objects, flowing upward while receiving centrifugal force, may barely flow to the grinding blade 120 disposed on the lower internal portion of the internal cylinder 210.

Accordingly, when the grinding blade 120 and the internal cylinder 210 rotate in opposing directions in order for the flowing blending objects to flow to the grinding blade 120 disposed on the lower internal portion of the internal cylinder 210, the projections 211 may have a shape of a screw projection line such that the blending objects flow downwardly while rotating in a direction opposing the rotational direction of the grinding blade 120. Thus, a downward spiral flow of the blending object may be induced, as illustrated in FIG. 5.

For example, the blending objects, touching the internal side surface of the internal cylinder 210 while flowing rotationally in one direction, may descend along a spiral structure of a screw projection line while colliding against the screw projection line rotating in an opposite direction. Thus, the blending objects may flow to the grinding blade 120, disposed on the lower internal portion of the internal cylinder 210, to further improve the grinding effect of the blender.

Hereinafter, blending object grinding effects will be described based on time-dependent ground states by comparing the above-configured blender according to the present disclosure with blenders according to first and second relate arts with reference to FIGS. 6 to 8.

FIG. 6 illustrates time-dependent results of grinding garlic, a blending object, by a blender according to the present disclosure and blenders according to the first related art and the second related art.

The blender according to the present disclosure started to grind garlic after putting the garlic therein. About 50% of the overall amount of the garlic was ground after three seconds, about 80% was ground after 15 seconds, and about 100% was ground after a minute.

Meanwhile, the blender according to the first related art started to grind garlic after putting the garlic therein. About 20% of the overall amount of the garlic was ground after three seconds, about 30% was ground after 15 seconds, and about 40% was ground after a minute.

In addition, the blender according to the second related art started to grind garlic after putting the garlic therein. About 10% of the overall amount of the garlic was ground after three seconds, about 30% was ground after 15 seconds, and about 40% was ground after a minute.

FIG. 7 illustrates time-dependent results of grinding apple, a blending object, by a blender according to the present disclosure and blenders according to the first related art and the second related art.

The blender according to the present disclosure started to grind apple after putting the apple therein. About 50% of the overall amount of the apple was ground after three seconds, about 70% was ground after 15 seconds, and about 80% was ground after a minute.

Meanwhile, the blender according to the first related art started to grind apple after putting the apple therein. About 20% of the overall amount of the apple was ground after three seconds, about 30% was ground after 15 seconds, and about 40% was ground after a minute.

In addition, the blender according to the second related art started to grind apple after putting the apple therein.

About 10% of the overall amount of the apple was ground after three seconds, about 10% was ground after 15 seconds, and about 10% was ground after a minute.

FIG. 8 illustrates time-dependent results of grinding celery, a blending object, by a blender according to the present disclosure and blenders according to the first related art and the second related art.

The blender according to the present disclosure started to grind celery after putting the celery therein. About 60% of the overall amount of the celery was ground after three seconds, about 80% was ground after 15 seconds, and about 90% was ground after a minute.

Meanwhile, the blender according to the first related art started to grind celery after putting the celery therein. About 5% of the overall amount of the celery was ground after three seconds, about 10% was ground after 15 seconds, and about 10% was ground after a minute.

In addition, the blender according to the second related art started to grind celery after putting the celery therein. About 5% of the overall amount of the celery was ground after three seconds, about 10% was ground after 15 seconds, and about 10% was ground after a minute.

To sum up the above results, the blenders according to the first and second related arts started to grind a blending object after putting the blending object therein. After three seconds, a small amount of the blending object was ground. After 15 seconds, the amount of grinding the blending object was slightly increased. From 15 seconds to a minute, the amount of grinding the blending object was little changed.

This demonstrates that in the blenders according to the first and second related arts, the blending objects were maintained in a state of balance from 15 second to a minute to maintain a state in which the blending objects were not ground any more.

For example, in the blenders according to the first and second related arts, the blending objects are moved to an internal side surface of an internal cylinder by centrifugal force generated by rotation of grinding blade. In this case, when force balance between particles of the blending objects is maintained, the blending objects are not moved and then stopped. Since the blending objects are not moved to the grinding blade, the blending objects are not ground any more.

Meanwhile, the blender according to the present disclosure started to grind a blending object after putting the blending object therein. After three seconds, more than half of the blending object was ground. Even after 15 seconds, the amount of grinding the blending object was continuously increased. Even until a minute, the amount of grinding the blending object was steadily increased. Thus, most of the blending object was ground. As a result, the blender according to the present disclosure has a high grinding effect.

Hereinafter, the configuration to implement such an effect will be described. In the blender according to the present disclosure, the controller may control the internal cylinder driving portion 220 to blend the blending objects while changing the rotational direction of the internal cylinder, so that the state of balance of the blending objects maybe broken to prevent the blending objects from being piled up like a wall on the internal side surface of the internal cylinder 210, and the grinding object may return to the grinding blade 120 to significantly improve grinding performance.

For example, as the rotational direction of the internal cylinder 210 of the blender according to the present disclosure is changed, the force balance between the particles of the blending objects may be broken to cause force imbalance between the particles. Thus, the particles may flow again. While the particles flow, the blending objects may be moved to the grinding blade 120 to be continuously ground.

The controller may control the internal cylinder driving portion 220 and the blade driving portion 130 to rotate the grinding blade 120 after rotating the internal cylinder 210.

In blending objects rotating in conjunction with the rotation of the grinding blade 120 and the internal cylinder 210, the grinding blade 120 may substantially greater rotational driving force than the internal cylinder 210.

For this reason, when the grinding blade 120 rotates ahead of the internal cylinder 210, the blending objects may rotate at significantly high speed due to the grinding blade 120, so that the blending objects do not rotate in the reverse direction in a short time even when the internal cylinder 210 rotates in the reverse direction. As a result, the state of balance of the blending objects may not be rapidly broken.

To address the above issue, the internal cylinder 210 rotates ahead of the grinding blade 120. Accordingly, when the grinding blade 120 rotates at high speed while the blending objects rotate in a reverse direction due to rotational force of the internal cylinder 210, the state of balance of the blending objects may be barely maintained. As a result, the blending objects may be ground in a shorter time.

In addition, the controller may control the internal cylinder driving portion 220 and the blade driving portion 130 such that the internal cylinder 210 and the grinding blade 120 may be simultaneously stopped at least once or only the grinding blade 120 may be stopped at least once during rotation of the internal cylinder 210 and the grinding blade 120.

Accordingly, the blending objects rotated by the grinding blade 120 or reversely rotated by the internal cylinder 210 may not be provided with a rotational force momentarily and simultaneously, so that the blending objects may be momentarily decelerated to further increase irregular flow of the blending objects. Thus, an effect of breaking the state of balance of the blending objects may be further improved.

The internal cylinder 210 and the grinding blade 120, operating in the above-described operation, may be represented as illustrated in FIG. 9 when an X-axis denotes time.

Specifically, when the blender according to the present disclosure operates, the internal cylinder driving portion 220 may be controlled to repeatedly operate and stop the internal cylinder 210, as in operations A1 to AN.

As in the operation A1 of the cylinder 210 and an operation B1 of the grinding blade 120, when the blender according to the present disclosure operates first, the internal cylinder 210 may operate, and then the grinding blade may operate.

As in an operation A3 of the internal cylinder 210 and an operation B3 of the grinding blade 120, the grinding blade 120 may be stopped during rotation of the internal cylinder 210. As in an operation B4 of the grinding blade 120 and an operation A4 of the internal cylinder 210, the internal cylinder 210 may be stopped during rotation of the grinding blade 120. In such an operating pattern, the internal cylinder driving portion 220 and the blade driving portion 130 may be controlled.

Furthermore, operating times in the respective operations A1 to AN of the internal cylinder 110 may be controlled to be entirely or partially different, and the operating times of respective operations B1 to BN of the grinding blade 120 may be controlled to be entirely or partially different.

As illustrated in FIGS. 11 and 12, a guide portion 211 may be formed in the internal cylinder 210 of the blender according to the present disclosure.

When the blender according to the present disclosure operates, the internal cylinder 210 rotates (clockwise as illustrated in the drawings), and then the grinding blade (120 in FIG. 10) rotates in a direction opposing the rotational direction of the internal cylinder 210 (counterclockwise as illustrated in the drawings). In this case, the grinding blade 120 may have significantly small rotational force before rotation at high speed (an initial operation), so that blending objects may not rotate and may be stopped when the blending objects are caught between the grinding blade 120 and the projection (211 in FIG. 10).

For example, when the grinding blade 120 is blocked at the beginning of operation by the blending object supported by the projection 211, the blending objects may not be ground and may be stopped due to small rotational force at the beginning of the operation. Ultimately, the blending objects are barely ground.

As an example, as illustrated in a 10 o'clock position in FIG. 10, carrot 'C', a blending object, is caught between grinding blade 120 and a projection 211, so that the grinding blade 120 may not rotate anymore and may be stopped even when the grinding blade 120 is continuously provided with driving force by a blade driving portion (130 of FIG. 2).

To address the above issue in the initial operation of the blender, the blender according to the present disclosure may include an internal cylinder 210 according to another embodiment, as illustrated in FIGS. 11 and 12.

The internal cylinder 210 may include a guide portion 212 to prevent blending objects from being caught between grinding blade (120 in FIG. 9) and a projection 211.

The guide portion 212 maybe formed in a lower side portion of the projection 211 disposed in a lateral direction of the grinding blade 120, and may have a structure to guide blending objects to a center of an internal cylinder 210.

For example, the guide portion 212 may be formed in the lateral direction of the grinding blade 120 in a lower portion of an internal cylinder 210, rather than an upper portion of the internal cylinder 210, to guide and move the blending objects between the grinding blade 120 and the projection 211. Accordingly, when the blending objects are pushed by the grinding blade 120 to be moved to the projection 211, the blending objects may not be caught by the projection 211 and may reach the guide portion 212 to be guided and moved to the center of the internal cylinder 210 by guide portion 212. Specifically, the guide portion 212 may be formed between a lower surface of the projection 211 and an internal lower surface of the internal cylinder 210, and may have a slide surface **212*a* tilted in a rotational direction of the grinding blade 120 while extending from the internal side surface of the internal cylinder 210 to the center of the internal cylinder 210**.

The slide surface **212*a* may be tilted in a reverse rotational direction of the grinding blade 120 or in a reverse radial direction of the internal cylinder 210, rather in the rotational direction of the grinding blade 120. In this case, even when the grinding blade 120 push blending objects while rotating, the blending objects may not slide to the center of the internal cylinder 210 from the slide surface 212*a* and may be continuously maintained in a state of being caught between the grinding blade 120 and the projection 211**.

In this regard, the slide the guide portion 212 may have the structure in which the slide surface **212*a* is tilted in the rotational direction of the grinding blade 120 while extending from the internal side surface of the internal cylinder 210 to the center of the internal cylinder 210. Accordingly, when the blending objects are pushed by the grinding blade 120 to reach the slide surface 212*a*, the blending objects maybe slid on the slide surface 212*a* to be moved to the center of the internal cylinder 210**.

As described above, as the blending objects are slidably moved by the slide surface **212*a* to get out of a space between the grinding blade 120 and the projection 211, the grinding blade 120 may not be blocked by the blending objects and may continuously rotate. Thus, an operation of grinding the blending objects by the grinding blade 120** may be performed.

In the drawings, aside edge of the center of the internal cylinder 210 is illustrated as having an unbent shape. However, in another embodiment, the side edge may be bent in the rotational direction of the grinding blade 120 when the grinding blade 120 and the internal cylinder 210 rotate in opposing directions.

Accordingly, the blending objects sliding on the slide surface **212*a* may be more smoothly slidably moved to the center of the internal cylinder 210 without being caught on the slide surface 212*a* even by the side edge of the center of the internal cylinder 210**.

In addition, the slide surface **212*a* of the guide portion 212 may be tilted at an angle of, in detail, 20 degrees to 40 degrees in the rotational direction of the grinding blade 120, based on the reverse radial direction of the internal cylinder 210**.

When the tilt angle of the slide surface **212*a* is narrower than 20 degrees, the slide surface 212*a* may get close to an imaginary line of the internal cylinder 210 in the reverse radial direction, so that a direction in which the blending objects are pressed by the grinding blade 120 and the slide surface 212*a* are close to vertical. Accordingly, it may be difficult for the blending objects to slide to the center the internal cylinder 210 via the slide surface 212*a***.

When the tilt angle of the slide surface **212*a* is greater than 40 degrees, the guide portion 212 may occupy a large amount of an internal space of the internal cylinder 210** to decrease a capacity of accommodating blending objects. Ultimately, the amount of blending the blending objects may also be decreased.

As an improved embodiment, the projection 211 may be tilted in the rotational direction of the internal cylinder 210 while protruding from the internal side surface of the internal cylinder 210 to the center of the internal cylinder 210.

Accordingly, when the internal cylinder 210 rotates in a direction opposing the grinding blade 120, the projection 211 may have greater holding force to hold the blending objects. Thus, an action of rotating the blending objects in a reverse direction may be further greater.

For reference, the tilted structure of the projection 211 means that a surface of the projection 211, disposed on a side in the rotational direction of the internal cylinder 210, is titled.

The projection 211 may be tiled at an angle of, in detail, 20 to 60 degrees in the rotational direction of the internal cylinder 210, based on the reverse radial direction of the internal cylinder 210.

When the tilt angle of the projection 211 is narrower than 20 degrees, a tilted surface of the projection 211 may get close to an imaginary line of the internal cylinder 210 in the reverse radiation direction. Accordingly, when the internal cylinder 210 rotates in a direction opposing the grinding blade 120, the projection 211 may have lower degree of holding force to hold the blending objects. Thus, reverse rotation of the blending objects may not occur sufficiently.

When the tilt angle of the projection 211 is greater than 60 degrees, a space between an internal side surface of the internal cylinder 210 and the projection 211 may be reduced.

Thus, the amount of holding the blending objects maybe reduced and, ultimately, rotation of the blending objects may not occur sufficiently.

The projection 211 may include a plurality of projections 211 formed along an internal circumferential surface of the internal cylinder 210. In another embodiment, cross-sections of two adjacent projections 211, among a plurality of projections 211, may be different from each other, as illustrated in FIG. 13.

When cross-sections of adjacent two projections 211 are different from each other, vortex of the blending objects generated by the projections 211 may have different irregular flows. Thus, grinding performance of the blender according to the present disclosure may be improved.

As a specific example, the projection 211 may have a rectangular or curved cross-section, as illustrated in the drawing.

In addition, rotational speed of the internal cylinder 210 may be, in detail, 60 rpm to 400 rpm.

When the rotational speed of the internal cylinder 210 is higher than 400 rpm, force to draw the blending objects to the internal side surface of the internal cylinder 210 may be increased to reduce the grinding performance of the blender.

When the rotational speed of the internal cylinder 210 is within the range of 60 rpm to 400 rpm, force to draw the blending objects to the internal side surface of the internal cylinder 210 may be significantly decreased, and thus, the grinding performance of the blender may not be reduced.

Of course, when the rotational speed of the internal cylinder 210 is lower than 60 rpm, the internal cylinder 210 may rotate only in a direction in which the blending objects are rotated by the grinding blade 120 and may barely rotate in a reverse direction. Therefore, the rotation of the internal cylinder 210 may be meaningless.

An arrangement structure of the blade driving portion 130 and the internal cylinder driving portion 220 according to an example embodiment, described above, will be described in detail with reference to FIGS. 1 and 2.

Both the blade driving portion 130 and the internal cylinder driving portion 220 may be disposed below the internal cylinder 210. Alternatively, the blade driving portion 130 may be disposed below the internal cylinder 210, and the internal cylinder driving portion 220 may be disposed above the internal cylinder driving portion 220.

A description will be provided as to the structure in which both the blade driving portion 130 and the internal cylinder driving portion 220 are disposed below the internal cylinder 210. The blade driving portion 130 may be disposed below the grinding blade 120, and the internal cylinder driving portion 220 may be disposed below the internal cylinder 210. As illustrated in the drawing, the blade driving portion 130 and the internal cylinder driving portion 220 may have a structure in which a blade driving motor M1 of the blade driving portion 130 and an internal cylinder driving motor M2 of the internal cylinder driving portion 220 are embedded in a support block 150 disposed below a blender body 100.

In addition, a description will be provided as to the structure in which the blade driving portion 130 is disposed below the internal cylinder 210 and the internal cylinder driving portion 220 is disposed above the internal cylinder 210. The blade driving portion 130 may be disposed on a lower side of the grinding blade 120, and the internal cylinder driving portion 220 may be disposed above the internal cylinder 210.

As illustrated in the drawing, the blade driving portion 130 and the internal cylinder driving portion 220 may have a structure in which a blade driving motor M1 of the blade driving portion 130 is embedded in a support block 150 disposed below the blender body 100 and, although not illustrated in the drawing, an internal cylinder driving motor M2 of the internal cylinder driving portion 220 is mounted on an external cylinder cover 140, as an example.

Hereinafter, internal configurations of the blade driving portion 130 and the internal cylinder driving portion 220 will be described in more detail.

The blade driving portion 130 may include a blade rotation shaft 131, connected to the grinding blade 120 in a vertical direction, and a blade driving motor M1 connected to the blade rotation shaft 131 to rotate the blade rotation shaft 131.

The internal cylinder driving portion 220 may include a rotation bracket 221 on which the internal cylinder 210 is mounted, an internal cylinder rotation shaft 222 connected from the rotation bracket 221 in the vertical direction, and an internal cylinder driving motor M2 connected to the internal cylinder rotation shaft 222 to rotate the internal cylinder rotation shaft 222.

As an example, as illustrated in the drawing, the rotation bracket 221 may be disposed on the bottom of the external cylinder 110, the blade rotation shaft 131 may be disposed in a hollow 222*a* of the internal rotation shaft 222, and the internal cylinder rotation shaft 222 may be connected to the internal cylinder driving motor M2, disposed on one side, through a driving transmission belt.

For reference, a seating base 151, on which the external cylinder 110 is seated and coupled, may be mounted above the support block 150, and a blade rotation shaft 131 penetrating through the seating base 151 and a shaft bearing 152 rolling and supporting the internal cylinder rotation shaft 222 may be mounted on the seating base 151.

The internal cylinder unit 200 may further include an internal cylinder cover 230 covered with the internal cylinder 210 to be clamped.

As illustrated in FIG. 14, a central projection 231 may be formed on the internal cylinder cover 230, and the blender body 100 may be formed to have a projection support groove 140*a* in which the central projection 231 of the internal cylinder cover 230 is inserted to be rotationally supported. The projection support groove 140*a* may be formed in the external cylinder cover 140.

As a lower portion of the internal cylinder 210 is connected to the internal cylinder driving portion 220 to rotationally drive the internal cylinder 210, an upper portion of the internal cylinder 210 may be shaken. To prevent such shaking of the upper portion of the internal cylinder 220, the upper portion of the internal cylinder 210 may covered with the internal cylinder cover 230 to support the upper portion of the internal cylinder 210, and then the central projection 231 of the internal cover 230 may be inserted into the projection support groove 140*a* of the external cylinder cover 140 to support the upper portion of the internal cylinder 220. Thus, the upper portion of the internal cylinder 220 may be solidly and stably supported during rotation of the internal cylinder 210. In this case, the projection support groove 140*a* of the external cylinder cover 140 may be a central hole in a side of an inner race of a cover bearing 1041 mounted below the external cylinder cover 140.

Together with the above-described projection support structure or as another embodiment, a support roller 111 may be mounted in the external cylinder 110 to support an external side surface of the internal cylinder 210. The support roller 111 may support the external surface of the internal cylinder 210, in particular, an upper portion of the internal cylinder 210, as illustrated in the drawing, to solidly and stably support the upper portion of the internal cylinder 210.

As illustrated in FIG. 3, the internal cylinder 210 may have a plurality of drain holes 210*a* formed in a side portion of the internal cylinder 210 to dehydrate blending objects during rotation.

A blending object may be put in the internal cylinder 210, and may be then ground during rotation of grinding blade 120 disposed inside the internal cylinder 210, and the internal cylinder 210 may simultaneously rotate to push a liquid (juice), included in the blending object to an external side of the internal cylinder 120 through the drain hole 210*a*.

Of course, the internal cylinder 210 may have a structure in which a drain hole is not formed, as illustrated in FIGS. 6 to 12.

For reference, an internal cylinder 210 illustrated in FIG. 15A may be a grinding specific-purpose internal cylinder, and an internal cylinder 210 illustrated in FIG. 15B may be a dehydration specific-purpose internal cylinder.

Specifically, the internal cylinder 120 having no drain hole, as illustrated in FIG. 15A, may be used to prevent a dehydration function from being implemented during rotation of the grinding blade 120. When such an internal cylinder 210 is used, an action of inducing a downward spiral flow of the blending object, a function of the above-described projection 211, may be implemented. Then, when a dehydration function is required, the internal cylinder 210 may be replaced with an internal cylinder 210 in which a drain hole 210*a* is formed, and the ground blending objects may be input in the replaced internal cylinder 210, and then the blender may operate.

The internal cylinder 210 may be replaced with the internal cylinder 210, illustrated in FIG. 3, to simultaneously implement the grinding function of the grinding blade 120. The internal cylinder 210 may be replaced with the internal cylinder 210, in which only a drain hole 210*a* is formed, as illustrated in FIG. 15B, to implement only a dehydration function without implementing the grinding function of the grinding blade 120.

In this case, a lower groove 210*b* may be formed on a lower surface facing the external cylinder 110 such that the grinding blade 120 is disposed on an external side of the internal cylinder 210. The grinding blade 120 may be disposed to be inserted into the lower groove 210*b*.

As illustrated in FIG. 1, a discharge pipe 112 may be formed on a lower portion of the external pipe 110 to discharge a liquid, dehydrated from the blending object, to an external entity. An opening and closing value may be mounted on the discharge pipe 112.

As illustrated in FIG. 1, the blender according to the present disclosure may further include a vacuum unit 300 configured to establish vacuum in the internal cylinder 210.

The vacuum unit 300 may include a suction pipe 310, connected to the internal cylinder 210, and a vacuum driving portion communicating with the suction pipe 310. The vacuum driving portion may include a vacuum motor M3 and a vacuum pump P.

A blending operation, including a grinding operation and a dehydration operation, may be performed in a vacuum by the above-configured vacuum unit 300. Thus, blending objects including fruits, vegetables, or the like, may be blended in the state in which the blending objects are not oxidized, so that fresh and nutrient-undestroyed liquid (juice) may be obtained.

As an example, the blender body 100 may further include a support block 150, supporting the external cylinder 110, and a handle 160 connecting the external cylinder 110 and the support block 150 to each other. The vacuum driving portion may be embedded in the support block 150, and the suction pipe 310 may be embedded in the handle 160.

As another example, as partially illustrated in FIGS. 6 to 8, a handle may be connected to only an external cylinder and a support block may extend to an upper portion of a support block. In this case, a suction pipe communicating with an internal cylinder may be embedded in a vertical connection portion.

In addition, it will be understood that in the blender according to the present disclosure, a detailed structure of the vacuum unit is not limited to the present disclosure, and the vacuum unit may employ any structure according to the related art.

For reference, the support block 150 may include a control unit configured to control the blade driving motor M1 of the blade driving portion 130, the internal cylinder driving motor M2 of the internal cylinder driving portion 220, and the vacuum motor M3 of the vacuum driving portion, described above. In addition, an input panel and a display panel of the controller may be mounted on an external surface.

As a result, the blender according to the present disclosure may control the internal cylinder driving portion 220 to blend blending objects while repeatedly performing an operating pattern in which a controller changes a rotational direction of the internal cylinder 210 or the internal cylinder 210 rotates in a reverse direction opposing a rotational direction of the grinding blade 120, and is then stopped, or an operating pattern in which the internal cylinder 210 rotates in the reverse direction, and then changes rotational speed. Accordingly, an irregular flow of the blending objects may occur, so that the blending objects may not be piled up on the internal side surface of the internal cylinder 210 like a wall and may return to the grinding blade 120 rotating in a central portion of the internal cylinder 210. Thus, grinding performance may be significantly improved.

That is, the blender according to the present disclosure may be configured to achieve an irregular flow of blending objects. Thus, the blender may break down the blending objects maintained like a wall on the internal side surface of the internal cylinder 210 to ultimately improve grinding performance for the blending objects.

Furthermore, in the blender according to the present disclosure, the projection 211 having a screw projection line shape inducing a downward spiral flow of the blending object may be provided on the internal side surface of the internal cylinder 210 such that the blending objects flows downward while rotating in a direction opposing the rotational direction of the grinding blade 120. Thus, the blending objects, flowing upward while being radially pushed by centrifugal force, may flow to the grinding blade 120 disposed below the internal cylinder 210. As a result, a grinding effect of the blender may be further increased.

In the blender according to the present disclosure, a guide portion 212 may be formed below the projection 211, disposed in a lateral direction of the grinding blade 120, to slidably guide blending objects to a center of the internal cylinder 210. The guide portion 212 may prevent the blending objects from being caught between the grinding blade 120 and the projection 211. Thus, rotation of the grinding blade 120 may be prevented from being stopped at the beginning of operation of the blender.

In addition, the blender according to the present disclosure may have a structure in which the projection 211 is tilted in the rotational direction of the internal cylinder 210 while protruding from the internal side surface of the internal cylinder 210 to the center of the internal cylinder 210. Due to the structure, holding force to hold the blending objects maybe further increased when the internal cylinder 210 rotates in a direction opposing the grinding blade 120. Thus, an action of reverse rotation of the blending objects may be further strongly performed.

FIG. 16 is a view illustrating a blender according to another embodiment of the present disclosure, FIG. 17 is a view illustrating the inside of the blender of FIG. 16, and FIGS. 18 and 19 are views illustrating operating states of an internal cylinder driving unit in the blender in FIG. 17.

Referring to the drawings, a blender according to another embodiment may include a blender body 1100 and an internal cylinder unit 1200.

The blender body 1100 may include an external cylinder 1110, a grinding blade 1120, and a blade driving portion 1130.

Specifically, the external cylinder 1110 may have a closed lower surface and an open upper portion (a open top structure), and may be configured to be covered with a blender cover 1140.

The external cylinder 1110 may be seated in a cylinder support case 1300 to be described later. Before the external cylinder 1110 is covered with a blender cover 1140, an external cylinder cover **1110*a* may cover an upper portion of the external cylinder 1110 to close the external cylinder 111. A suction hole may be formed in the external cylinder cover 1110*a* such that vacuum is established in the external cylinder 1110 by a vacuum unit 1400** to be described later.

In addition, a discharge portion (not illustrated) may be formed to extract juice without separating the external cylinder 1110 from the cylinder support case 1300 when the juice is extracted from a blending object through a dehydration hole **1210*b* of the internal cylinder 1210** by a dehydration process of the blending object to be described later.

In this case, the blending object refers to food ground by an operation of a blender to produce juice.

The grinding blade 1120 may be disposed inside the internal cylinder 1210, and may serve to grind and liquefy blending objects in the internal cylinder 1210 when the grinding blade 1120 rotates.

The blade driving unit 1130 may be configured to rotate the grinding blade 1120.

The external cylinder 1110 may be supported by the cylinder support case 1300, and the cylinder support case 1300 may have an overall L shape, as illustrated in the drawings.

The cylinder support case 1300 may include a lower casing portion 1310, disposed below the external cylinder 1110, and a side casing portion 1320 extending upwardly of the lower casing portion 1310 to be connected to the blender cover 1140.

Specifically, the external cylinder 1110 may be seated on an upper surface of the lower casing portion 1310 disposed in a traverse direction, and the blender cover 1140 may be hingedly coupled to an upper end of the side casing portion 1320, extending upwardly of the lower casing portion 1310 to be disposed in a longitudinal direction, to rotate up and down.

The blade driving portion 1130 and an internal cylinder driving portion 1220 to be described later may be mounted in the cylinder support case 1300. When the external cylinder 1110, in which the internal cylinder 1210 is embedded, is seated on the cylinder support case 1300, the grinding blade 1120 disposed inside the internal cylinder 1210 and the blade driving portion 1130 mounted on the cylinder support case 1300 maybe connected to each other to transmit driving force, and internal cylinder 1210 mounted in the external cylinder 1110 and the internal cylinder driving portion 1220 mounted on the cylinder support case 1300 may be connected to each other to transmit driving force.

More specifically, the external cylinder 1110 may be removably connected to the cylinder support case 1300. For example, a spiral projection fitted to the cylinder support case 1300 may be formed on an external circumferential surface of a lower projection **1110*b* of the external cylinder 1110, and a spiral groove may be formed on an internal circumferential surface of a seating groove 1300*a* of the cylinder support case 1300 in which the lower projection 1110*b* is seated. Accordingly, the projection may be fitted to the groove, so that the external cylinder 1110 may be mounted on the cylinder support case 1300** and may be reversely released to be separated therefrom.

In addition, the external cylinder 1110 may include a plurality of intermediate rotation shafts to transmit externally transmitted driving force to each of the grinding blade 1120 and the internal cylinder 1210 disposed therein. Specifically, the external cylinder 1110 may include a first intermediate rotation shaft 1121 and a second intermediate rotation shaft 1211 surrounding the first intermediate rotation shaft 1121.

The first intermediate rotation shaft 1121 may have a structure, capable of receiving power from a blade driving motor 1132 disposed in the cylinder support case 1300 and transmitting the received power to the grinding blade 1120. To this end, as an example, a lower portion of the first intermediate rotation shaft 1121 may be key-coupled to the blade rotation shaft 1131 of the blade driving portion 1130, and an upper portion thereof may be key-coupled to the grinding blade 1120.

The second intermediate rotation shaft 1211 may have a structure, capable of receiving power from the internal cylinder driving motor 1222 disposed in the cylinder support case 1300 and transmitting the received power to the internal cylinder 1210. To this end, as an example, a lower portion of the second intermediate rotation shaft 1211 may be key-coupled to the internal cylinder rotation shaft 1221 of the internal cylinder driving unit 1220, and an upper portion thereof may be key-coupled to the internal cylinder 1210.

In this case, a bearing may be disposed between the first intermediate rotation shaft 1121 and the second intermediate rotation shaft 1211 such that the first intermediate rotation shaft 1121 and the second intermediate rotation shaft 1211 may independently rotate.

The internal cylinder unit 1200 may include an internal cylinder 1210 and an internal cylinder driving portion 1220.

The internal cylinder 1210 may be mounted in the external cylinder 1110. Before the internal cylinder 1210 is seated on the cylinder support case 1300, the internal cylinder cover **11210*a* may cover an upper portion of the internal cylinder 1210 to close the internal cylinder 1210. A suction hole may be formed in the internal cylinder cover 1210*a* such that vacuum is established in the internal cylinder 1210 by the vacuum unit 1400** to be described later.

At least one projection 1213 may be formed on the internal side surface of the internal cylinder 1210 such that the blending objects, flowing rotationally while being ground by the grinding blade 1120, are caught.

When the grinding blade 1120 rotates while the blending objects are accommodated in the internal cylinder 1210, the blending objects may collide against a projection 1213 formed on the internal side surface of the internal cylinder

1210, rotating in an opposite direction, to generate a turbulence of the blending objects. In this case, the turbulence may be increased, so that a grinding effect of the blending objects may be increased.

In addition, the blending objects may flow upwardly while being radially pushed by centrifugal force generated by the rotation of the grinding blade 1120. A projection 1213 having a screw projection line shape, inducing a downward spiral flow of the blending objects, may be provided on the internal side surface of the internal cylinder 1210, so that the blending objects may flow to the grinding blade 1120 disposed on an internal lower side of the internal cylinder 1210. Thus, a grinding effect of the blender may be further increased.

To achieve irregular flow of the blending objects in the internal cylinder 1210, a controller (not illustrated) may control an internal cylinder driving motor 1222 of an internal cylinder driving portion 1220 to be described later to perform an operating pattern in which the internal cylinder 1210 rotates reversely in a direction opposing the grinding blade 1120 and is then stopped, or an operating pattern in which the internal cylinder 1210 rotates reversely and then changes rotational speed.

The internal cylinder 1210 may have a plurality of dehydration holes 1210*b* formed in a side portion thereof to perform a dehydration process such that only juice may be extracted from the blending object ground by the grinding blade 1120.

In the drawing, the dehydration holes 1210*b* are illustrated as being enlarged. However, the dehydration hole 1210 are actually significantly small holes, and may include a plurality of dehydration holes 1210*b* formed in the side portion of the internal cylinder 1210 to have a mesh structure. In addition, as illustrated in the drawing, the dehydration hole 1210*b* may be directly formed in the side portion of the internal cylinder 1210. Although not illustrated in the drawing, an additional member, for example, a mesh member may be mounted to be a portion of the side portion of the internal cylinder 1210.

In addition, the dehydration hole 1210*b* may be formed in a lower portion or the side portion of the internal cylinder 1210. In this case, the dehydration hole 1210*b* may be preferably formed in the side portion rather than the lower portion. Moreover, the dehydration hole 1210*b* may be more preferably formed in the side portion at a certain height or more. This is because when there is a certain amount of liquid (for example, additionally supplied water or juice produced from the blending object during grinding) during blending of the blending object, a blending effect may be increase.

Of course, even when the dehydration hole 1210*b* is formed in the side portion of the internal cylinder 1210 at a certain height or more, juice may be dehydrated through the dehydration hole 1210*b* to be discharged outwardly of the internal cylinder 1210 as the ground blending object easily moves to an upper side along the internal side surface of the internal cylinder 1210. This is because the internal cylinder 1210 may rotate at significantly higher speed in a dehydration operation of the blending object than in a grinding operation of the blending object.

The internal cylinder driving portion 1220 may be configured to rotate the internal cylinder 1210. Specifically, the internal cylinder driving portion 1220 may include an internal cylinder rotation shaft 1221, an internal cylinder driving motor 1222, and an internal cylinder driving connection portion 1223.

The above-described blade driving portion 1130 may include a blade rotation shaft 1131, a blade driving motor 1132, and a blade driving connection portion 1133.

The internal cylinder rotation shaft 1221 maybe connected to transmit rotational driving force to the lower portion of the internal cylinder 1210 embedded in the external cylinder 1110 when the external cylinder 1110 is seated in the cylinder support case 1300. The blade rotation shaft 1131 may be connected to transmit rotational driving force to the lower portion of the grinding blade 1120 embedded in the internal cylinder 1210 when the external cylinder 1110 is seated in the cylinder support case 1300.

In this case, the blade rotation shaft 1131 may be axially-rotationally mounted in a hollow formed in the internal cylinder rotation shaft 1221, so that the blade rotation shaft 1131 and the internal cylinder rotation shaft 1221 axially rotate independently.

For example, a bearing may be provided in the hollow of the internal cylinder rotation shaft 1221 to be mounted while penetrating through the blade rotation shaft 1131. Thus, the blade rotation shaft 1131 may axially rotate independently in the internal cylinder rotation shaft 1221.

The internal cylinder driving portion 1220 may have a structure in which a gear-coupled structure of the internal cylinder driving portion 1223 varies such that the internal cylinder 1210 has different rotational speeds in a grinding operation and a dehydration operation of the blending object.

For example, when the blending object is ground using the blender and is then dehydrated, the internal cylinder 1210 should rotate at higher speed during extraction of juice from the ground blending object (dehydration) than during grinding the blending object. To this end, when the blending object is ground, the internal cylinder driving connection portion 1223 may have a gear-coupled structure in which the internal cylinder 1210 rotates at lower speed than during the dehydration, and when the blending object is dehydrated, the internal cylinder driving connection portion 1223 may have a gear-coupled structure in which the internal cylinder 1210 rotates at higher speed than during the dehydration.

Accordingly, when the blending objects are ground, a torque is increased while decreasing reverse rotational speed of the internal cylinder 1210. Thus, among blending objects rotating in a forward direction due to forward rotation of the grinding blade, blending objects close to the internal side surface of the internal cylinder 1210 may smoothly rotate in a reverse direction. In addition, during dehydration of the ground blending objects, the rotational speed of the internal cylinder 1210 may be increased to be as high as possible, as compared with during grinding of the blending objects, to significantly increase the dehydration effect.

Specifically, the internal cylinder driving connection portion 1223 may be provided with a small driving gear 1223*b* and a large driving gear 1223*c*, mounted on the internal cylinder driving shaft 1223*a* connected to the internal cylinder driving motor 1222, and a large driven gear 1223*e* and a small driven gear 1223*f* mounted on the internal cylinder rotation shaft or an intermediate rotation shaft 1223*d* rotating in conjunction with the internal cylinder rotation shaft 1221.

The internal cylinder driving shaft 1223*a* and the internal cylinder rotation shaft 1221 may be disposed in parallel to each other. As an example, as an additional driving force transmission medium, an intermediate rotation shaft 1223*d* may be provided in parallel to the internal cylinder driving shaft 1223*a* and the internal cylinder rotation shaft 1221 when driving force is transmitted from the internal cylinder driving shaft 1223*a* to the internal cylinder rotation shaft 1221.

In this case, the large driven gear 1223*e* and the small driven gear 1223*f* may be directly mounted on the internal cylinder rotation shaft 1221 and, as illustrated in the drawing, may be mounted on the intermediate rotation shaft 1223*d*. In the present specification, a description will be provided as to an example in which the large driven gear 1223*e* and the small driven gear 1223*f* are mounted on the intermediate rotation shaft 1223*d*.

Therefore, it will be understood that an arrangement of the large driven gear 1223*e* and the small driven gear 1223*f* to be described later may be applied to the internal cylinder rotation shaft 1221 when the large driven gear 1223*e* and the small driven gear 1223*f* are directly mounted on the internal cylinder rotation shaft 1221.

The small driving gear 1223*b* and the large driving gear 1223*c* may be disposed on the internal cylinder driving shaft 1223*a* to be spaced apart from each other in an axial direction, and the large driven gear 1223*e* and the small driven gear 1223*f* may be disposed on the intermediate rotation shaft 1223*d* to be spaced apart from each other in the axial direction.

In this case, the small driving gear 1223*b* and the large driving gear 1223*c* may be sequentially disposed on the internal cylinder driving shaft 1223*a* and the large driven gear 1223*e* and the small driven gear 1223*f* may be sequentially disposed on the intermediate rotation shaft 1223*d* such that the small driving gear 1223*b* of the internal cylinder driving shaft 1223*a* corresponds to the large driven gear 1223*e* of the intermediate rotation shaft 1223*d* and the large driving gear 1223*c* of the internal cylinder driving gear 1223*a* corresponds to the small driven gear of the intermediate rotation shaft 1223*d*.

As an example, as illustrated in the drawing, the small driving gear 1223*b* and the large driving gear 1223*c* may be sequentially disposed in an upward direction from the internal cylinder driving shaft 1223*a*, and the large driven gear 1223*e* and the small driven gear 1223*f* may be sequentially disposed in an upward direction from the intermediate rotation shaft 1223*d*.

For reference, as implied in the name of each component, the small driving gear 1223*b* has a relatively smaller diameter than the large driving gear 1223*c*, and the large driving gear 1223*e* has a relatively larger diameter than the small driven gear 1223*f*.

The above-configured internal cylinder driving connecting portion 1223 may have a structure in which, while the internal cylinder driving shaft 1223*a* reciprocates in the axial direction, the large driving gear 1223*c* and the small driven gear 1223*f* are not gear-coupled when the small driving gear 1223*b* and the large driven gear 1223*e* are gear-coupled, and the small driving gear 1223*b* and the large driven gear 1223*e* are not gear-coupled when the large driving gear 1223*c* and the small driven gear 1223*f* are gear-coupled.

As illustrated in FIG. 18, when blending objects are ground, the internal cylinder driving shaft 1223*a* moves downward in the axial direction, so that the large driving gear 1223*c* and the small driven gear 1223*f* may be gear-coupled. Thus, the internal cylinder 1210 may rotate with a large torque in spite of a decrease in rotational speed of the internal cylinder 1210. As a result, the internal cylinder 1210 may smoothly rotate in a direction opposing the grinding blade.

As illustrated in FIG. 19, when blending objects are dehydrated, the internal cylinder driving shaft 1223*a* moves downward in an axial direction, so that the large driving gear 1223*c* and the small driven gear 1223*f* may be gear-coupled. Thus, the internal cylinder 1210 may rotate at relatively higher speed than during grinding of the blending objects. As a result, a dehydration action to extract juice from the ground blending object may be effectively performed.

In addition, the internal cylinder connection portion 1223 may have a structure in which, although not illustrated in the drawing, while the internal cylinder driving shaft 1223*a* does not reciprocate in an axial direction and the intermediate rotation shaft 1223*d* reciprocates in the axial direction, the large driving gear 1223*c* and the small driven gear 1223*f* are not gear-coupled when the small driving gear 1223*b* and the large driven gear 1223*e* are gear-coupled, and the small driving gear 1223*b* and the large driven gear 1223*e* are not gear-coupled when the large driving gear 1223*c* and the small driven gear 1223*f* are gear-coupled.

In addition, although not illustrated in the drawing, it will be understood that the internal cylinder rotation shaft 1221 axially moves when the large driven gear 1223*e* and the small driven gear 1223*f* are directly mounted on the internal cylinder rotation shaft 1221.

The internal cylinder driving connection portion 1223 may include a shaft moving member 1223*g* to move the internal cylinder driving shaft 1223*a* in the axial direction. In this case, it will be understood that the shaft moving member 1223*g* may employ any conventional driving member such as a solenoid cylinder, or the like.

The internal cylinder driving shaft 1223*a* is movably and slidably coupled while being key-coupled such that one end portion of the internal cylinder driving shaft 122*a* axially rotates in conjunction with a motor shaft 1222*a* of an internal cylinder driving motor 1222.

For example, the internal cylinder driving shaft 1223*a* may be key-coupled such that one end portion of the internal cylinder driving shaft 1223*a* axially rotates in conjunction with the motor shaft 1222*a* of the internal cylinder driving motor 1222, so that when the motor shaft 1222*a* axially rotates with an operation of the internal cylinder driving motor 1222, the internal cylinder driving shaft 1223*a* may axially rotate in conjunction therewith to receive rotation driving force from the internal cylinder driving motor 1222.

In addition, one end portion of the internal cylinder driving shaft 1223*a* may be movably and slidably coupled to the motor shaft 1222*a* of the internal cylinder driving motor 1222 in an axial direction, allowing a key-coupled state to the motor shaft 1222*a* to be maintained even when the internal cylinder driving shaft 1222*a* moves in the axial direction due to the shaft moving member 1223*g*.

As an example, the hollow 1222*b* of the motor shaft 1222*a* may have a rectangular cross-section, and a cross-section of one end portion of the internal cylinder driving shaft 1223*a* may correspond to the cross-section of the hollow 1222*b* of the motor shaft 1222*a*. Thus, the internal cylinder driving shaft 122*a* is movably and slidably coupled the motor shaft 122*a* in the axial direction while one end portion of the internal cylinder driving shaft 1223*a* may be key-coupled to the motor shaft 1222*a* in axially rotational conjunction therewith.

In addition, the other end portion of the internal cylinder driving shaft 1223*a* may be axially-rotatably connected to the shaft moving member 1223*g*. Accordingly, even when the internal cylinder driving shaft 1223*a* moves in the axial direction due to the shaft moving member 1223*g*, the internal cylinder driving shaft 1223*a* may axially rotate in the state of being connected to the shaft moving member 1223*g*.

As an example, the other end portion of the internal cylinder driving shaft 1223*a* may be connected to the shaft moving member 1223*g* by an axial rotation bearing 1223*h*.

The internal cylinder driving connection portion 1223 may have a gear structure such that the rotational speed of the internal cylinder 1210 during dehydration of the blending objects is five times higher than the rotational speed of the internal cylinder 1210 during grinding of the blending objects.

As a detailed example, the internal cylinder driving connection portion 1223 may have a gear structure such that rotational speed of the internal cylinder 1210 is 50 rpm to 350 rpm during grinding of the blending objects and is 1500 rpm to 3500 rpm during dehydration of the blending objects.

According to the above-described configuration of the internal cylinder driving connection portion 1223, a torque may be significantly increased by reducing the rotational speed of the internal cylinder 1210 when blending objects are ground, and a dehydration effect may be significantly improved by increasing the rotational speed of the internal cylinder 1210 as high as possible during dehydration of the blending objects.

As another example, as illustrated in FIGS. 20 and 21, a gear-coupled structure of the internal cylinder driving connection portion 1223 may vary such that the internal cylinder 1210 has different rotational speeds during grinding of blending objects and during dehydration of the blending objects.

Specifically, the internal cylinder driving portion 1220 may include a pressing member 1230 configured to press the internal cylinder driving shaft 1223*a* in an axial direction such that reciprocation of the internal cylinder driving shaft 1223*a* is performed to vary the gear-coupled structure of the internal cylinder driving connection portion 1223.

For example, the pressing member 1230 may be configured to move the internal cylinder driving shaft 1223*a* in the axial direction. Specifically, the pressing member 1230 is not configured to simply move the internal cylinder driving shaft 1223*a* at one time and to lose driving force, irrespective of completion of the variation of the gear-coupled structure, but is configured to press internal cylinder driving shaft 1223*a* in the axial direction until the variation of the gear-coupled structure of the internal cylinder driving connection portion 1223*a* is completed.

As an example, the small driving gear 1223*b* of the internal cylinder driving shaft 1223*a* and the large driven gear 1223*e* of the internal cylinder rotation shaft 1221*a* and the intermediate rotation shaft 1223*d* may change from a non-gear-coupled state to a gear-coupled state to vary the gear-coupled structure. In the case in which gear teeth of the small driving gear 1223*b* and teeth of the large driven gear 1223*e* are brought into contact with each other but do not engage with each other when the small driving gear 1223*b* moves to the large driven gear 1223*e*, the gear-coupled structure does not vary.

In order to allow the gear-coupled structure to vary in the case in which the gear teeth of the small driving gear 1223*b* and teeth of the large driven gear 1223*e* do not engage with each other when the small driving gear 1223*b* moves to the large driven gear 1223*e*, the pressing member 1230 of the present disclosure may continuously press the internal cylinder driving shaft 1223*a* in the axial direction, so that the gear teeth of the small driving gear 1223*b* may be inserted between the gear teeth of the large driven gear 1223*e* when the small driving gear 1223*b* rotates. As a result, the gear teeth of the small driving gear 1223*b* and the gear teeth of the large driven gear 1223*e* may ultimately engage with each other.

Specifically, the pressing member 1230 may include an air cylinder 1231 and a spring 1232.

The air cylinder 1231 may press the internal cylinder driving shaft 1223*a* in one direction (in a downward direction, in the drawing), among axial directions.

As illustrated in the drawing, the air cylinder 1231 may include a cylinder body 1231*a* and a plunger 1231*b*.

The cylinder body 1231*a* may have one side portion in which an air extraction hole 'h' communicating with an external air pump is formed. The air extraction hole 'h' may be connected to a vacuum unit 1400 such that air maybe extracted inside the cylinder body 1231*a* by an operation of the vacuum unit 1400.

The plunger 1231*b* may be provided with a head portion H and a road portion R.

The head portion H may be embedded in the cylinder body 1231*a* to be moved in a length direction of the cylinder body 1231*a* by air extraction through the air extraction hole 'h.'

The road portion R may extend outwardly of the cylinder body 1231*a* from the head portion H, and may be connected to the internal cylinder driving shaft 1223*a* and a connection moving bar 1240. In this case, the internal cylinder driving shaft 1223*a* is axially-rotatably coupled to the connection moving bar 1240. As an example, the internal cylinder driving shaft 1223*a* may be axially-rotatably coupled to the connection moving bar 1240 via a bearing member.

The spring 1232 may press the internal cylinder driving shaft 1223*a* in the other direction (in an upward direction, in the drawing), among the axial directions.

Specifically, one end of the spring 1232 may be supported on a fixing plate 1250 to which the internal cylinder driving shaft 1223*a* is axially movably and axially rotationally coupled, and the other end of the spring 1232 may be supported on the connection moving bar 1240. Accordingly, when the air extraction of the air cylinder 1231 is stopped, the spring 1240 may elastically press the connection moving bar 1240 to reversely move the fixing plate 1250 moved by the air cylinder 1231. For reference, the internal cylinder driving shaft 1223*a* is axially rotationally coupled to the fixing plate 1250. As an example, the internal cylinder driving shaft 1223*a* may be axially rotationally coupled to the fixing plate 1250 via a bearing member.

Hereinafter, a description will be provided as to a process in which the internal cylinder driving shaft 1223*a* is reciprocally and axially moved by the above-configured air cylinder 1231 and the above-configured spring 1232.

As illustrated in FIG. 20, when air is extracted through the air extraction hole of the air cylinder 1231, an internal space on a side of the air extraction hole becomes negative pressure in the cylinder body 1231*a*. Accordingly, the plunger 1231*b* may descend, so that the connection moving bar 1240 may descend, allowing the internal cylinder driving shaft 1223*a* to descend.

Accordingly, the small driving gear 1223*b* may be gear-coupled to the large driving gear 1223*e*, so that the internal cylinder 1210 may rotates at low speed and high torque to effectively grind blending objects in the internal cylinder 1210.

In this case, it is a matter of course that the spring is pressed between the fixing plate 1250 and the connection moving bar 1240 as the connection moving bar 1240 descends.

On the contrary, as illustrated in FIG. 21, when air extraction through the air extraction hole of the air cylinder 1231 is stopped, the internal space on the side of the air extraction hole may change from a negative pressure to an atmospheric pressure in the cylinder body 1231*a*. As the spring 1232 extends upward, while a lower end of the spring 1232 is supported on the fixed plate 1250, to elastically press the connection moving bar 1240, the connection moving bar 1240 may ascend, and the cylinder driving shaft 1223*a* may also ascend in conjunction with the ascent of the connection moving bar 1240.

Accordingly, the large driving gear 1223*c* may be gear-coupled to the driven small gear 1223*f*, so that the internal cylinder 1210 may rotate at high speed and low torque to effectively dehydrate the blending objects in the internal cylinder 1210.

Although not illustrated in the drawings, an additional air cylinder may be used instead of the spring 1232. For example, ascent and descent of the internal cylinder driving shaft 1223*a* maybe implemented using two air cylinders disposed in opposing directions.

For reference, among elements not described in FIGS. 20 and 21, the same elements as those illustrated in FIGS. 17 and are designated by the same reference numerals and descriptions thereof will be omitted.

As a result, the blender according to the present disclosure may have a structure in which the gear-coupled structure of the internal cylinder driving connection portion 1229 is variable such that the internal cylinder 1210 has different rotational speeds during grinding and dehydration of blending objects, or may include a plurality of internal cylinder driving motors 1228, so that among blending objects rotating in a forward direction due to forward rotation of a grinding blade, blending objects close to an internal side surface of the internal cylinder 1210 may smoothly rotate in a forward direction. In addition, during dehydration of the ground blending objects, the rotational speed of the internal cylinder 1210 may be increased to be as high as possible, as compared with during grinding of the blending objects, to significantly increase a dehydration effect.

In the blender according to the present disclosure, as another example, a pressing member 1230 maybe provided to press the internal cylinder driving shaft 1223*a* until variation of the gear-coupled structure of the internal cylinder driving connection portion 1223 is completed. In the case in which gear teeth of gears do not engage with each other even when the internal cylinder driving shaft 1223*a* moves, the pressing member 1230 may continuously press the internal cylinder driving shaft 1223*a* in an axial direction until the variation of the gear-coupled structure is completed, so that the gears may ultimately engage with each other while rotating. Accordingly, the gear-coupled structure of the internal cylinder connection portion 1223 may completely vary.

Figure 23:
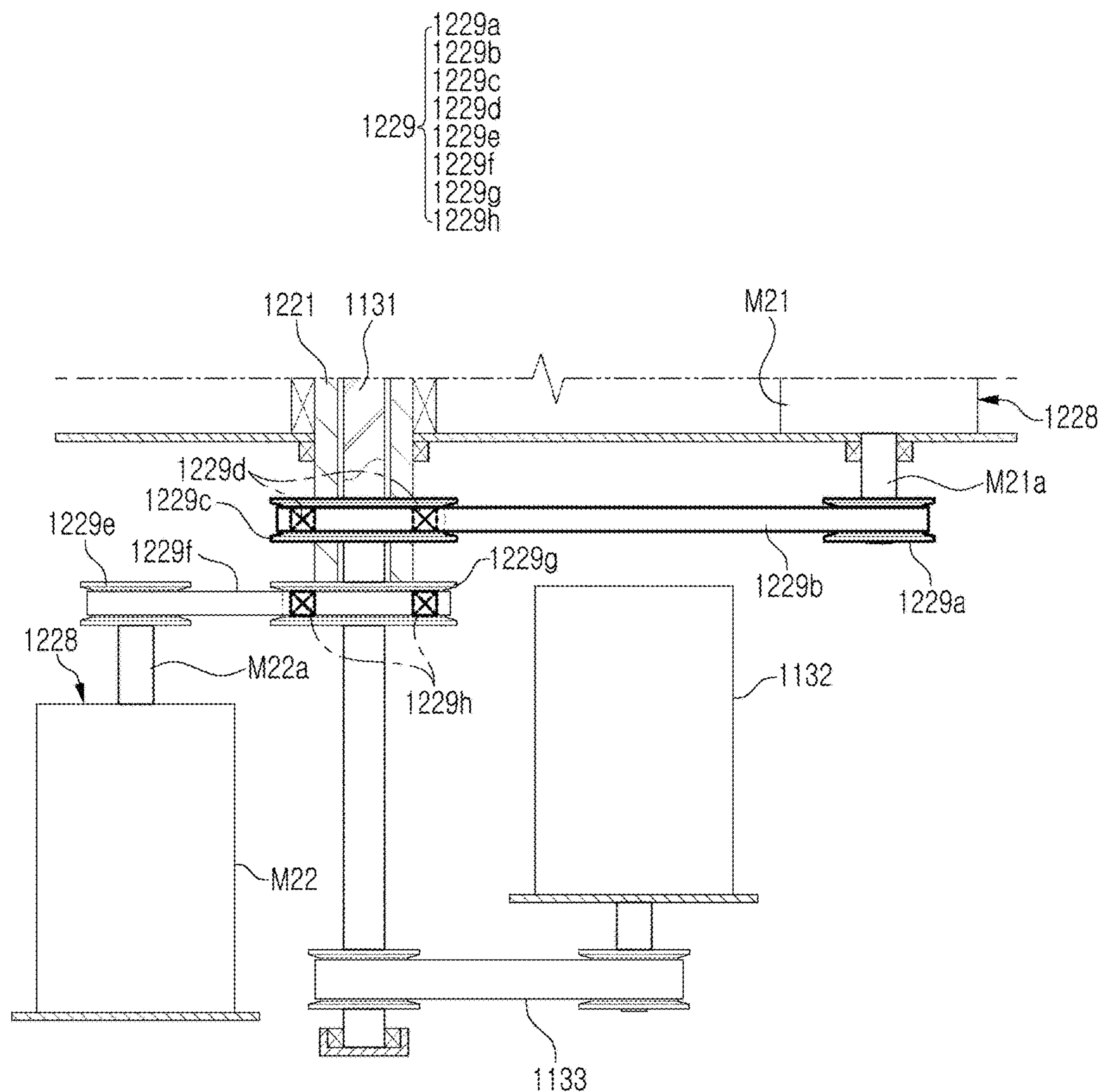
FIGS. 23 and 24 are views illustrating operating states of an internal cylinder driving unit in the blender of FIG. 22.
Figure 24:
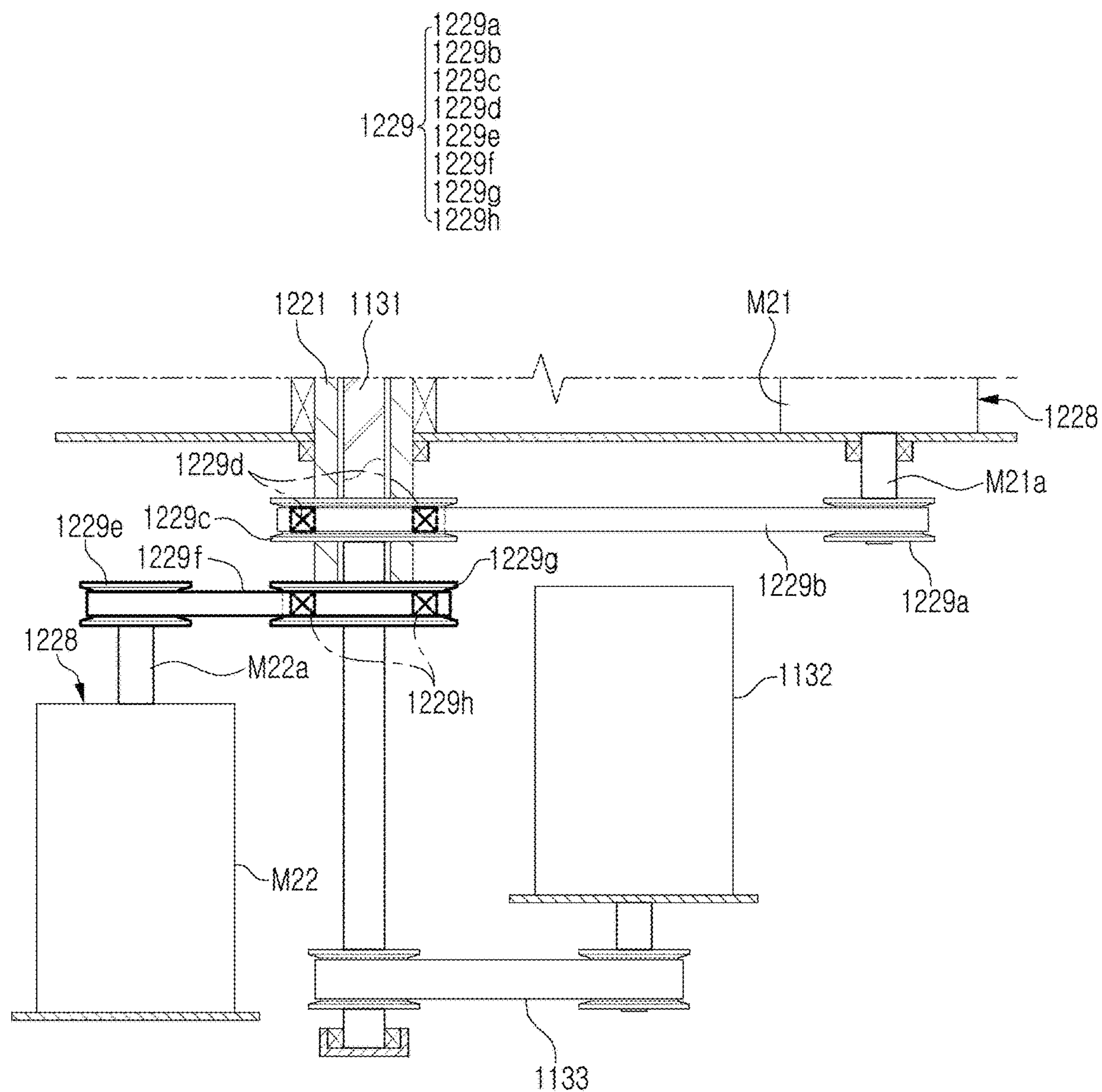

FIG. 22 is a view illustrating the inside according to another embodiment of the present disclosure, in the blender of FIG. 16, and FIGS. 23 and 24 are views illustrating operating states of an internal cylinder driving unit in the blender of FIG. 22.

Referring to the drawings, a blender according to another embodiment may include a blender body 1100 and an internal cylinder unit 1200. An external cylinder 1110, a grinding blade 1120, and a blade driving portion 1130 of the blender body 1100 and the internal cylinder 1210 of the internal cylinder unit 1200 are the same as those of the blender illustrated in FIG. 17, and thus, detailed descriptions thereof will be omitted. That is, detailed descriptions of the same elements designated by the same reference numerals will be omitted.

In addition, the internal cylinder unit 1200 may include an internal cylinder driving portion 1220 together with the internal cylinder 1210. In this case, a blade rotation shaft 1131 of a blade driving portion 1130 may be axially rotationally mounted in a hollow 122*b* formed in an internal cylinder rotation shaft 1221 of the internal cylinder driving portion 1220, resulting in the same structure in which the blade rotation shaft 1131 and the internal cylinder rotation shaft 1221 axially rotate independently.

The internal cylinder driving portion 1220 may include an internal cylinder rotation shaft 1221, an internal cylinder driving motor 1228, and an internal cylinder driving connection portion 1229 connecting the internal cylinder rotation shaft 1221 and the internal cylinder driving motor 1228 to each other.

The internal cylinder driving motor 1228 may be provided with a plurality of internal cylinder driving motors 1228 such that the internal cylinder 1210 has different rotational speeds during grinding and dehydration of blending objects.

Accordingly, in the present disclosure, a torque is increased by reducing rotational speed of the internal cylinder 1210 using one internal cylinder driving motor 1228 during grinding of the blending objects. Thus, among blending objects rotating in a forward direction due to forward rotation of the grinding blade, blending objects close to the internal side surface of the internal cylinder 1210 may smoothly rotate in a reverse direction. In addition, during dehydration of the ground blending objects, the rotational speed of the internal cylinder 1210 may be increased to be as high as possible using another internal cylinder driving motor 1228, as compared during grinding of the blending objects, to significantly increase the dehydration effect.

Specifically, one internal cylinder driving motor 1228 may be a first motor supplying rotational driving force to the internal cylinder 1210 during grinding of blending objects, and the other internal cylinder driving motor 1228 may be a second motor M2 supplying rotational driving force to the internal cylinder 1210 a direction opposing the first motor M21 during dehydration of the blending objects.

In this case, the internal cylinder driving connection portion 1229 may have a structure in which each of the first motor M21 and the second motor M22 and the internal cylinder rotation shaft 1221 are connected in a one-way bearing structure.

For example, the first motor M21 and the internal cylinder rotation shaft 1221 maybe connected to each other in one one-way bearing structure, and the second motor M22 and the internal cylinder rotation shaft 1221 may be connected to each other in another one-way bearing structure.

More specifically, the internal cylinder driving connection 1229 may have the following structure.

A first driving gear 1229*a* may be mounted on the first motor shaft M21*a* of the first motor M21. A first driven gear 1229*a*, gear-coupled to the internal cylinder rotation shaft 1221 or connected to the internal cylinder rotation shaft 1221 by a first belt 1229*b* or a first chain, may be mounted on the internal cylinder rotation shaft 1221.

That is, the first driving gear 1229*a*, drivingly connected to the first driving gear 1229*a*, may be mounted on the first internal cylinder rotation shaft 1221. The first driven gear 1229*c* may be directly gear-coupled to the first driving gear 1229*a*. Alternatively, the first driven gear 1229*c* may be connected to the first driving gear 1229*a* by a driving connection member such as a first belt 1229*b* or a first chain.

Although not illustrated in the drawings, an additional intermediate connection shaft may be further mounted in a driving connection structure of a first motor shaft M21*a* and the internal cylinder rotation shaft 1221. Rotational speed and torque of the internal cylinder rotation shaft 1221 may be adjusted through an intermediate connection gear mounted on the intermediate connection shaft and drivingly connected to the first driving gear 1229*a* and the first driven gear 1229*c*.

A second driving gear 1229*e* may be mounted on the second motor shaft M22*a* of the second motor M22. A second driven gear 1229*g*, gear-coupled to the second driving gear 1229*e* or connected to the second driving gear 1229*e* by a second belt 1229*f* or a second chain, may be mounted on the internal cylinder rotation shaft 1221.

That is, the second driven gear 1229*g*, drivingly connected to the second driving gear 1229*e*, may be mounted on the internal cylinder rotation shaft 1221. The second driven gear 1229*g* may be directly gear-coupled to the second driving gear 1229*e*, or may be connected to the second driving gear 1229*e* by a driving connection member such as a second belt 1229*f* or a second chain.

Although not illustrated in the drawings, an intermediate rotation shaft may be further mounted in the driving connection structure of the second motor shaft M22*a* and the internal cylinder rotation shaft 1221, as an additional driving transmission medium. Rotational speed and torque of the internal cylinder rotation shaft 1221 may be adjusted through an intermediate connection gear mounted on the intermediate rotation shaft and drivingly connected to the second driving gear 1229*e* and the second driven gear 1229*g*.

In addition, a first one-way bearing 1229*d* may be mounted between the internal cylinder rotating shaft 1221 and the first driven gear 1229*c*.

That is, the internal cylinder rotation shaft 1221 may penetrate through the first driven gear 1229*c*, and the first one-way bearing 1229*d* may have an inner race fixedly coupled to a circumference of the internal cylinder rotation shaft 1221 and an outer race fixedly coupled to the inside of the first driven gear 1229*c*, between the internal cylinder rotation shaft 1221 and the first driven gear 1229*c*.

The first one-way bearing 1229*d* may simply serve to axially rotationally couple the first driven gear 1229*c* and the internal cylinder rotation shaft 1221 in such a manner that driving force is transmitted from the first driven gear 1229*c* to the internal cylinder rotation shaft 1221 in one axially rotational direction, but is not transmitted in an opposing direction.

That is, when the first driven gear 1229*c* axially rotates in one direction, the first one-way bearing 1229*d* may transmit the driving force from the first driven gear 1229*c* to the internal cylinder rotation shaft 1221 such that the internal cylinder rotation shaft 1221 axially rotates in the one direction in conjunction with the first driven gear 1229*c*. In addition, when the internal cylinder rotation shaft 1221 rotates in an opposing direction, the first one-way bearing 1229*d* may not transmit the driving force from the internal cylinder rotation shaft 1221 to the first driven gear 1229*c* such that the first driven gear 1229*c* axially rotates in the opposing direction in conjunction with the internal cylinder rotation shaft 1221.

In addition, a second one-way bearing 1229*h* may be mounted between the internal cylinder rotation shaft 1221 and the second driven gear 1229*g*.

That is, the internal cylinder rotation shaft 1221 may penetrate through the second driven gear 1229*g*, and the second one-way bearing 1229*d* may have an inner race fixedly coupled to a circumference of the internal cylinder rotation shaft 1221 and an outer race fixedly coupled to the inside of the second driven gear 1229*c*, between the internal cylinder rotation shaft 1221 and the second driven gear 1229*g*.

The second one-way bearing 1229*h* may simply serve to axially rotationally couple the second driven gear 1229*g* and the internal cylinder rotation shaft 1221 in such a manner that driving force is transmitted from the second driven gear 1229*g* to the internal cylinder rotation shaft 1221 in one axially rotational direction, but is not transmitted in an opposing direction.

That is, when the second driven gear 1229*g* axially rotates in the other direction, the first one-way bearing 1229*h* may transmit the driving force from the first driven gear 1229*g* to the internal cylinder rotation shaft 1221 such that the internal cylinder rotation shaft 1221 axially rotates in the other direction in conjunction with the second driven gear 1229*g*. In addition, when the internal cylinder rotation shaft 1221 rotates in an opposing direction, the second one-way bearing 1229*h* may not transmit the driving force from the internal cylinder rotation shaft 1221 to the second driven gear 1229*g* such that the second driven gear 1229*g* axially rotates in the opposing direction in conjunction with the internal cylinder rotation shaft 1221.

The first one-way bearing 1229*d* and the second one-way bearing 1229*h* have a structure to transmit the driving force only in opposing rotational directions.

Accordingly, even when the first driven gear 1229*c* rotates through the first driving gear 1229*a* during operation of only the first motor M21, the second driven gear 1229*g* may not rotate and, ultimately, the second motor M22 may not be affected. Even when the second driven gear 1229*g* rotates through the second driving gear 1229*e* during operation of only the second motor M22, the first driven gear 1229*c* may not rotate and, ultimately, the first motor M21 may not be affected.

The first motor M21, the second motor M22, and the internal cylinder driving connection portion 1229 may be configured such that rotational speed of the internal cylinder 1210 during dehydration of blending object is five times higher than rotational speed of the internal cylinder 1210 during grinding of the blending object.

As a detailed example, the first motor M21, the second motor M22, and the internal cylinder driving connection portion 1229 may be configured such that the rotational speed of the internal cylinder 1210 is 50 rpm to 350 rpm during grinding of the blending objects and is 1500 rpm to 3500 rpm during dehydration of the blending objects.

In the present disclosure, due to the above-described configurations of the first motor M21, the second motor M22, and the internal cylinder driving connection portion 1229, a torque may be increased to be as high as possible by reducing the rotational speed of the internal cylinder 120 during grinding of the blending objects, and the rotational speed of the internal cylinder 1210 may be increased to be as high as possible during dehydration of the blending objects to significantly increase a dehydration effect.

The blender according to the present disclosure may further include a vacuum unit 1400 configured to establish vacuum in the internal cylinder 1210, as illustrated in FIGS. 17 and 22.

The vacuum unit 1400 may include a suction pipe and a vacuum driving portion 1410.

The suction pipe may be formed inside the blender cover 1140. When the blender cover 1140 covers the external cylinder 1110, the suction pipe may communicate with the internal cylinder 1210 disposed in the external cylinder 1110 while communicating with the external cylinder 110.

The vacuum driving portion 1410 may be connected to the suction pipe, and may include a vacuum motor and a vacuum pump.

The blender according to the present disclosure may allow a blending operation, including a grinding operation and a dehydration operation, to be performed in a vacuum by the above-configured vacuum unit 1400. Thus, blending objects including fruits, vegetables, or the like, may be blended in the state in which the blending objects are not oxidized, so that fresh and nutrient-undestroyed juice may be obtained.

As a result, the blender according to the present disclosure may have a structure in which a gear-coupled structure of an internal cylinder connection portion 1229 varies such that the internal cylinder 1210 may have different rotational speeds during grinding and dehydration of the blending objects, or may be provided with a plurality of internal cylinder driving motors 1228. Accordingly, a torque is increased while decreasing reverse rotational speed of the internal cylinder 1210. Thus, among blending objects rotating in a forward direction due to forward rotation of the grinding blade, blending objects close to the internal side surface of the internal cylinder 1210 may smoothly rotate in a reverse direction. In addition, during dehydration of the ground blending objects, the rotational speed of the internal cylinder 1210 may be increased to be as high as possible, as compared with during grinding of the blending objects, to significantly increase the dehydration effect.

Figure 25:
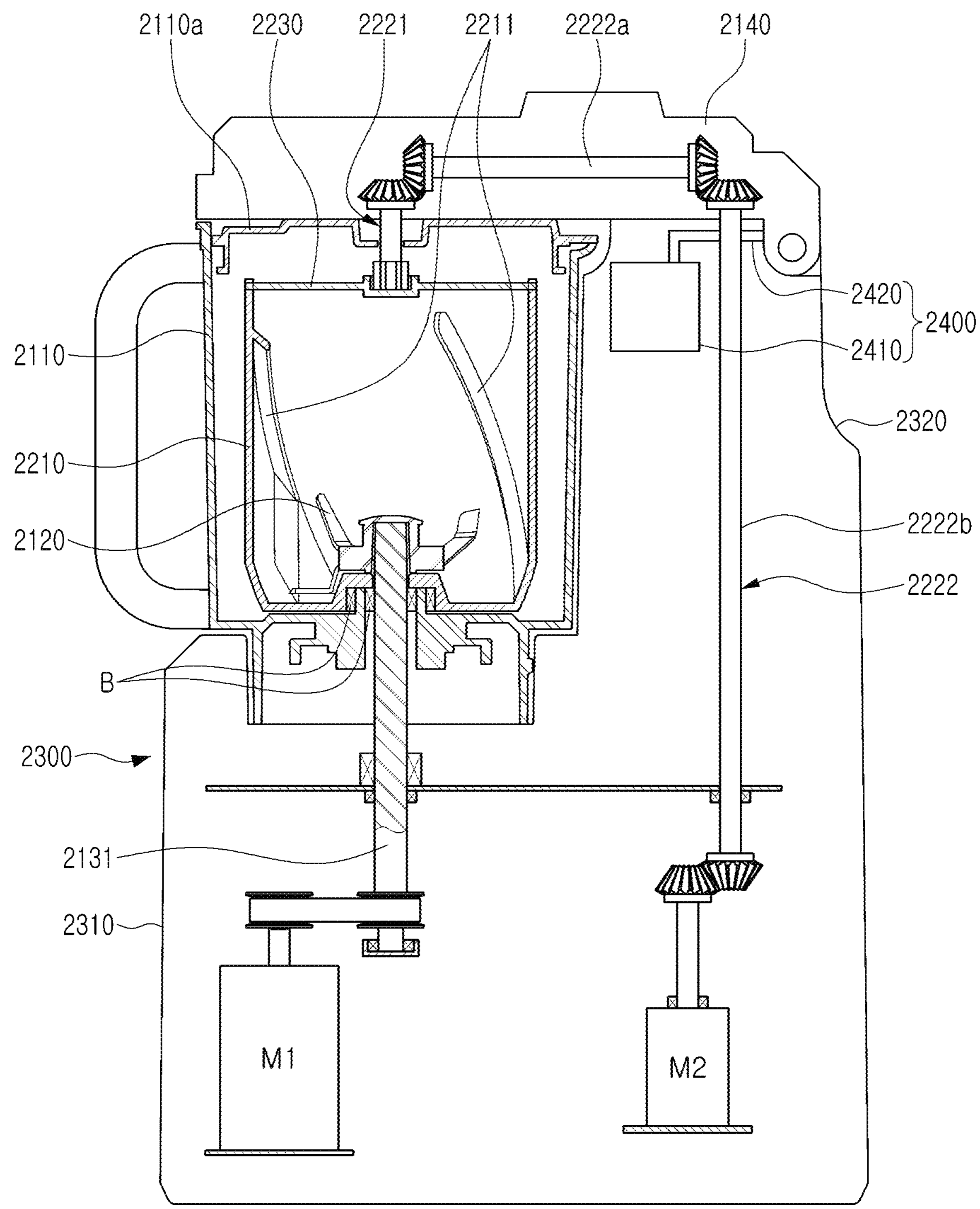
FIG. 25 is a longitudinal sectional view illustrating a blender according to another embodiment of the present disclosure.
Figure 26:
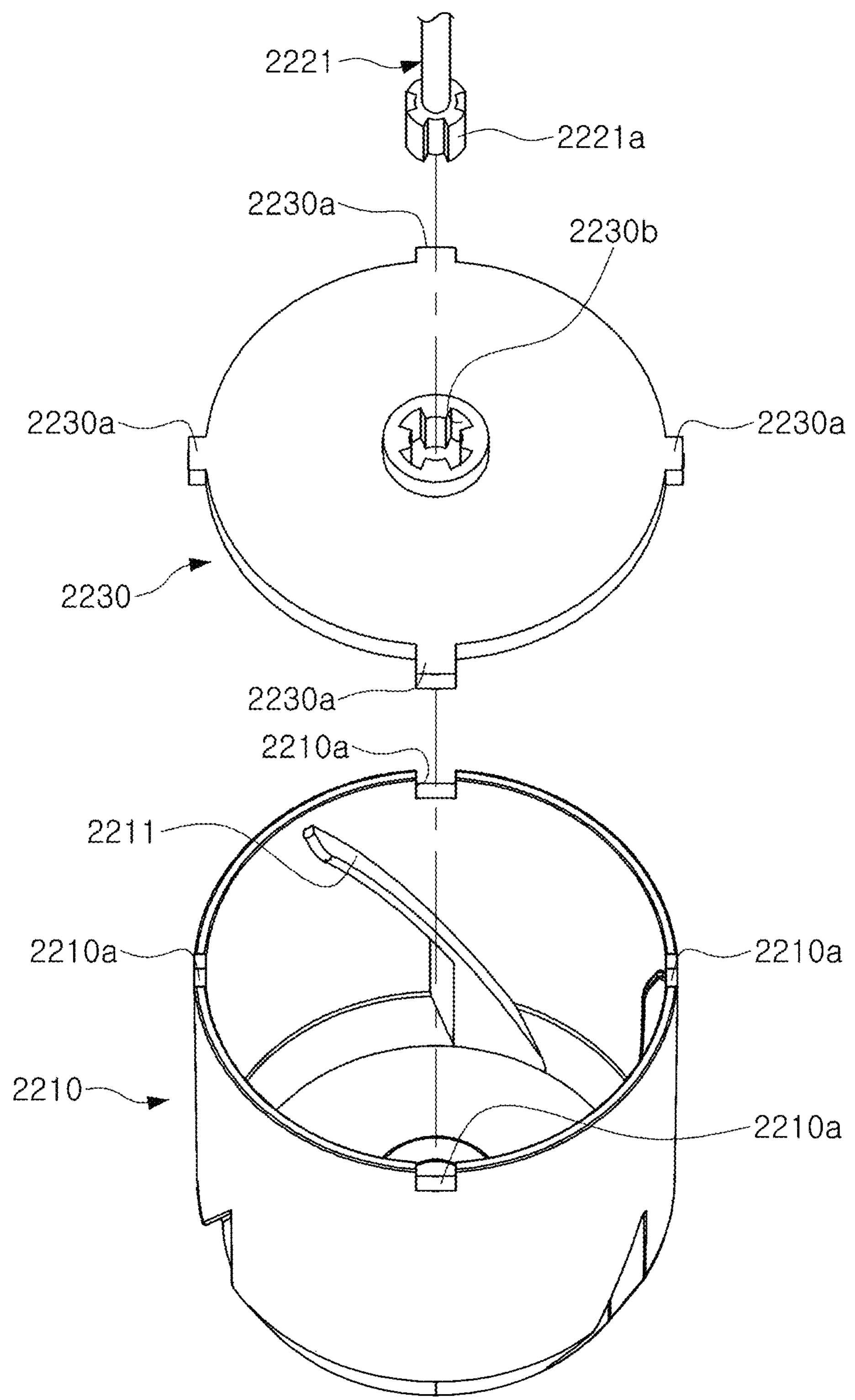
FIG. 26 is a view illustrating an internal cylinder, an internal cylinder cover, and an internal cylinder rotation shaft in the blender of FIG. 25.

FIG. 25 is a longitudinal sectional view illustrating a blender according to another embodiment of the present disclosure, and FIG. 26 is a view illustrating an internal cylinder, an internal cylinder cover, and an internal cylinder rotation shaft in the blender of FIG. 25.

Referring to the drawings, a blender according to the present disclosure may include a blender body 2100 and an internal cylinder unit 2200.

The blender body 2100 may include an external cylinder 2110, a grinding blade 2120, and a blade driving portion 2130.

Specifically, the external cylinder 2110 maybe a cylinder in which the internal cylinder 2210 of the internal cylinder unit 2200 is disposed, and may have a open top structure. In addition, the external cylinder 2110 may be configured to be covered with a blender cover 2140.

The external cylinder 2110 may be seated on a cylinder support case 2300 to be described later, so that the external cover 2110 may cover an upper portion of the external cylinder 2110 before the blender cover 2140 covers the external cylinder 2110.

The grinding blade 2120 may be disposed in the internal cylinder 2210, and may serve to grind blending objects in the internal cylinder 2210 while rotating. In this case, the blending object refers to food ground by an operation of the blender.

The blade driving portion 2130 may be configured to rotate the grinding blade 2120.

The external cylinder 2110 maybe supported by a cylinder support case 2300. The cylinder support case 2300 may have an overall L shape, as illustrated in the drawings.

The cylinder support case 2300 may include a lower casing portion 2310, disposed below the external cylinder 2110, and a side casing portion 2320 extending upwardly of the lower casing portion 2310 to be connected to the blender cover 2140.

Specifically, the external cylinder 2110 may be seated on an upper surface of the lower casing portion 2310 disposed in a traverse direction, and the blender cover 1140 may be hingedly coupled to an upper end of the side casing portion 2320, extending upwardly of the lower casing portion 2310 to be disposed in a longitudinal direction, to rotate up and down.

The blade driving portion 2130 and an internal cylinder driving portion 2220 to be described later may be mounted in the cylinder support case 2300 or the blender cover 2140. When the external cylinder 2110, in which the internal cylinder 2210 is embedded, is seated, the grinding blade 2120 and the blade driving portion 2130 maybe connected to each other to transmit driving force of the blade driving portion 2130 to the grinding blade 2120 disposed in the internal cylinder 2210, and the internal cylinder 2210 and the internal cylinder driving portion 2220 maybe connected to each other to transmit driving force of the internal cylinder driving portion 2220 to the internal cylinder 2210 mounted in the external cylinder 2110.

The internal cylinder unit 2200 may include an internal cylinder 2210 and an internal cylinder driving portion 2220.

The internal cylinder 2210 maybe mounted in the external cylinder 2110, and an internal cylinder cover **2210*a* may cover an upper portion of the internal cylinder 2210 before the internal cylinder 2210 is seated on the cylinder support case 2300**.

At least one projection 2211 may be formed on the internal side surface of the internal cylinder 2210 such that the blending objects, flowing rotationally while being ground by the grinding blade 2120, are caught.

When the grinding blade 2120 rotates while the blending objects are accommodated in the internal cylinder 2210, the blending objects may collide against a projection 2211 formed on the internal side surface of the internal cylinder 2210, rotating in an opposite direction, to generate a turbulence of the blending objects. In this case, the turbulence may be increased, so that a grinding effect of the blending objects may be increased.

In addition, the projection 1213 may have a screw projection line shape inducing a downward spiral flow of the blending objects such that the blending objects flow downwardly while rotating in a direction opposing the rotational direction of the grinding blade 2120 when the grinding blade 2120 and the internal cylinder 2210 rotate in opposing directions.

Specifically, the blending object may flow upwardly while being radially pushed by centrifugal force generated by the rotation of the grinding blade 2120. The projection 2211, having a screw projection shape inducing a downward spiral motion of the blending objects, may be provided on the internal side surface of the internal cylinder 2210, so that the blending objects may flow to the grinding blade 2120, disposed on an lower internal portion of the internal cylinder 2210, to further increase the grinding effect of the blender.

In addition, the present disclosure may further include a controller (not illustrated). The controller may be electrically connected to the blade driving portion 2130 and the internal cylinder driving portion 2220 to control the blade driving portion 2130 and the internal cylinder driving portion 2220.

To break a state of balance of the blending objects in the internal cylinder 2210, the controller may control the internal cylinder driving portion 2220 such that the blending objects are blended while the internal cylinder 2210 repeatedly rotates reversely and stops in a direction opposing the rotational direction of the grinding blade 2120.

For example, to achieve an irregular flow of the blending objects of the internal cylinder 2210, the controller may control an internal cylinder driving motor M2 of the internal cylinder driving portion 2220 to repeatedly perform an operation in which the internal cylinder 2210 rotates in a reverse direction opposing the rotational direction of the grinding blade 2120 and is then stopped.

The internal cylinder 2210 may have a lower portion, rotatably mounted in the blender body 2100, and an upper portion allowing rotational driving force of the internal cylinder driving portion 2220 to be provided to the upper portion of the internal cylinder 2210 in conjunction with the internal cylinder driving portion 2220.

For example, the rotational driving force of the internal cylinder driving force 2220 may be provided through the upper portion of the internal cylinder 2210, so that the internal cylinder driving portion 2220 rotates the upper portion of the internal cylinder 2210. In this case, the lower portion of the internal cylinder 2210 may be rotatably mounted in the blender body 2100 in a bearing structure to rotate together when the upper portion of the internal cylinder 2210 rotates.

Hereinafter, a description will be provided as to a detailed structure in which the rotational driving force of the internal cylinder driving portion 2220 is provided through the upper portion of the internal cylinder 2210.

An internal cylinder cover 2230 of the internal cylinder 2210 may be structured to cover the internal cylinder 2210 and to be key-coupled to the internal cylinder 2210.

In this case, the internal cylinder driving portion 220 may be connected to the internal cylinder cover 2230 to rotate the internal cylinder cover 2230, so that the internal cylinder 2210 rotates in conjunction with the rotation of the internal cylinder cover 2230.

As an example, the key-coupled structure of the internal cylinder cover 2230 and the internal cylinder 2210 maybe formed by forming a plurality of key grooves 2210 in an end portion of the internal cylinder 2210 to be spaced apart from each other in a length direction and forming key projections 2230*a* on the edge of the internal cylinder cover 2230 in positions, respectively corresponding to the plurality of key grooves 2210*a*. Accordingly, when the internal cylinder cover 2230 descends on an upper portion of the internal cylinder 2210 to be coupled thereto, the key projections 2230*a* may be respectively inserted into the plurality of key grooves 2210*a* to be assembled. Thus, when the internal cylinder cover 2230 rotates, the internal cylinder 2210 may rotate in conjunction with the rotation of the internal cylinder cover 2230.

In addition, the key-coupled structure of the internal cylinder cover 2230 and the internal cylinder 2210 is not limited to the present disclosure. In addition, it will be understood that the key-coupled structure may employ any conventional key-coupled structure allowing the internal cylinder 2210 to rotate in conjunction with the rotation the internal cylinder cover 2230.

The internal cylinder driving portion 2220 may include an internal cylinder driving motor M2 and an internal cylinder rotation shaft 2221.

The internal cylinder driving motor M2 may be mounted in the blender body 2100, and the internal cylinder rotation shaft 2221 maybe key-coupled to the internal cylinder cover 2230 such that when the internal cylinder rotation shaft 2221 rotates, the internal cylinder cover 2230 also rotates in conjunction with the rotation the rotation of the internal cylinder rotation shaft 2221.

Specifically, an assembly groove 2230*b* having an uneven internal side surface may be formed on an upper surface of the internal cylinder cover 2230, and an assembly end portion 2221*a* having an uneven structure corresponding to the uneven structure of the assembly groove 2230*b* maybe formed on a lower end of the internal cylinder rotation shaft 2221 to be inserted into the assembly groove 2230*b* of the internal cylinder cover 2230 and then assembled to be key-coupled thereto.

The internal cylinder driving portion 2220 may further include a shaft connection member 2222. The shaft connection member 2222 may connect a motor shaft of the internal cylinder driving motor M2 and the internal cylinder rotation shaft 2221 to each other, serving to transmit rotational driving force from the motor shaft to the internal cylinder rotation shaft 2221.

The shaft connection member 2222 may include at least one of a gear connection shaft and a connection belt. In this case, each of the at least one gear connection shaft and the at least one connection belt may be disposed.

As an example, as illustrated in FIG. 25, the shaft connection member 2222 may include a first gear connection shaft 2222*a*, having a left end portion gear-connected to an upper end portion of the internal cylinder rotation shaft 2221, and a second gear connection shaft 222*b* having an upper end portion gear-connected to a right end portion of the first gear connection shaft 2222*a* and a lower end portion gear-connected to the motor shaft of the internal cylinder motor M2.

In this case, a bevel gear for the gear connection structure may be formed on each of the upper end portion of the internal cylinder rotation shaft 2221, the left end portion and the right end portion of the first gear connection shaft 2222*a*, and the upper end portion and the lower end portion of the second gear connection shaft 2222*b*.

Figure 27:
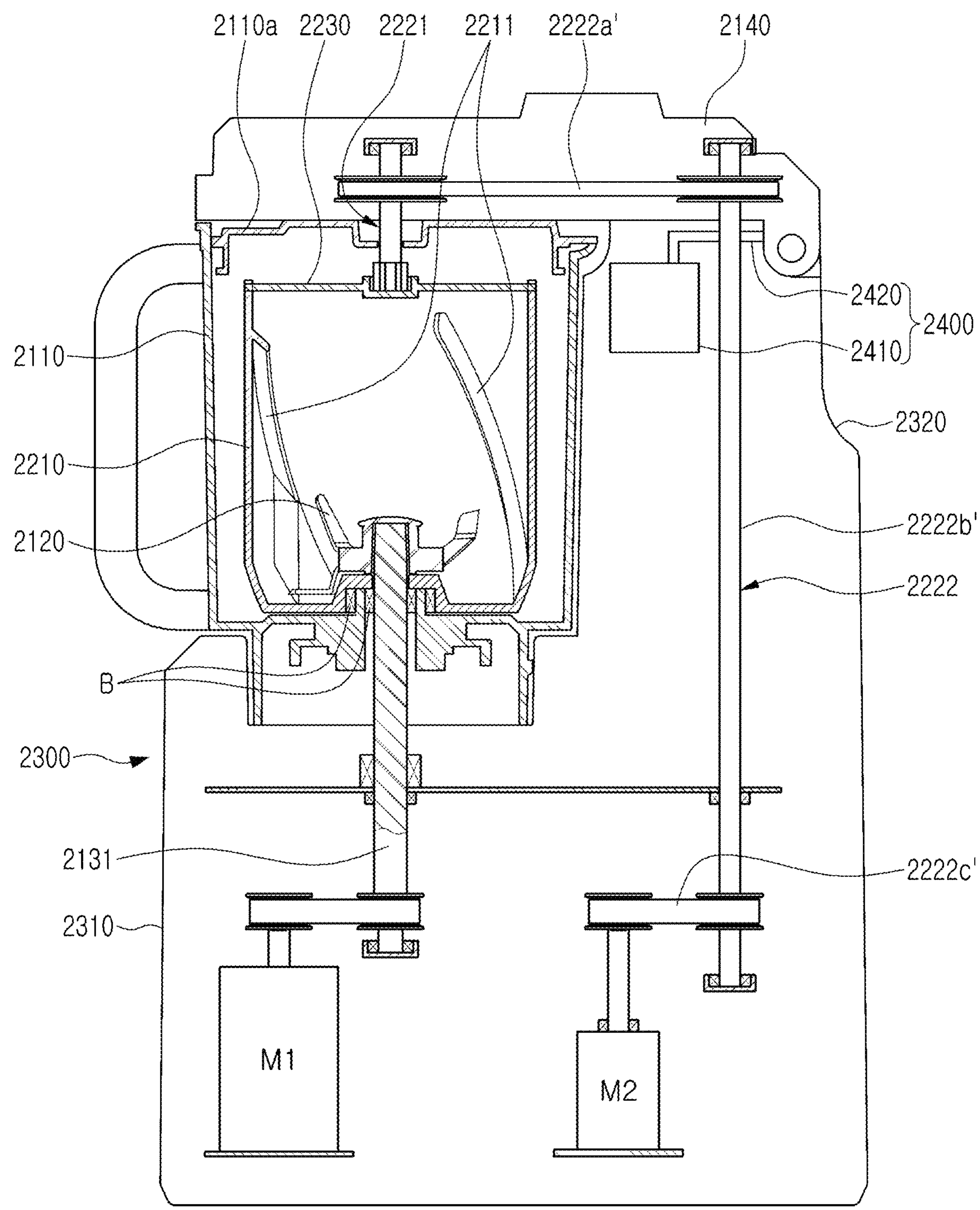
FIG. 27 is a longitudinal sectional view of a blender according to another embodiment of the present disclosure.

As another example, the shaft connection member 2222 may employ a first connection belt 2222*a*', an intermediate connection shaft 2222*b*', and a second connection belt 2222' illustrated in FIG. 27, instead of the first gear connection shaft 2222*a* and the second gear connection shaft 2222*b* illustrated in FIG. 25. Of course, a timing gear maybe formed on upper end portions of the internal cylinder rotation shaft 2221 and the internal cylinder driving motor M2 and upper and lower end portions of the intermediate connection shaft 2222*b*' to transmit driving force while rotating in the state in which the first connection belt 2222*a*' and the second connection belt 2222*c*' are wound. In this case, each of the first and second connection belts 2222*a*' and 2222*c*' may employ a timing belt. For reference, among elements not described in FIG. 27, the same elements as those illustrated in FIG. 25 are designated by the same reference numerals and descriptions thereof will be omitted.

The external cylinder 2110 of the blender body 2100 may be opened and closed by an external cylinder cover 2110*a*, and the internal cylinder rotation shaft 2221 may penetrate through the external cylinder cover 2110*a* and may rotate independently of the external cylinder cover 2110*a*.

In this case, the blade rotation shaft 2131 of the blade driving portion 2130 may penetrate through lower portions of the internal cylinder 2210 and the external cylinder 2110, and the lower portion of the internal cylinder 2210 may be connected to the lower portion of the external cylinder 2110 or the blade rotation shaft 2131 by a bearing.

As an example, the internal cylinder 2210 may have a structure in which the lower portion of the internal cylinder 2210 is connected to the lower portion of the external cylinder 2110 by a bearing 2B to rotate in an idle state.

The internal cylinder driving motor M2 may be disposed above or below the internal cylinder 2210. Alternatively, the internal cylinder driving motor M2 may be disposed on a side of the internal cylinder 2210.

Specifically, the internal cylinder driving motor M2 may be structured to be connected to the internal cylinder rotation shaft 2221 or the shaft connection member 2222. As another example, the internal cylinder driving motor M2 may be embedded in a lower casing portion 2310 of a cylinder support case 2300 disposed below the internal cylinder 2210. As another example, the internal cylinder driving motor M2 may be embedded in a side casing portion 2320 of the cylinder support case 2300 disposed on a side of the internal cylinder 2210.

In the present disclosure, a vacuum unit 2400 may be further provided. The vacuum unit 2400 may include a vacuum driving portion 2410 and a suction pipe 2420.

The vacuum driving portion 2410 may include a vacuum motor and a vacuum pump providing air suction force, and may be embedded in the side casing portion 2320. One side of the suction pipe 2420 may be connected to the vacuum driving portion 2410, and the other side of the suction pipe 2420 may communicate with the internal cylinder 2210 through a blender cover 2140.

In this case, each of the internal cylinder rotation shaft 2221 and the internal cylinder cover 2230 may be provided with a suction hole (not illustrated) formed in a central portion thereof. Although not illustrated in the drawing, the suction pipe 2420 may be rotatably connected to an upper end of the internal cylinder rotation shaft 2221 to suction air in the internal cylinder 2210 through the suction hole of each of the internal cylinder rotation shaft 2221 and the internal cylinder cover 2230, allowing an inside of the internal cylinder 2210 to be vacuum. Of course, such a vacuum operation may be performed before the internal cylinder 2210 and the grinding blade 2120 rotate.

In conclusion, the internal cylinder 2210 of the blender according to the present disclosure may be configured such that a lower portion of the internal cylinder 2210 is idle-rotationally mounted in the blender body 2100 and rotational driving force of the internal cylinder driving portion 2220 is provided to an upper portion of the internal cylinder 2210 in conjunction with the internal cylinder riving portion 2220. As a result, grinding performance of blending objects may be improved.

Figure 28:
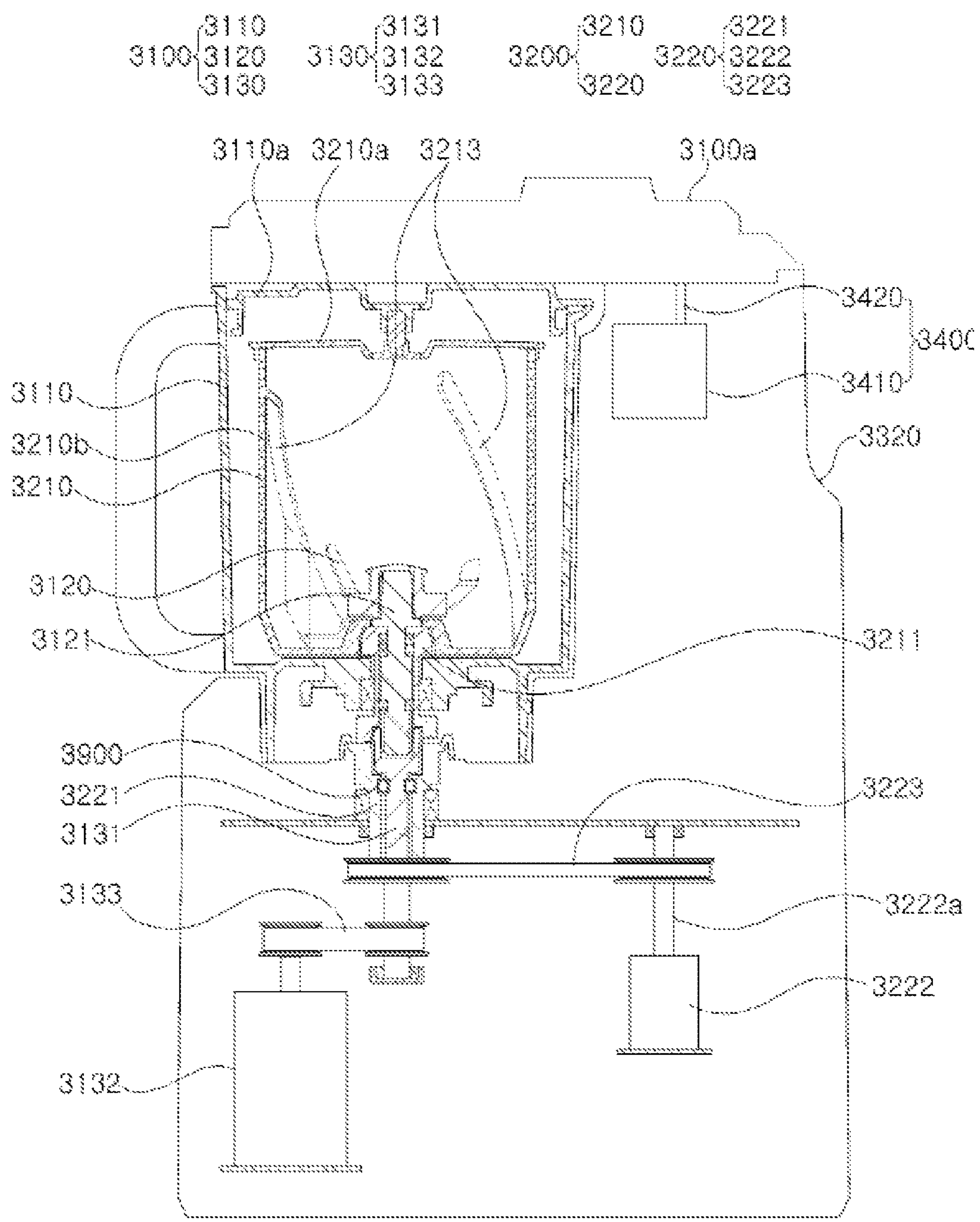
FIG. 28 is a view illustrating a blender according to another embodiment of the present disclosure.
Figure 29:
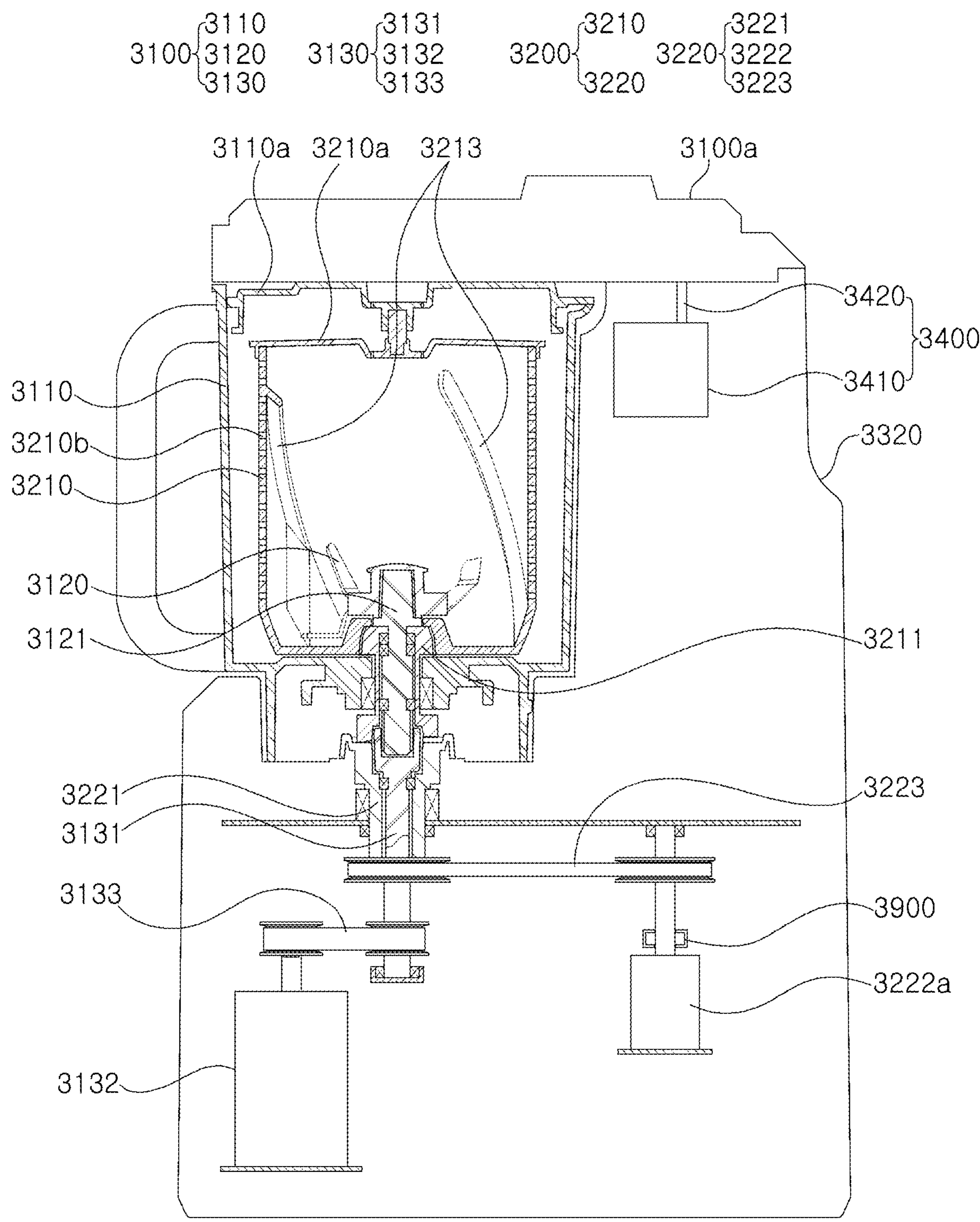
FIG. 29 is a view illustrating a blender according to another embodiment of the present disclosure.
Figure 30:
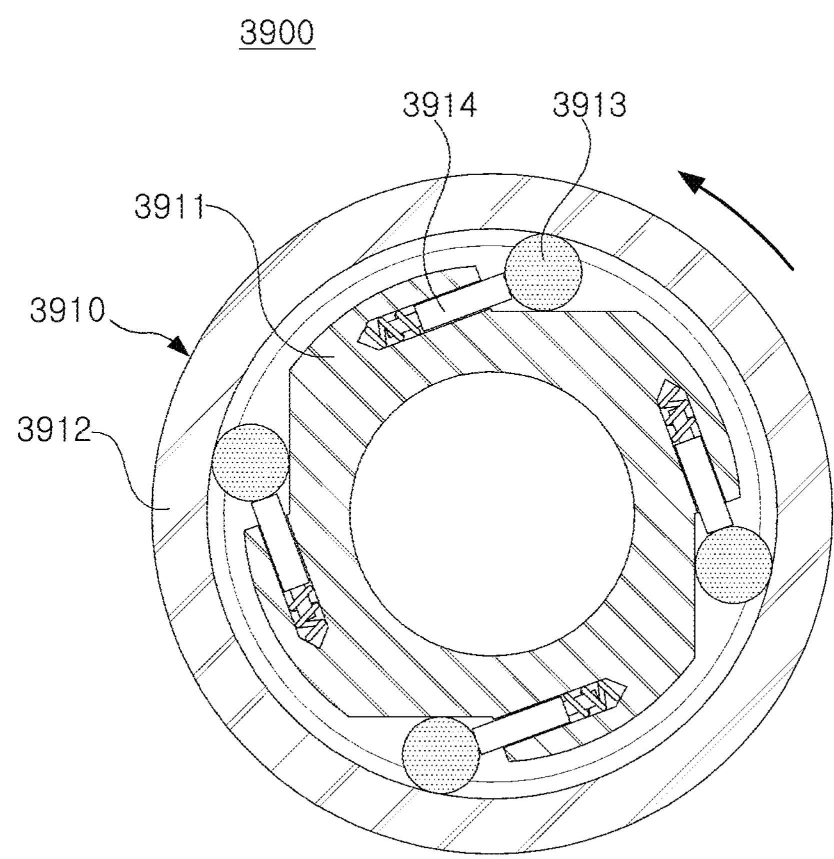
FIG. 30 is a view illustrating a one-way bearing, an example of a blocking member, in the blender of each of FIGS. 28 and 29.
Figure 31:
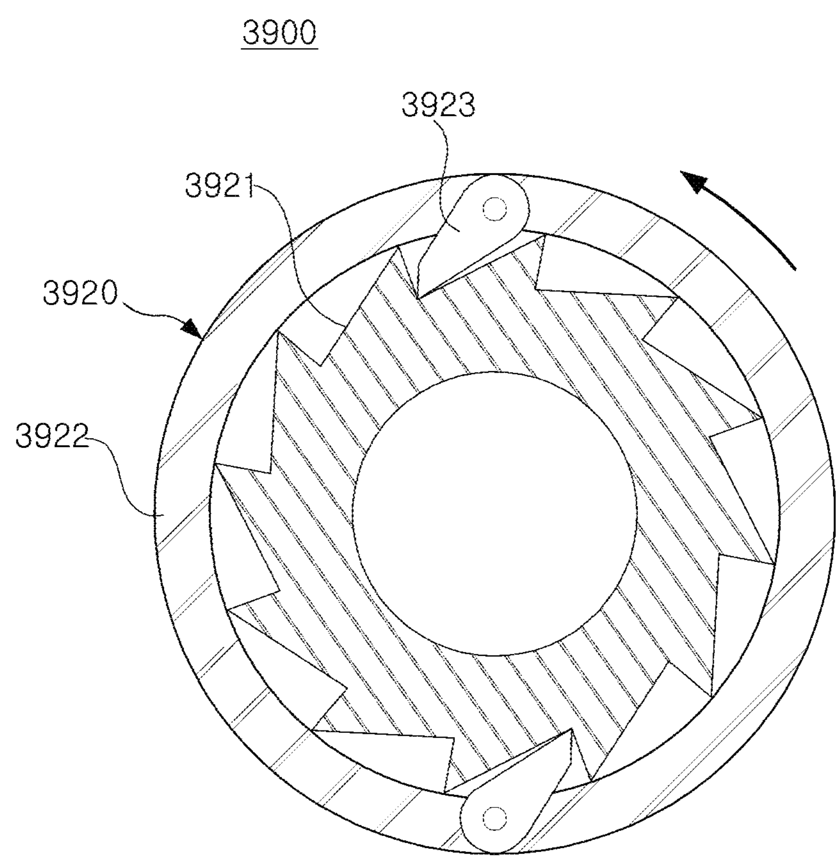
FIG. 31 is a view illustrating a ratchet structure, another example of a blocking member, in the blender of each of FIGS. 28 and 29.

FIG. 28 is a view illustrating a blender according to another embodiment, FIG. 29 is a view illustrating a blender according to another embodiment, FIG. 30 is a view illustrating a one-way bearing, an example of a blocking member, in the blender of each of FIGS. 28 and 29, and FIG. 31 is a view illustrating a ratchet structure, another example of a blocking member, in the blender of each of FIGS. 28 and 29.

Referring to the drawings, a blender according to the present disclosure may include a blender body 3100 and an internal cylinder unit 3200.

The blender body 3100 may include an external cylinder 3110 covered with a body cover **3100*a*, a grinding blade 3120, and a blade driving portion 3130 rotating the grinding blade 3120**.

Specifically, the external cylinder 3110 maybe a cylinder in which the internal cylinder 3210 of the internal cylinder unit 3200 is disposed, and may have a open top structure. In addition, the external cylinder 3110 may be configured to be opened and closed by the external cylinder cover 3140.

The grinding blade 3120 may be disposed in the internal cylinder 3210, and may serve to grind blending objects in the external cylinder 3110 while rotating. In this case, the blending objects refer to foods to be ground by an operation of the blender.

The blade driving portion 3130 may be configured to provide driving force to rotate the grinding blade 3120, and may include a blade rotation shaft 3131 and a blade driving motor 3132.

The blade rotation shaft 3131 may have a structure connected to a lower portion of the grinding blade 3120. More specifically, the blade rotation shaft 3131 and the grinding blade 3120 may be connected by a first intermediate rotation shaft 3121

The blade rotation shaft 3131 may connect the grinding blade 3120 and the blade driving motor 3132 to each other to transmit rotational driving force of the blade driving motor 3132 to the grinding blade 3120, allowing the grinding blade 3120 to be rotationally driven when the grinding blade driving motor 3132 operates.

In this case, the blade rotation shaft 3131 and the blade driving motor 3132 may be connected to each other by a blade driving connection line 3133 such as a timing belt.

In addition, the internal cylinder unit 3200 may include an internal cylinder 3210 and an internal cylinder driving portion 3220.

The internal cylinder 3210 may be disposed in the external cylinder 3110, and a projection 3213 may be formed on an internal side surface so that blending objects, rotationally flowing while being ground by the grinding blade 3120, is caught.

The internal cylinder driving motor 3222 may be configured to provide driving force to rotate the internal cylinder 3210, and may include an internal cylinder rotation shaft 3221 and an internal cylinder driving motor 3222.

The internal cylinder rotation shaft 3221 may have a structure connected to a lower portion of the internal cylinder 3210. More specifically, the internal cylinder rotation shaft 3221 maybe connected to the internal cylinder 3210 and a second intermediate rotation shaft 3211.

The internal cylinder rotation shaft 3221 may connect the internal cylinder 3210 and the internal cylinder driving motor 3222 to each other to transmit rotational driving force of the internal cylinder driving motor 3222 to the internal cylinder 3210, allowing the internal cylinder 3210 to be rotationally driven when the internal cylinder driving motor 3222 operates.

In this case, the internal cylinder rotation shaft 3221 and the internal cylinder driving motor 3222 may be connected to each other by an internal cylinder driving connection line 3223 such as a timing belt.

The above-described blade driving portion 3130 and the above-described internal cylinder driving portion 3220 may be controlled by a controller (not illustrated). More specifically, the blade driving motor 3132 of the blade driving portion 3130 and the internal cylinder driving motor 3222 of the internal cylinder driving portion 3220 may be connected to a controller to be controlled by the controller.

The controller may control the blade driving portion 3130 and the internal cylinder driving portion 3220 in a grinding mode and a dehydration mode. In particular, a grinding effect of blending objects may be increased by the grinding mode.

In a blender according to the related art, grinding blades rotate in only one direction, so that blending objects continuously rotate within a blender cylinder in only one direction. In addition, the blending objects are maintained like a wall in the state of being pushed out to a side of an internal side surface of the blender, so that the blending objects do not return to the grinding blade. Thus, grinding performance may be significantly reduced.

In this regard, even in an existing blender, projections may be formed on an internal wall of a blender cylinder to create a certain degree of vortex in the blending objects. However, this is also implemented as a flow having a regular pattern, so that the blending objects may not be well ground.

In this regard, in the blender according to the present disclosure, a grinding mode may be selected by a controller. In the grinding mode, to break a state of balance of blending objects in the internal cylinder 3210 such that an irregular flow of the blending objects is implemented, the controller may control the internal cylinder driving portion 3220 to blend the blending objects while repeatedly performing two operating patterns. The operating patterns include an operating pattern, in which the internal cylinder 3210 rotates reversely in a direction opposing a rotational direction of the grinding blade 3120 and is then stopped, and an operating pattern in which the internal cylinder 3210 rotates in a reverse direction and then changes the rotational speed.

As described above, in the blender according to the present disclosure, the controller may control the internal cylinder driving portion 3220 to break a state of balance of the blending objects. Thus, the blending objects may not be piled up like a wall on the internal side surface of the internal cylinder 3210 and may return to the grinding blade 3210, rotating in a central portion of the internal cylinder 3210, to significantly improve grinding performance.

That is, the blender according to the present disclosure maybe configured to break the state of balance of the blending object, so that blending objects maintained like a wall on the internal side surface of the internal cylinder 3210 may be broken down to ultimately improve the performance of grinding the blending objects.

Specifically, the blending objects are moved to the internal side surface of the internal cylinder 3210 by the centrifugal force generated by the rotation of the grinding blade 3120 during blending of the blending objects. In this case, when a force balance between particles of the blending objects is maintained, the blending objects may not be moved and may be then stopped. Accordingly, the blending objects may not be moved to the grinding blade 120, and thus, may not be ground any longer.

However, the force balance between the particles of the blending objects may be changed into a force imbalance by repeatedly performing an operating pattern, in which the internal cylinder 3210 rotates in a reverse direction and is then stopped in the blender according to the present disclosure, and an operating pattern in which the internal cylinder 3210 rotates in the reverse direction and then changes rotational speed thereof. Accordingly, the particles may flow again. As the particles migrate to grinding blade 3210 while flowing, the blending objects may be continuously ground.

Moreover, when the blender according to the present disclosure repeatedly performs an operating pattern, in which the internal cylinder 3210 reversely rotates in a direction opposing a rotational direction of the grinding blade 3120 and is then stopped, and an operating pattern in which the internal cylinder 3210 rotates in a reverse direction and then changes the rotational speed, an effect of grinding the blending objects may be further increased due to a shape structure of the projection 3213.

Specifically, the projection 3213 may have a screw projection line shape, inducing a downward spiral flow of the blending objects, such that the blending objects flows downwardly while rotating in a direction opposing the rotational direction of the grinding blade 3120.

Hereinafter, the flow of the blending objects, flowing rotationally in one direction due to the grinding blade 3120, will be described. The grinding blade 3120 is disposed in a lower portion of the internal cylinder 3210, so that the blending objects may pushed out to the internal side surface of the internal cylinder 3210 and then may rise up along the internal side surface of the internal cylinder 3210 when the grinding blade 3120 rotate. Accordingly, the blending objects, flowing upward while receiving centrifugal force, may barely flow to the grinding blade 3120 disposed in the lower portion of the internal cylinder 3210.

When the grinding blade 3120 and the internal cylinder rotate in directions opposing each other such that the blending objects, flowing in the above manner, flow to the grinding blade 3120 disposed in a lower portion of the internal cylinder 3210, the projection 3213 may have a screw projection line shape such that the blending objects flow downwardly while rotating in the direction opposing the rotational direction of the grinding blade 3210. Thus, a downward spiral flow of the blending objects may be induced.

For example, the blending objects, touching the internal side surface of the internal cylinder 3210 while rotationally flowing in one direction, may descend along a spiral structure of a screw projection line while colliding against the screw projection line. Thus, the blending objects may flow to the grinding blade 3210, disposed on the lower internal portion of the internal cylinder 3210, to further increase the grinding effect of the blender.

In the dehydration mode of the blender according to the present disclosure, the blade driving portion 3130 and the internal cylinder driving portion 3220 may be controlled by the controller such that the rotation of the grinding blade 3120 is stopped and then the internal cylinder 3210 rotates for a certain period of time.

For example, in the dehydration mode of the blender according to the present disclosure, the internal cylinder driving motor 3222 may be controlled to continuously maintain the reverse rotation of the internal cylinder 3210 at the same time as the blade driving motor 3132 may be controlled such that the rotation of the grinding blade 3120 may be stopped by the controller to automatically finish the grinding mode. The reverse rotation of the internal cylinder 3210 may be continued for a certain period of time such that the ground blending objects are sufficiently dehydrated.

As described above, a significant amount of power (3× power) is required to rotate the internal cylinder 3210 in the grinding mode, whereas relatively less power (3× power) is required to rotate the internal cylinder 3210 in the dehydration mode than in the grinding mode.

Specifically, since the blending objects are in a previously ground state in the dehydration mode, a repulsive force of the blending objects caught by the projection 3213 of the internal cylinder 3210 is not great. Meanwhile, since the blending objects are in a non-ground state or a less ground state in the grinding mode of the blender, in particular, in the early stage, the repulsive force of the blending objects caught by the projection 3213 of the internal cylinder 3210 is relatively great. Therefore, a significant amount of power is required for the internal cylinder 3210.

A grinding driving motor employs a motor having a significant amount of power to grind blending objects, whereas the internal cylinder driving motor 3222 employs a motor having significantly less power because the internal cylinder driving motor 3222 simply rotates the internal cylinder 3210. Therefore, the internal cylinder 3210 may be pushed by the blending objects, rotating at high speed, to rotate forwardly in the same direction as the rotational direction of the grinding blade 3120 in the grinding mode. To prevent such an issue from occurring, a significant amount of rotational force is required for the internal cylinder 3210.

Accordingly, unlike the present disclosure, as an example, two internal cylinder driving motors 3222 may be provided. In this case, one internal cylinder driving motor 3222 may be connected to the internal cylinder rotation shaft 3221 by a gear-connection structure, having a low rpm of 3 but a high rotational force, to be used in the grinding mode, and the other internal cylinder driving motor 3222 may be connected to the internal cylinder rotation shaft 3221 by a gear-connection structure, having a relatively low rotational force but a high rpm, to be used in the dehydration mode.

Meanwhile, in the present disclosure, only one internal cylinder driving motor 3222 is provided. Therefore, both the grinding mode and the dehydration mode may be implemented with the only one internal cylinder driving motor 3222, which causes an rpm to be lower than in the dehydration mode to prevent a significant decrease in the rotational force. As a result, the only one internal cylinder driving motor 3222 may be configured to implement the grinding mode under conditions in which the dehydration mode is able to be implemented.

In the process of repeatedly performing the operating pattern in which the internal cylinder 3210 reversely rotates and is then stopped or rotational speed thereof is then reduced, a more significant amount of rotational force is required for the internal cylinder 3210 at the moment that the internal cylinder 3210 starts to reversely rotate again or the rotation speed thereof is increased. Since the force of the only one internal cylinder driving motor 3222 is momentarily lower than the required rotational force, the internal cylinder 3210 may be pushed by the blending objects, rotating forwardly, to rotate forwardly. Thus, reverse rotation of the internal cylinder 3210 may not be implemented.

Accordingly, in the blender according to the present disclosure, the internal cylinder driving portion 3220 may include a blocking member 3900 configured to prevent the internal cylinder 3210 from rotating in the same direction as the rotational direction of the grinding blade 3120.

Of course, when a case is not the case of the above-described operating pattern, for example, when the reverse rotation is not implemented and tends to be changed into a forward rotation in various cases including the case in which large-sized blending objects have a significant impact on the internal cylinder 3210 in a forward direction, the blocking member 3900 may prevent the internal cylinder 3210 from rotating in the same direction as the rotational direction of the grinding blade 3120.

Specifically, as an example, the blocking member 3900 may be a one-way bearing 3910, as illustrated in FIG. 30.

The one-way bearing 3910 may be disposed between an inner race 3911, an outer race 3912 disposed outside the inner race 3911, a locking roller 3913 disposed between the inner race 3911 and the outer race 3912 and disposed in an external circumferential groove of the inner race 3911, and an elastic plunger 3914 (on which a spring is mounted) mounted in an external circumferential groove of the inner race 3911 to elastically support the locking roller 3913.

The one-way bearing 3910 has a structure in which the outer race 3912 is able to rotate toward the elastic plunger 3914 based on the inner race 3911, but is unable to rotate toward an opposing side of the elastic plunger 3914.

For example, when the outer race 3912 rotates counterclockwise, the locking roller 3913 may move to a relatively deep portion from a groove while pushing the elastic plunger 3914, so that the one-way bearing 3910 is not caught between the inner race 3911 and the outer race 3912 to provide smooth rotation. On the other hand, when the outer race 3912 rotates clockwise, the locking roller 3913 may move to a relatively shallow portion from the grove while moving to an opposing side of the elastic plunger 3914, so that the one-way bearing 3910 is caught between the inner race 3911 and the outer race 3912 to block rotation.

As another example, the blocking member 3900 may have a ratchet structure 3920, as illustrated in FIG. 31.

The ratchet structure 3920 may include a latch wheel 3912, a frame 3922 disposed on an edge of the ratchet wheel 3912, and a stopper 3923 (on which a torsion spring (not illustrated) is mounted) rotationally mounted on the frame 3922 and elastically pressed to place a frontend portion thereof on a gear of the ratchet wheel 3921.

The ratchet structure 3920 may be a structure in which the ratchet wheel 3920 rotates counterclockwise with respect to the frame 3922 due to a gear shape of the ratchet wheel 3921, whereas rotation of the ratchet wheel 3912 is blocked in the clockwise direction.

As an embodiment, the above-configured blocking member 3900 may be mounted on the internal cylinder rotation shaft 3221, as illustrated in FIG. 28.

Accordingly, the blocking member 3900 may allow the internal cylinder rotation shaft 3221 to rotate only in a direction opposing a rotational direction of the blade rotation shaft 3131, and may block rotation of the internal cylinder rotation shaft 3221 in the same direction as the rotation direction of the blade rotation shaft 3131.

The blade rotation shaft 3131 may be axially and rotationally mounted in a hollow formed in the internal cylinder rotation shaft 3221, so that the blade rotation shaft 3131 and the internal cylinder rotation shaft 3221 axially rotate independently.

In this case, the blocking member 3900 may be mounted on the internal cylinder rotation shaft 3221 to be disposed between the blade rotation shaft 3131 and the internal cylinder rotation shaft 3221. Accordingly, even when the internal cylinder 3210 is pushed by blending objects to tend to rotate in the same direction as the rotational direction of the blade rotation shaft 3131, for example, in a forward direction, rotation of the internal cylinder rotation shaft 3221 in the same direction as the rotational direction of the blade rotation shaft 3131 maybe blocked. Ultimately, rotation of the internal cylinder 3210 in the same direction as the rotational direction of the grinding blade 3120 may be blocked.

As another example, the blocking member 3900 may be mounted on a motor shaft **3222*a* of an internal cylinder driving motor 3222 provided in an internal cylinder driving portion 3220, as illustrated in FIG. 29**.

Accordingly, the blocking member 3900 may allow the motor shaft **3222*a* of the internal cylinder driving motor 3222 to rotate only in a direction opposing a rotational direction of the blade rotation shaft 3131, but may block rotation of the motor shaft 3222*a* of the internal cylinder driving motor 3222 in the same direction as the rotational direction of the blade rotation shaft 3131**.

For example, the blocking member 3900 may be mounted on the motor shaft **3222*a* of the internal cylinder driving motor 3222. Accordingly, even when the internal cylinder 3210 is pushed by blending objects to tend to rotate in the same direction as a rotational direction of a grinding blade 3120, for example, in a forward direction, rotation of the motor shaft 3222*a*** of the internal cylinder driving motor 3222 in the same direction as the rotational direction of the blade rotation shaft 3131 maybe blocked. Ultimately, rotation of the internal cylinder 3210 in the same direction as a rotational direction of the grinding blade 3120 may be blocked.

The internal cylinder 3210 may be provided with a plurality of dehydration holes 3210*b* formed in a side portion thereof.

In a grinding mode, an operating pattern, in which the internal cylinder 3210 rotates reversely and is then stopped or rotational speed thereof is reduced, may be repeatedly performed. In a dehydration mode following the grinding mode, the internal cylinder 3210 may continuously rotate for an appropriate period of time to discharge juice of the blending object through a dehydration hole 3210*b*. As a result, the internal cylinder 3210 may be used in both the grinding mode and the dehydration mode.

Furthermore, the present disclosure may be applied to an internal cylinder 3210, having no dehydration hole 3210, used only in a grinding mode.

For reference, in FIGS. 28 and 29, a reference numeral 3410 denotes a vacuum driving portion and a reference numeral 3420 denotes a suction pipe. The suction pipe may communicate with the inside of the internal cylinder 3210 through a body cover 3100*a*, an external cylinder cover 3140, and an internal cylinder cover 3210*a*, causing the inside of the internal cylinder 3210 to be vacuum through the operation of the vacuum driving portion 3410.

As a result, according to the present discourse, only one internal cylinder driving motor 3222 may be provided as a driving member rotating the internal cylinder 3210 in a direction opposing a rotational direction of the grinding blade 3210, so that the only one internal cylinder driving motor 3222 may be used in both the grinding mode and the dehydration mode to improve production efficiency.

In addition, the blocking member 3900 may be provided on the internal cylinder rotation shat 3221 or the motor shaft 3222*a* of the internal cylinder driving motor 3222 to block rotation of the internal cylinder 3210 in the same direction as the rotational direction of the grinding blade 3120, so that the internal cylinder 3210 pushed by the blending objects may be prevented from tending to rotate in the same direction as the rotational direction of the grinding blade 3120, for example, in a forward direction.

The invention claimed is:

1. A blender comprising:

a blender body including an external cylinder, a grinding blade, and a blade driving portion rotating the grinding blade; and an internal cylinder unit including an internal cylinder, disposed in the external cylinder, in which the grinding blade is disposed, and having an internal side surface, on which at least one projection is formed, and an internal cylinder driving portion rotating the internal cylinder, wherein a blade rotation shaft of the blade driving portion is axially and rotationally mounted in a hollow, formed in an internal cylinder rotation shaft of the internal cylinder driving portion, to independently rotate the blade rotation shaft and the internal cylinder rotation shaft, wherein a first intermediate rotation shaft and a second intermediate rotation shaft surrounding the first intermediate rotation shaft are installed in the external cylinder, and wherein the first intermediate rotation shaft connects the blade rotation shaft of the blade driving portion and the grinding blade, and the second intermediate rotation shaft connects the internal cylinder rotation shaft of the internal cylinder driving portion and the internal cylinder.

2. The blender of claim 1, wherein a lower portion of the first intermediate rotation shaft is key-coupled to the blade rotation shaft of the blade driving portion, and an upper portion of the first intermediate rotation shaft is key-coupled to the grinding blade, and wherein a lower portion of the second intermediate rotation shaft is key-coupled to the internal cylinder rotation shaft of the internal cylinder unit, and an upper portion of the second intermediate rotation shaft is key-coupled to the internal cylinder.

3. The blender of claim 1, wherein the internal cylinder driving portion rotates the internal cylinder with an internal cylinder driving motor in a direction opposing a rotational direction of the grinding blade, and includes a blocking member preventing the internal cylinder from rotating in the same direction as the rotational direction of the grinding blade, and wherein the blocking member has a ratchet structure.

4. The blender of claim 3, wherein the blocking member is mounted on the internal cylinder rotation shaft.

5. The blender of claim 3, wherein the blocking member is mounted on a motor shaft of the internal cylinder driving motor.

6. The blender of claim 3, wherein the internal cylinder has a side portion in which a dehydration hole is formed, and wherein the internal cylinder driving portion includes an internal cylinder driving connection portion connecting the internal cylinder rotation shaft, the internal cylinder driving motor, and the internal cylinder rotation shaft and the internal cylinder driving motor to each other, and a gear-coupled structure of the internal cylinder driving connection portion varies such that the internal cylinder has different rotational speeds during grinding of blending objects and during dehydration of the blending objects.

7. The blender of claim 6, wherein the internal cylinder driving connection portion has a structure in which a small driving gear and a large driving gear is mounted on an internal cylinder driving shaft connected to the internal cylinder driving motor, and a large driven gear and a small driven gear are mounted on the internal cylinder rotation shaft or an intermediate rotation shaft rotating in conjunction with the internal cylinder rotation shaft, and wherein the internal cylinder driving shaft reciprocates in an axial direction thereof, or the internal cylinder rotation shaft or the intermediate rotation shaft reciprocates in an axial direction thereof, and the large driving gear and the small driven gear are not gear-coupled to each other when the small driving gear and the large driven gear are gear-coupled to each other, and the small driving gear and the large driven gear are not gear-coupled to each other when the large driving gear and the small driven gear are gear-coupled to each other.

8. The blender of claim 7, wherein the internal cylinder driving connection portion includes a shaft moving member configured to move the internal cylinder driving shaft in an axial direction thereof, and wherein the internal cylinder driving shaft has one end portion, key-coupled to a motor shaft of the internal cylinder driving motor to rotate in conjunction with shaft rotation of the motor shaft and slidably coupled to the motor shaft of the internal cylinder driving motor to be movable in an axial direction of the motor shaft, and the other end portion axially and rotatably connected to the shaft moving member.

9. The blender of claim 3, wherein the internal cylinder has a side portion in which a dehydration hole is formed, and wherein the internal cylinder driving portion includes an internal cylinder driving connection portion connecting the internal cylinder rotation shaft, the internal cylinder driving motor, and the internal cylinder rotation shaft and the internal cylinder driving motor to each other, and the internal cylinder driving motor comprises a plurality of internal cylindrical driving motors such that the internal cylinder has different rotational speeds during grinding of blending objects and during dehydration of the blending objects.

10. The blender of claim 9, wherein one of the plurality of internal cylinder driving motors is a first motor configured to supply rotation driving power to the internal cylinder during grinding of the blending objects, and another internal cylinder driving motor is a second motor configured to supply rotational driving power to the internal cylinder in a direction opposing a direction of the first motor.

11. The blender of claim 1, wherein the blade driving portion and the internal cylinder driving portion are controlled by a controller, and wherein the controller controls the blade driving portion and the internal cylinder driving portion in a grinding mode and a dehydration mode.

12. The blender of claim 11, wherein in the grinding mode, the blade driving portion and the internal cylinder driving portion are controlled to repeatedly perform an operating pattern, in which the internal cylinder reversely rotates in a direction opposing a rotation direction of the grinding blade and is then stopped, and an operating pattern in which the internal cylinder rotates reversely and then changes speed.

13. The blender of claim 11, wherein in the dehydration mode, the blade driving portion and the internal cylinder driving portion are controlled to continuously rotate the internal cylinder for a certain time after rotation of the grinding blade is stopped.

14. The blender of claim 1, further comprising:

a vacuum unit mounted in the blender body and configured to establish vacuum in the internal cylinder, wherein the vacuum unit comprises:

a suction pipe communicating with the internal cylinder; and a vacuum driving portion communicating with the suction pipe.

* * * * *